(12) United States Patent
Watanabe et al.

(10) Patent No.: US 7,248,034 B2
(45) Date of Patent: Jul. 24, 2007

(54) TIME LIMIT FUNCTION UTILIZATION APPARATUS

(75) Inventors: Hiroshi Watanabe, Yokohama (JP); Kazuya Matsuzawa, Kawasaki (JP); Riichiro Shirota, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/476,720

(22) Filed: Jun. 29, 2006

(65) Prior Publication Data

US 2006/0244434 A1 Nov. 2, 2006

Related U.S. Application Data

(63) Continuation of application No. 10/612,405, filed on Jul. 3, 2003, now Pat. No. 7,075,284.

(30) Foreign Application Priority Data

| Jul. 8, 2002 | (JP) | ............................. 2002-198144 |
| Nov. 20, 2002 | (JP) | ............................. 2002-336961 |
| Jun. 30, 2003 | (JP) | ............................. 2003-188792 |

(51) Int. Cl.
  *G01R 19/00* (2006.01)
(52) U.S. Cl. .................... 324/76.11; 327/365
(58) Field of Classification Search ............ None
  See application file for complete search history.

(56) References Cited

U.S. PATENT DOCUMENTS

| 4,275,405 A | 6/1981 | Shannon |
| 4,588,901 A | 5/1986 | Maclay et al. |
| 5,074,626 A | 12/1991 | Kramer et al. |
| 5,387,897 A | 2/1995 | Bechtle et al. |
| 5,451,896 A * | 9/1995 | Mori ........................... 327/543 |
| 5,760,644 A | 6/1998 | Lancaster et al. |
| 5,873,606 A | 2/1999 | Haas et al. |
| 5,930,206 A | 7/1999 | Haas et al. |
| 6,111,288 A | 8/2000 | Watanabe et al. |
| 6,172,907 B1 | 1/2001 | Jenne |
| 6,731,158 B1 | 5/2004 | Hass |
| 6,752,430 B2 | 6/2004 | Holt et al. |
| 6,811,083 B2 | 11/2004 | Kojima et al. |
| 2004/0032244 A1 | 2/2004 | Palm et al. |

FOREIGN PATENT DOCUMENTS

| CN | 259054 | 10/1995 |
| EP | 0 395 829 A1 | 11/1990 |
| JP | 9-127271 A | 5/1997 |
| JP | 09-211089 A | 8/1997 |
| JP | 10-189780 A | 7/1998 |
| JP | 10-261786 A | 9/1998 |
| JP | 2002-76338 A | 3/2002 |
| JP | 2002-246887 A | 8/2002 |
| JP | 2004-172404 A | 6/2004 |
| SK | 404092 A3 | 8/1994 |
| WO | WO 01/10292 A1 | 2/2001 |

* cited by examiner

*Primary Examiner*—Vincent Q. Nguyen
(74) *Attorney, Agent, or Firm*—Foley & Lardner LLP

(57) ABSTRACT

A time limit function utilization apparatus includes a first function block, a second function block, a signal line which connects the first and second function blocks and allows using a desired function that is generated by accessing the first and second function blocks with each other, and a semiconductor time switch interposed in or connected to the signal line, and disables or enables mutual access between the first and second function blocks upon the lapse of a predetermined time.

20 Claims, 55 Drawing Sheets

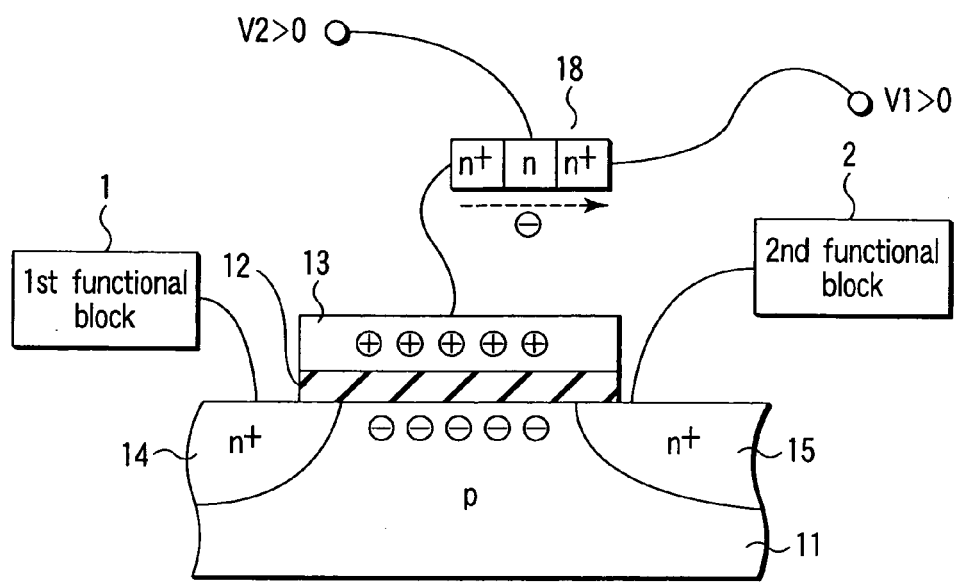
F I G. 28
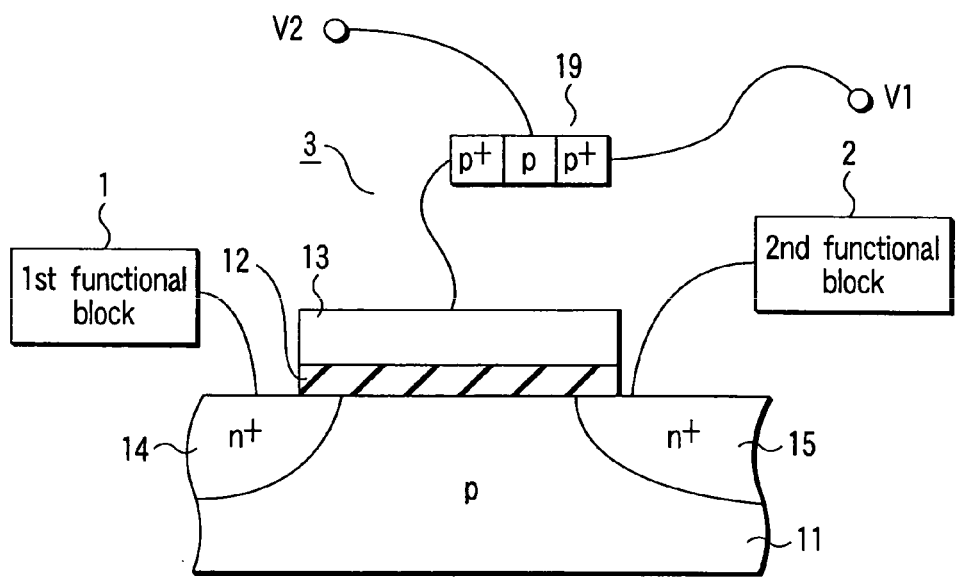
F I G. 29

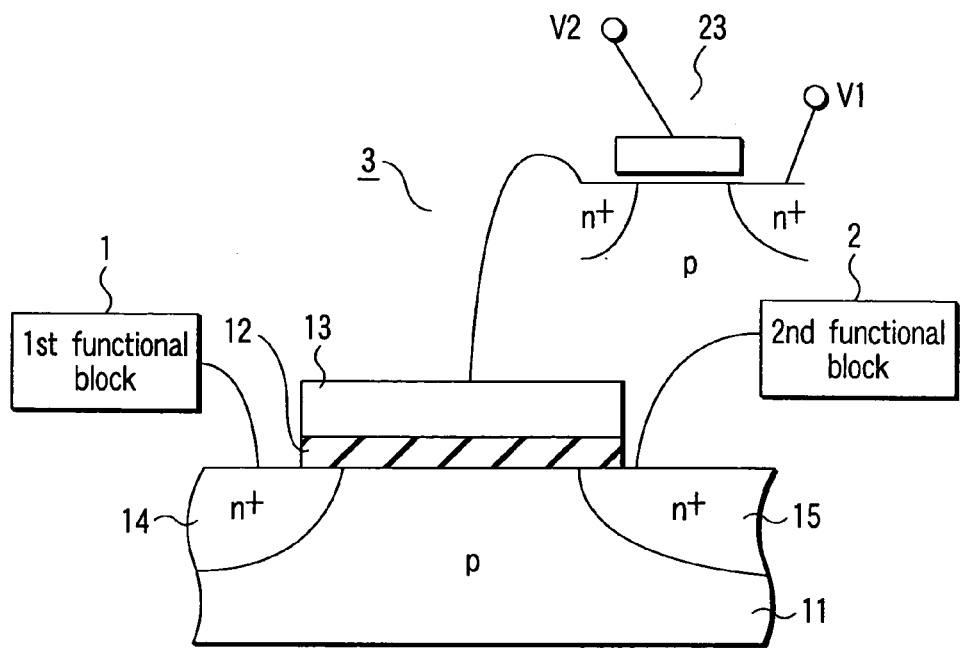
F I G. 37
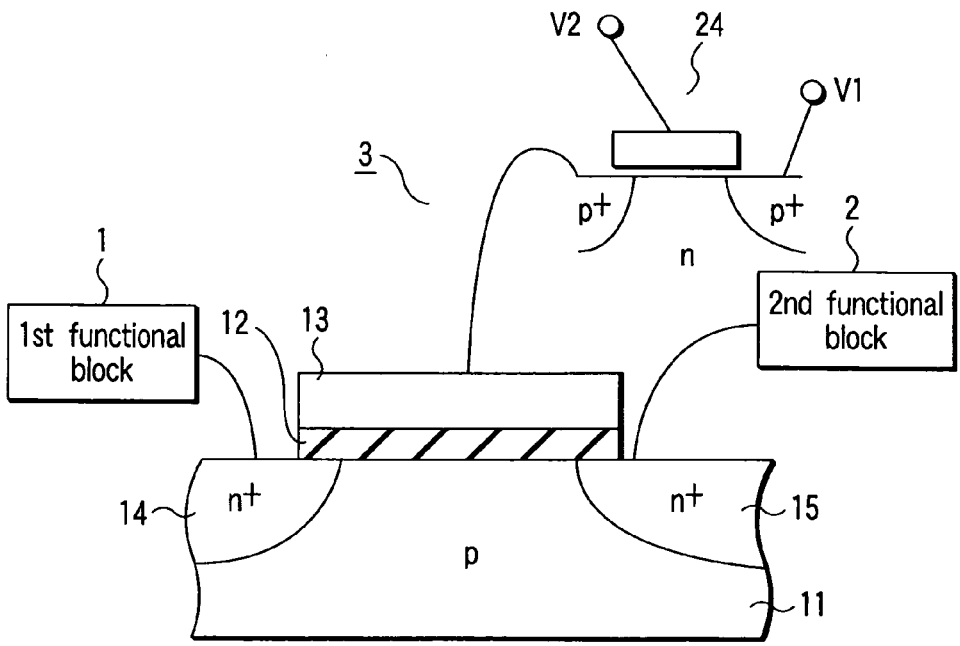
F I G. 38

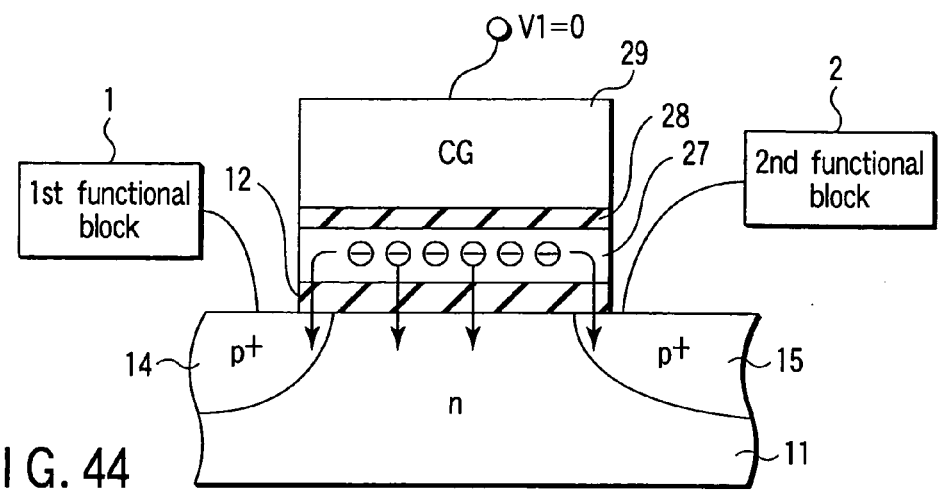
FIG. 44
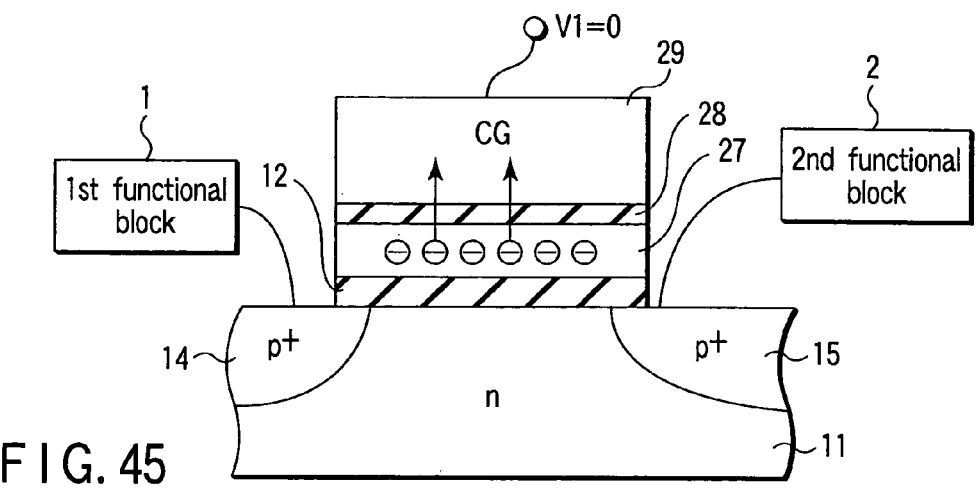
FIG. 45
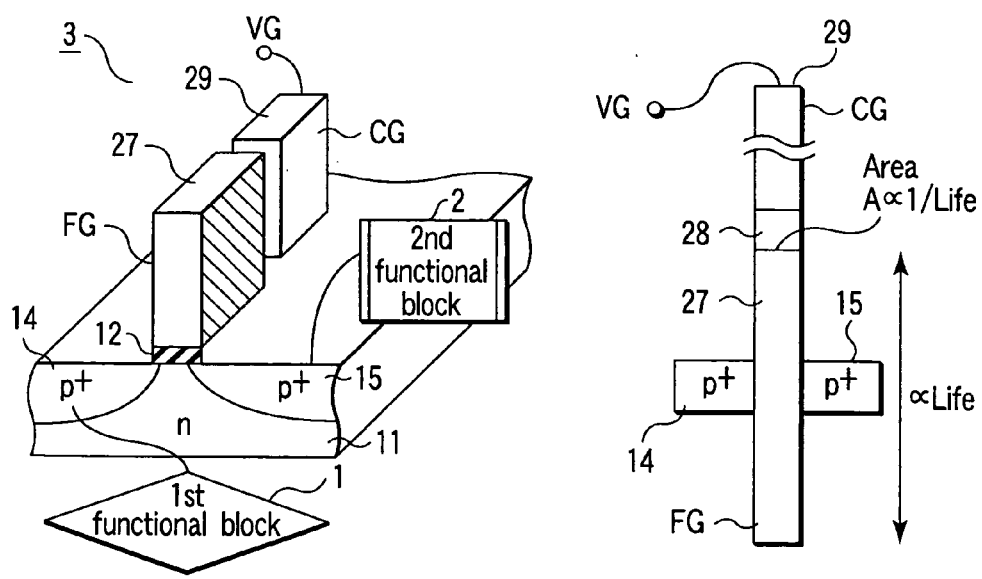
FIG. 46A                                    FIG. 46B

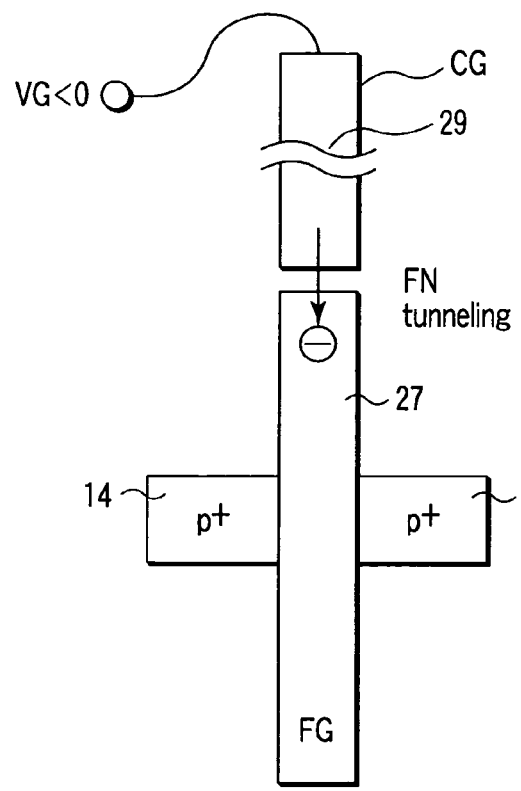
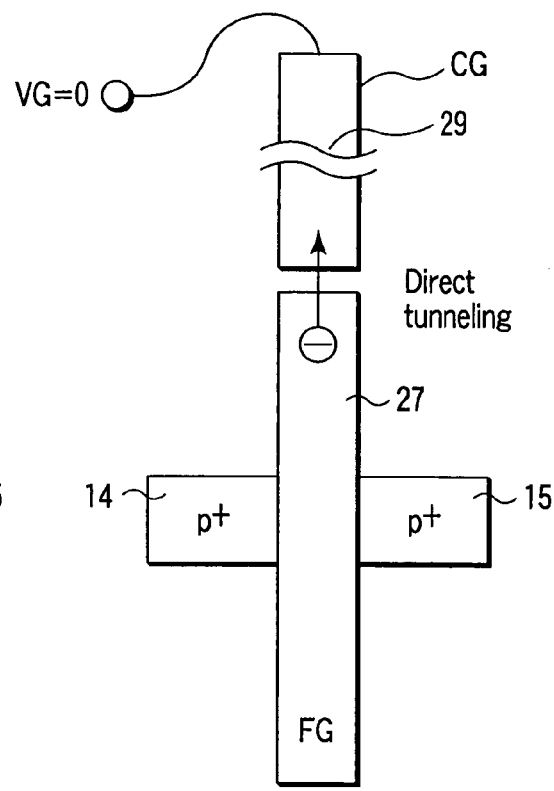
FIG. 47    FIG. 48
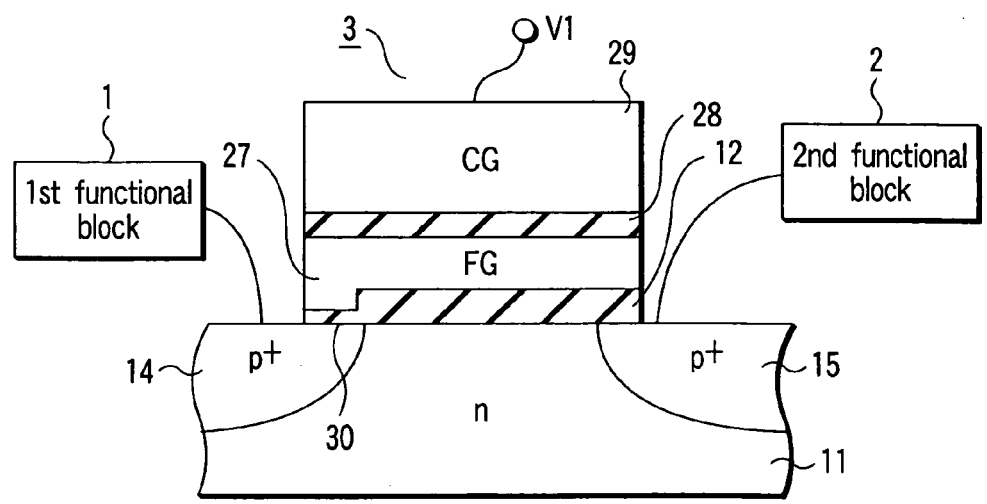
FIG. 49

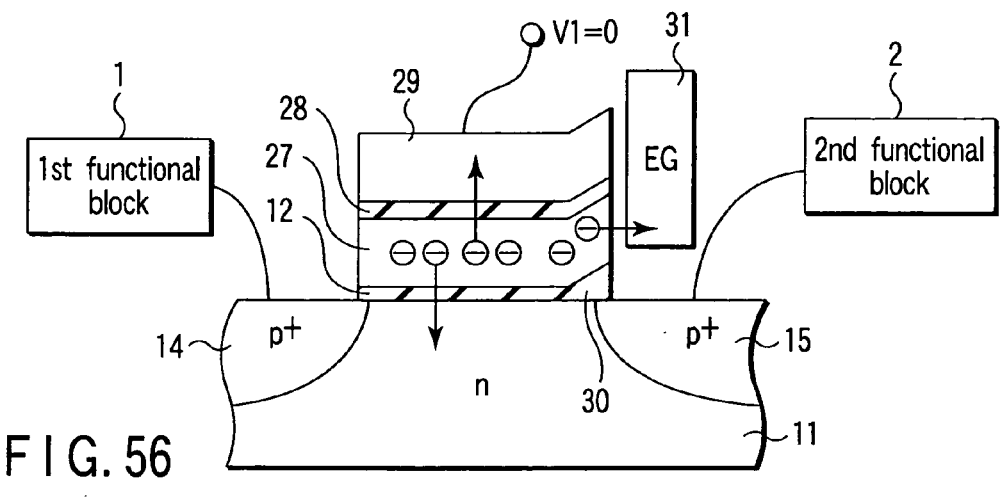
FIG. 56
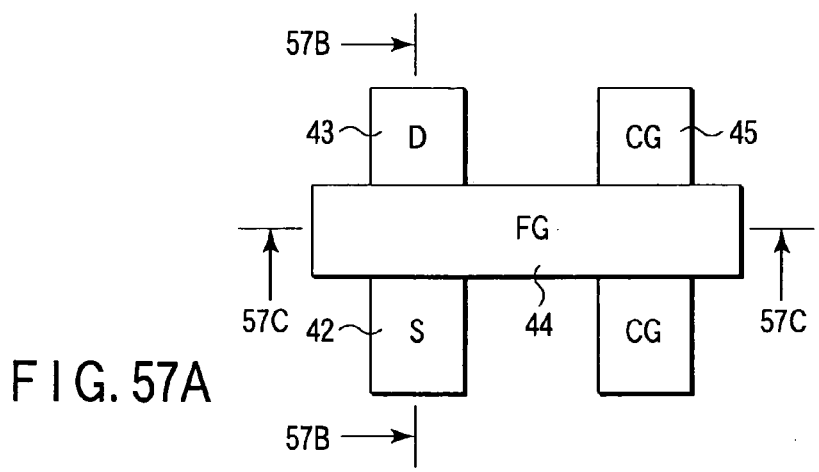
FIG. 57A
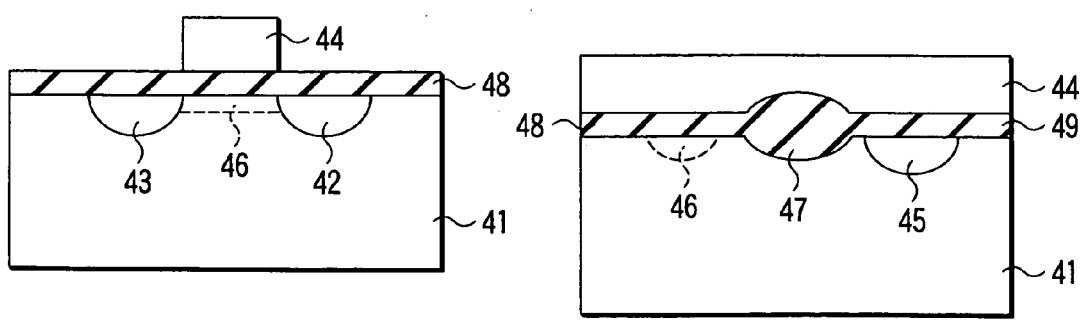
FIG. 57B
FIG. 57C

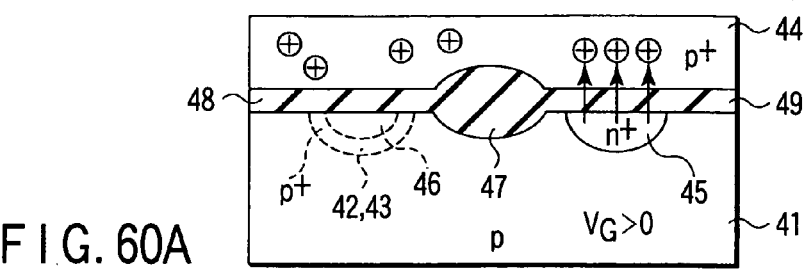
FIG. 60A
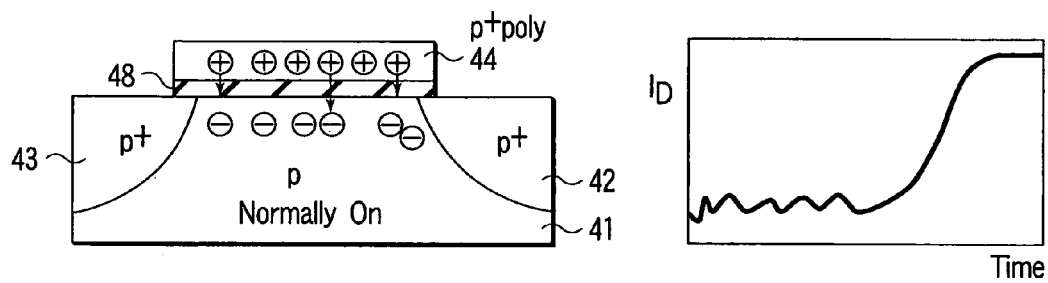
FIG. 60B
FIG. 60C
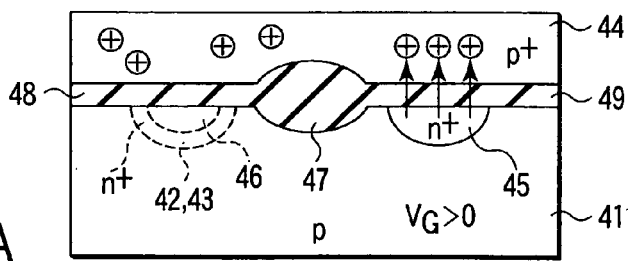
FIG. 61A
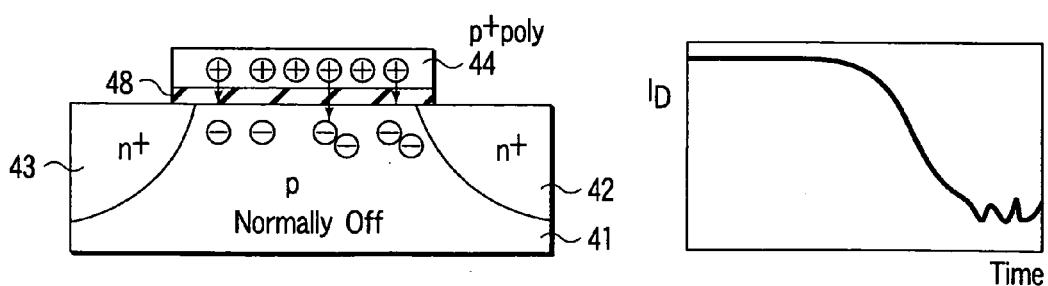
FIG. 61B
FIG. 61C

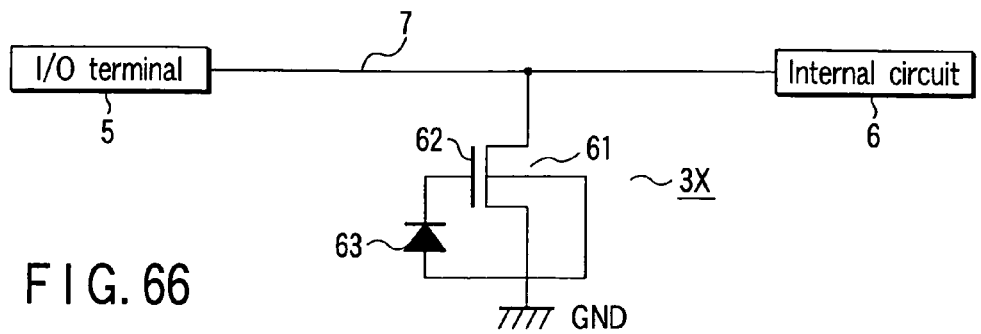
FIG. 66
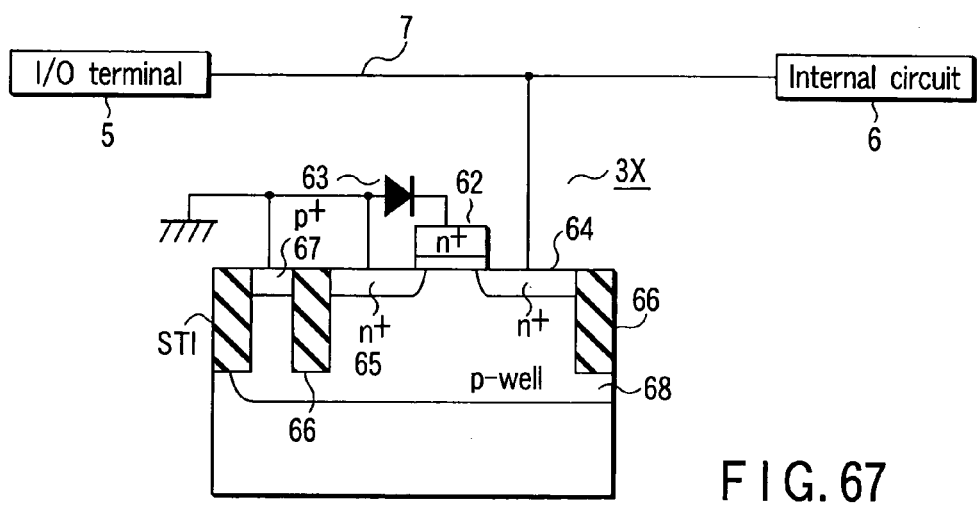
FIG. 67
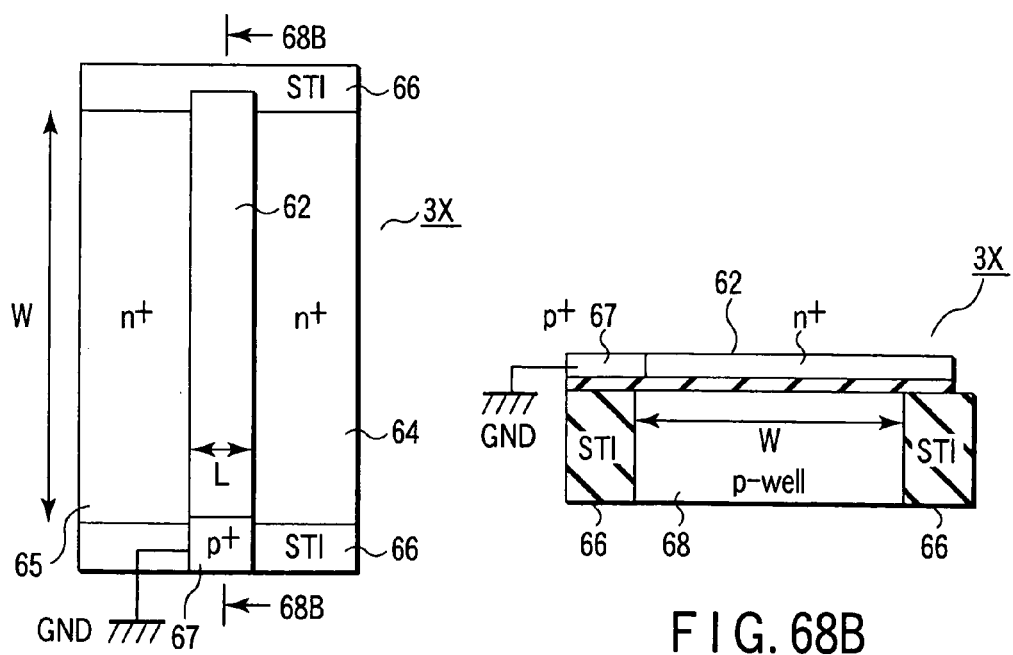
FIG. 68A
FIG. 68B

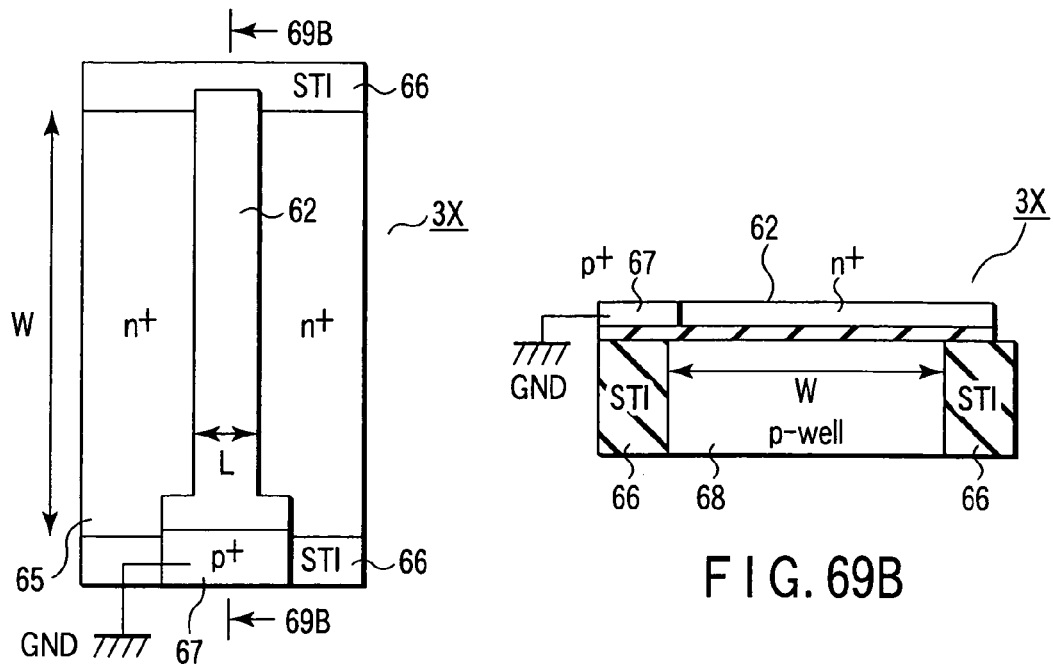
FIG. 69A
FIG. 69B
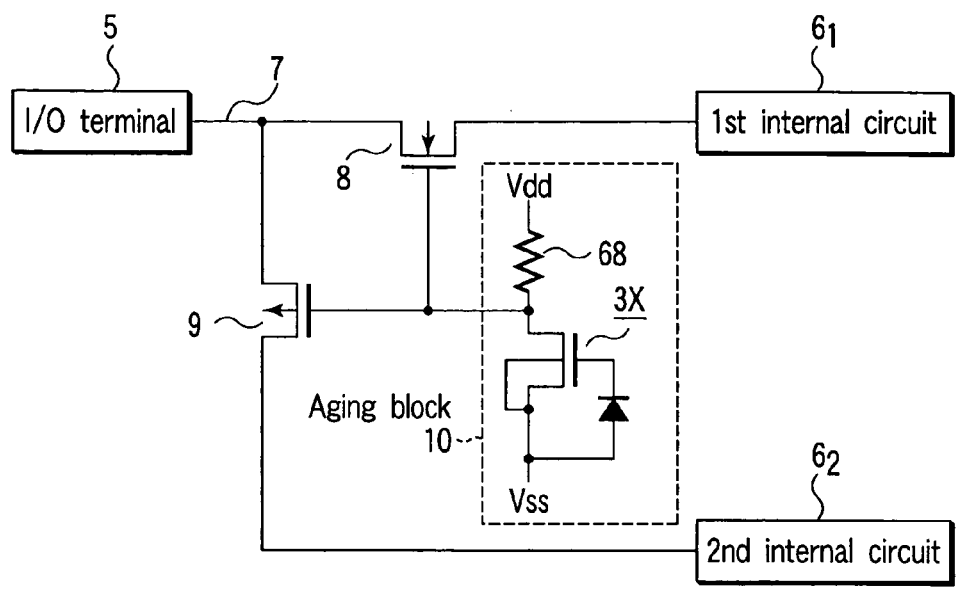
FIG. 70

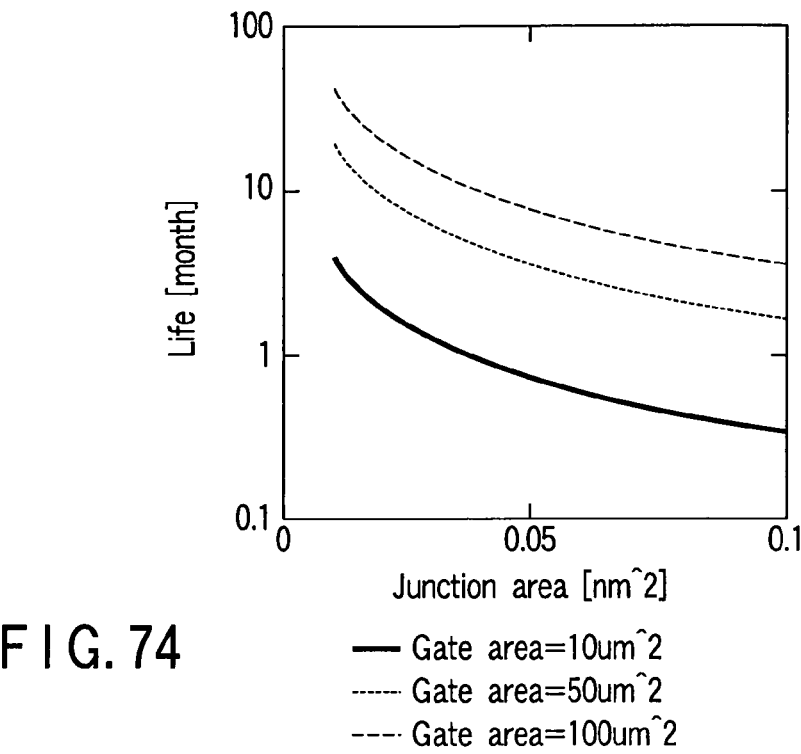
F I G. 74
— Gate area=10um^2
----- Gate area=50um^2
--- Gate area=100um^2
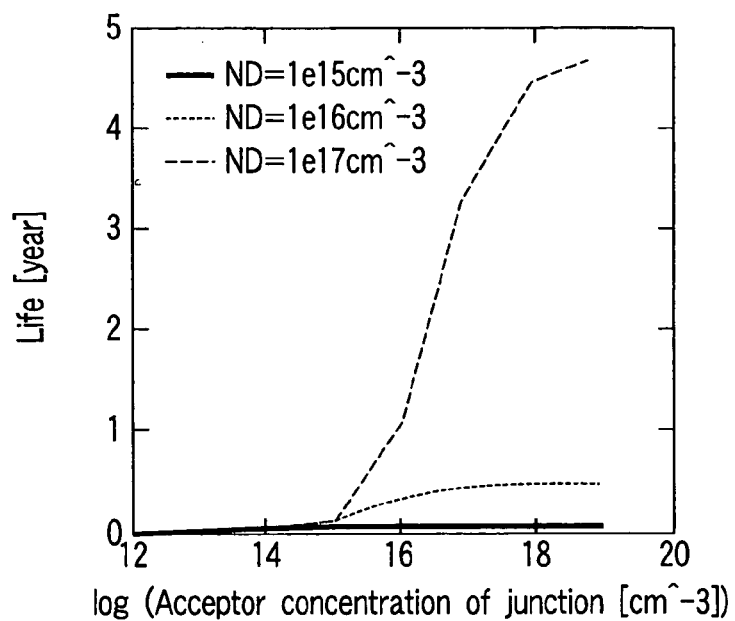
F I G. 75

FIG. 90
| | Forget | | Remember | |
|---|---|---|---|---|
| | p-MOSFET | n-MOSFET | p-MOSFET | n-MOSFET |
| Type | Normally Off | | Normally On | |
| Switch | On → Off | | Off → On | |
| Charge | Electron | Hole | Hole | Electron |
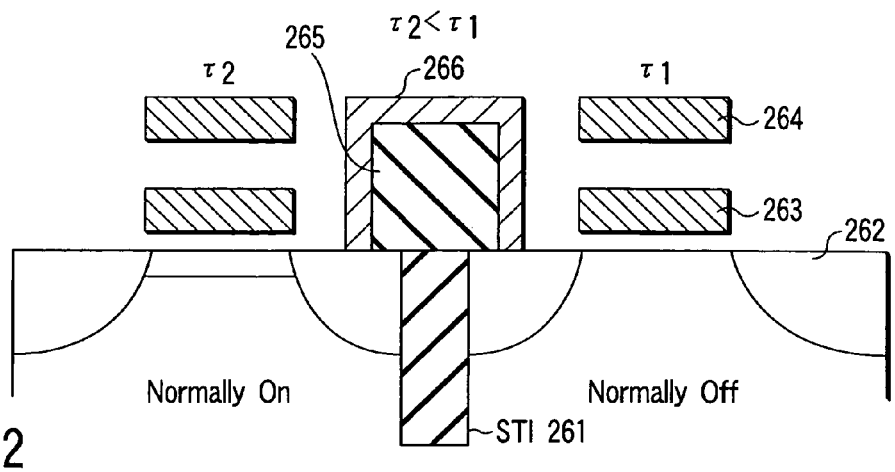
FIG. 92
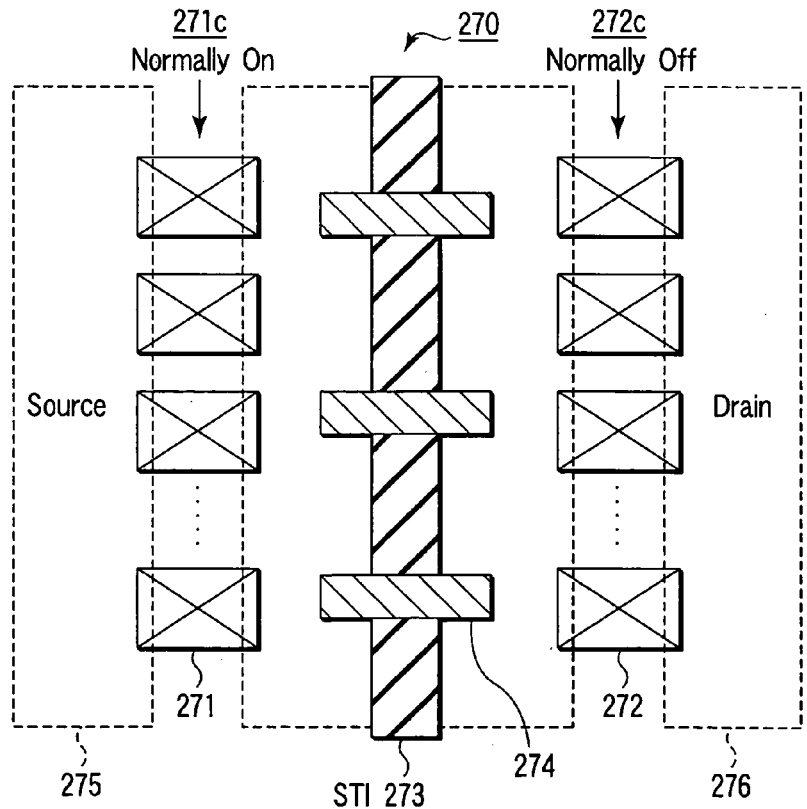
FIG. 93

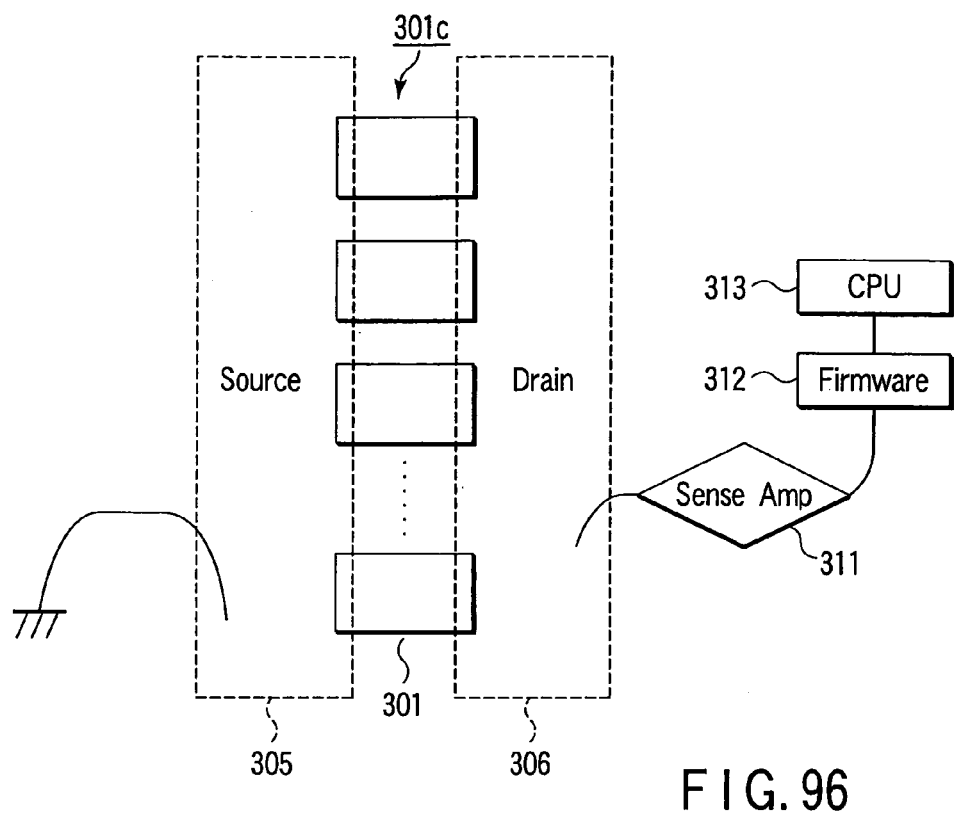
FIG. 96
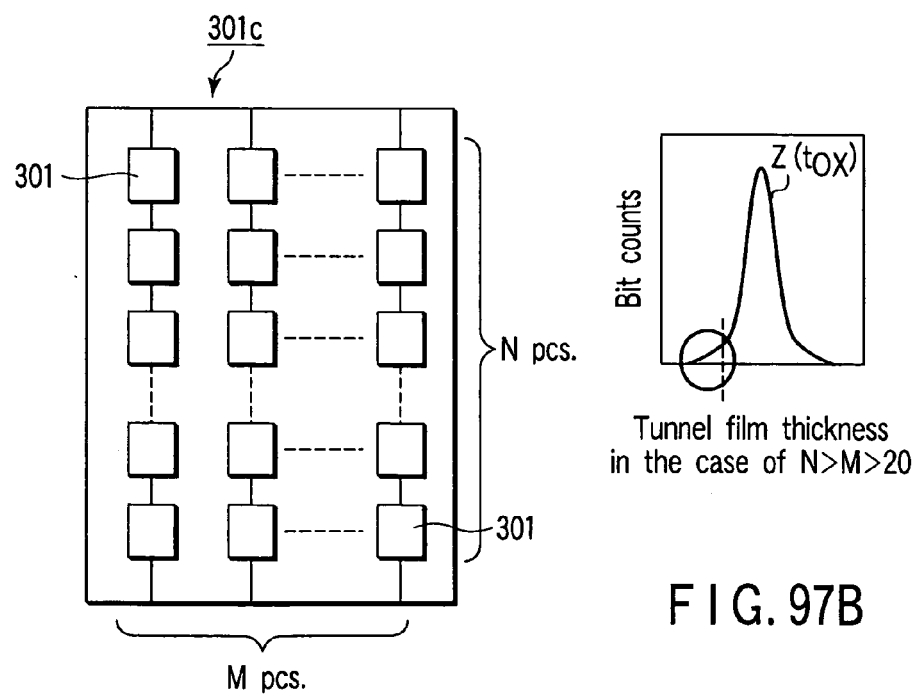
FIG. 97A
FIG. 97B

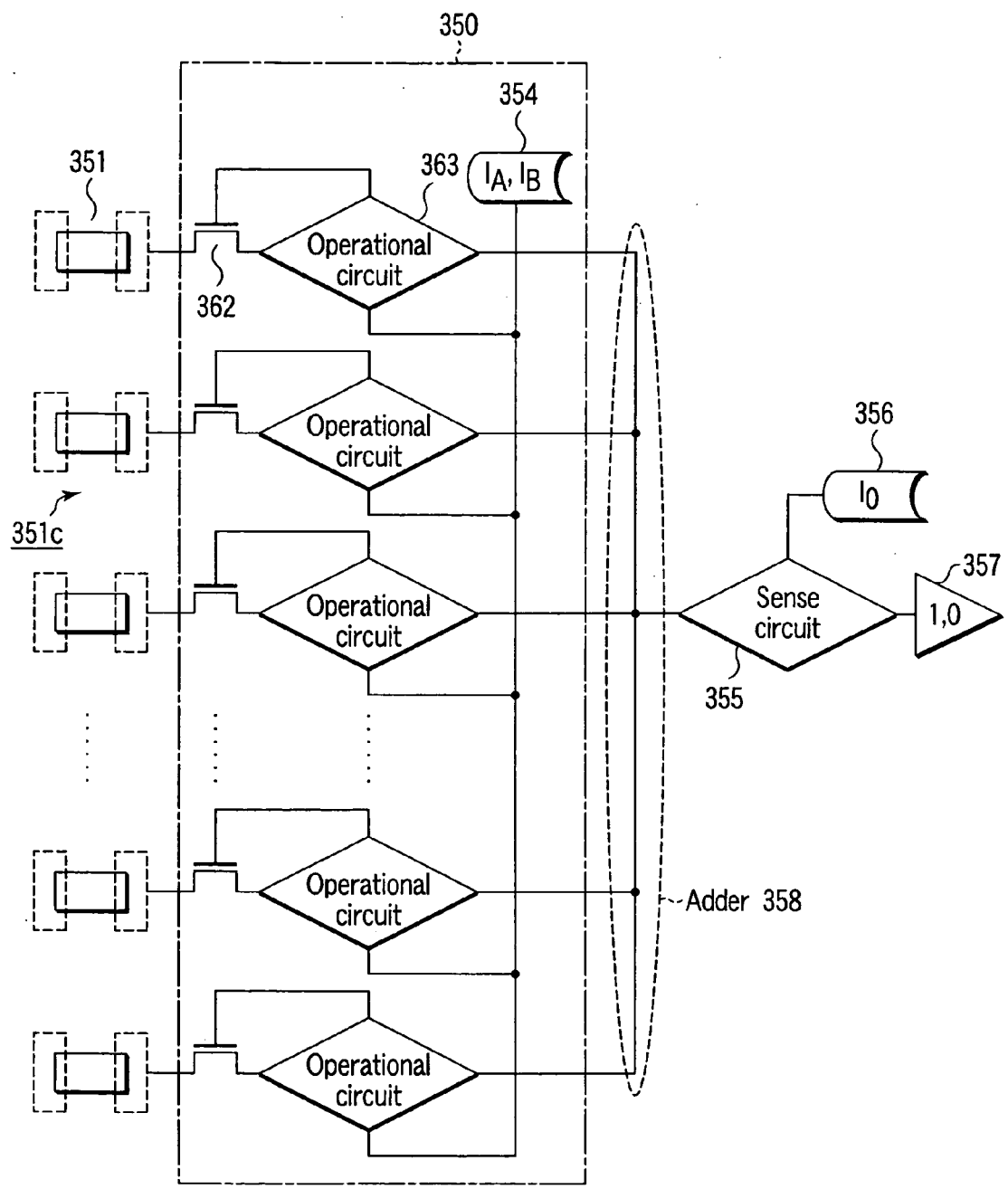
F I G. 102

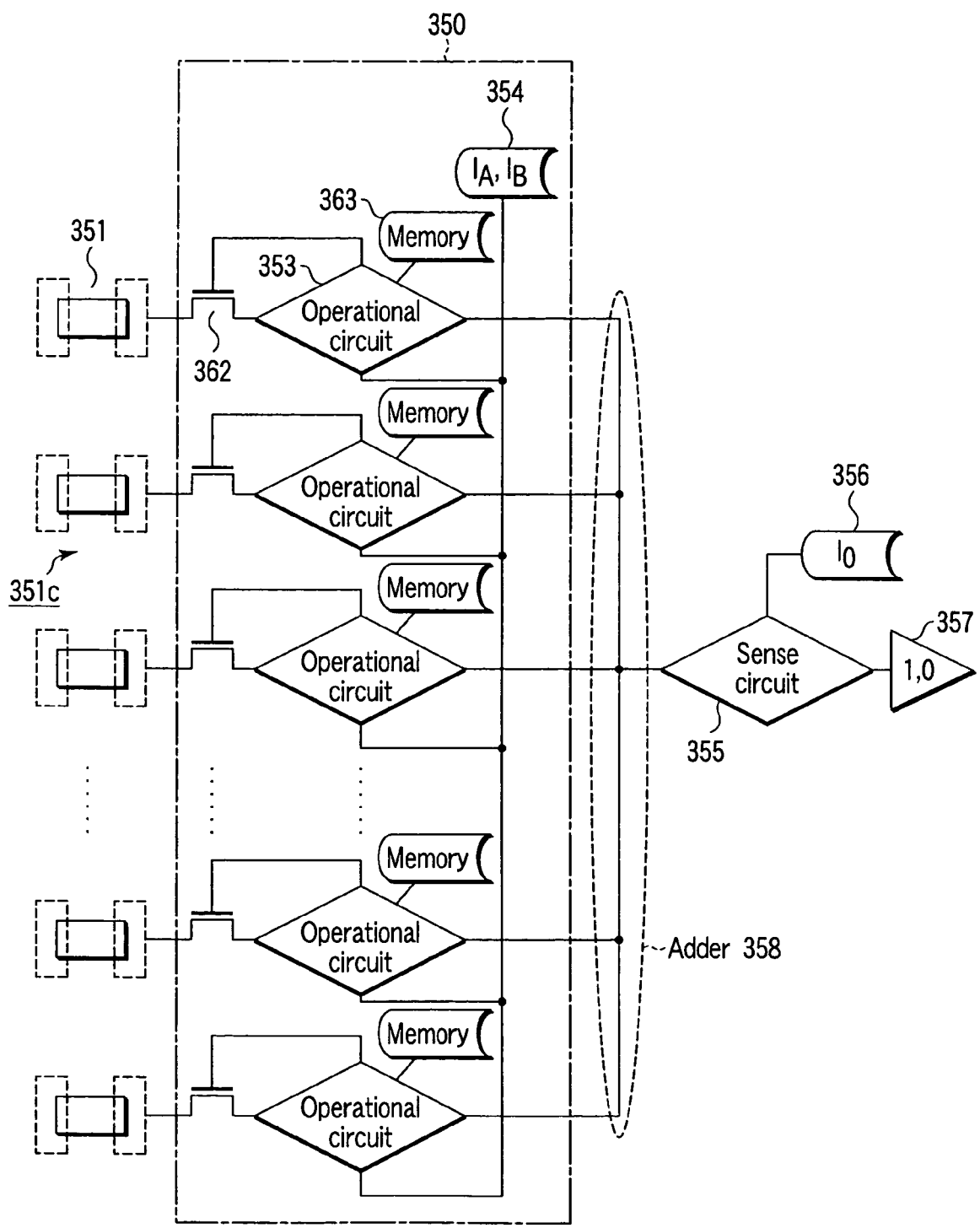
F I G. 103

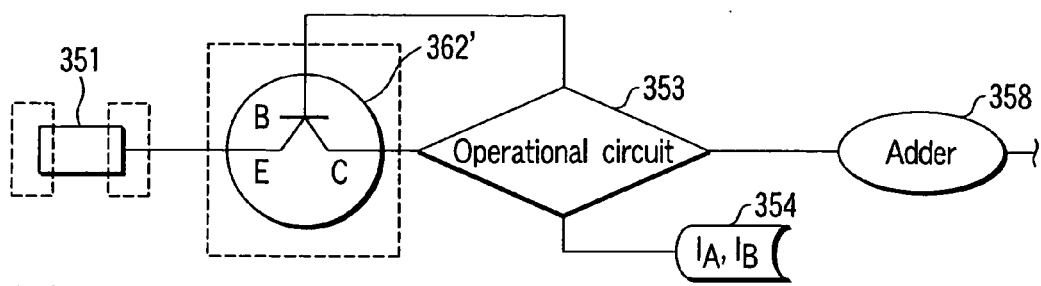
F I G. 104A
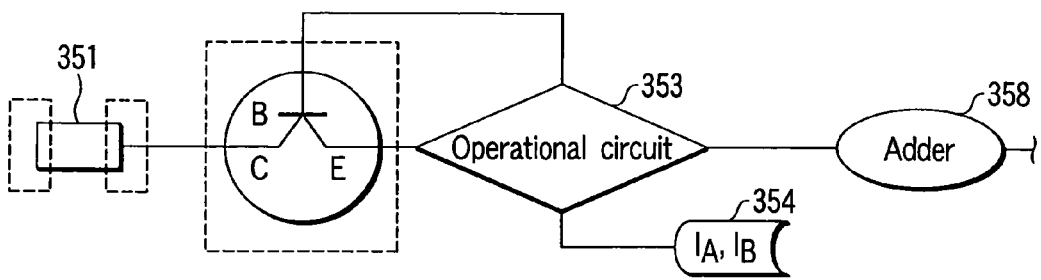
F I G. 104B
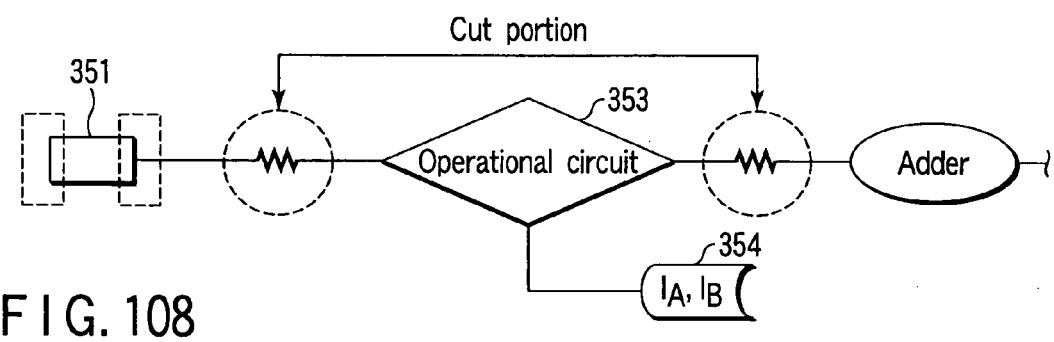
F I G. 108
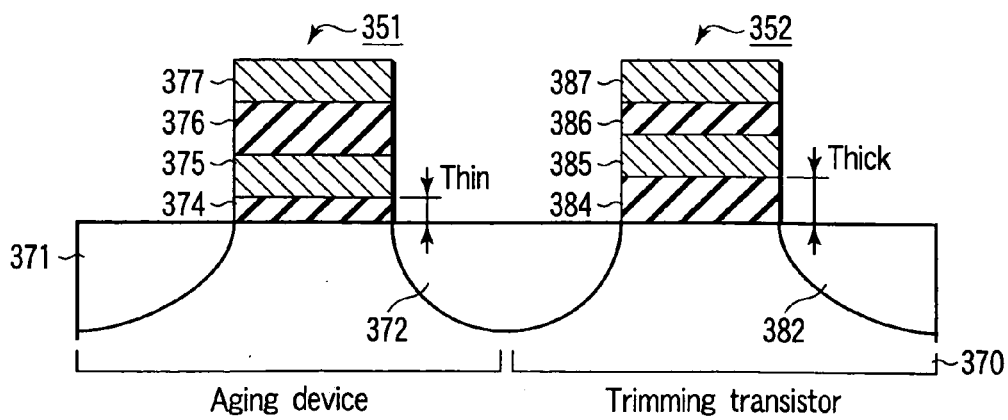
F I G. 109

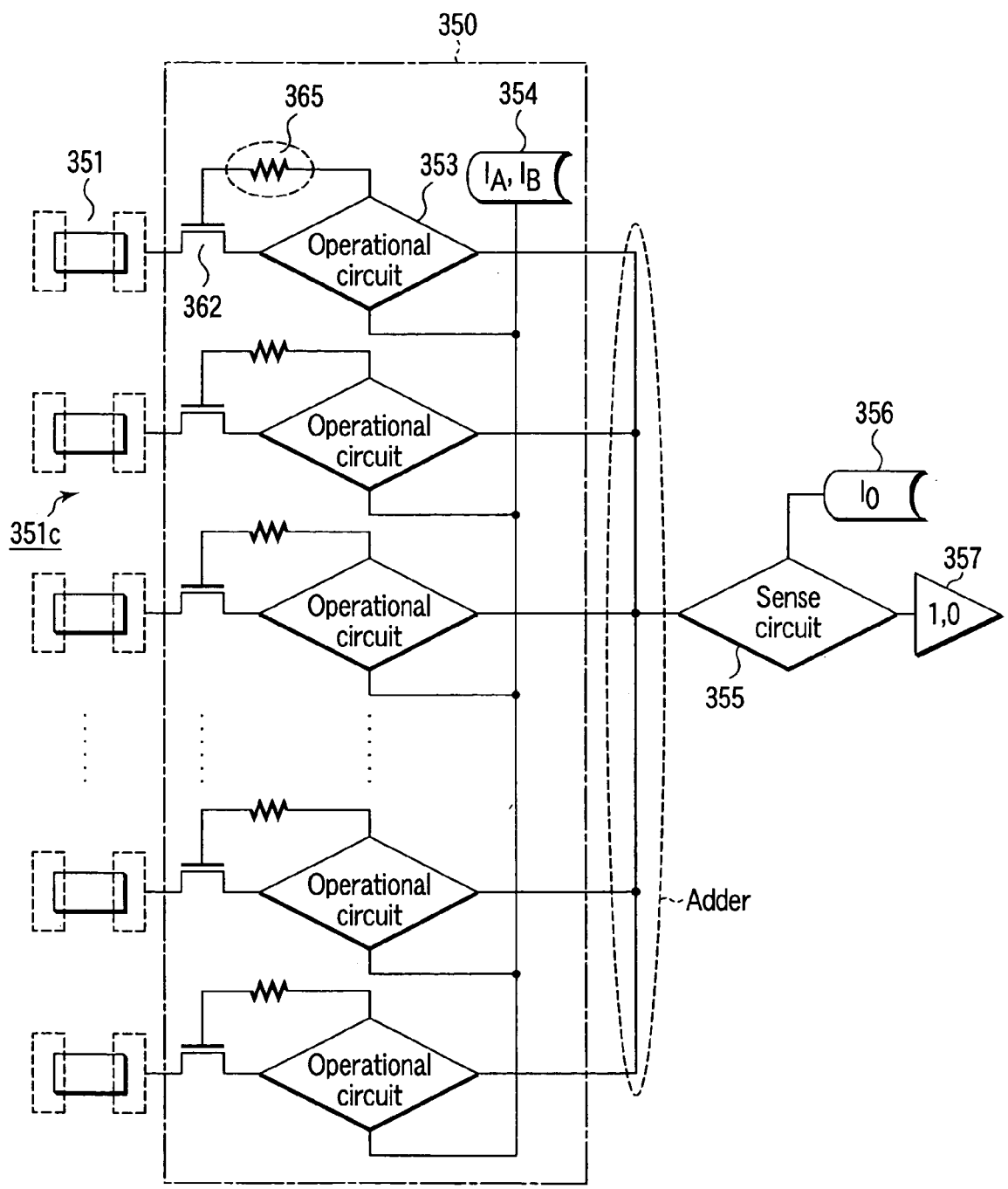
F I G. 105

$I_A$: Thick film edge    Parallelized    $I_D$

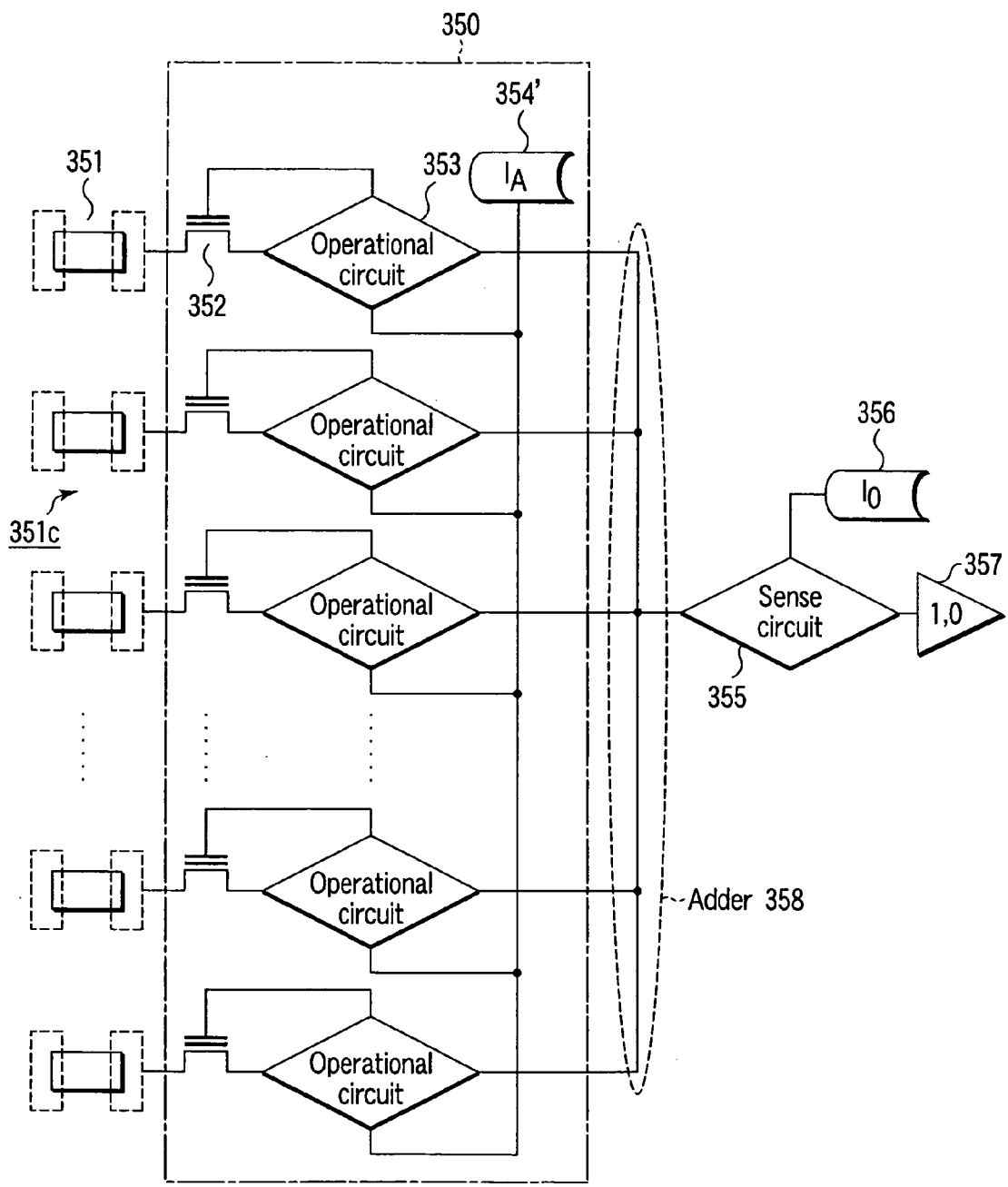
F I G. 112

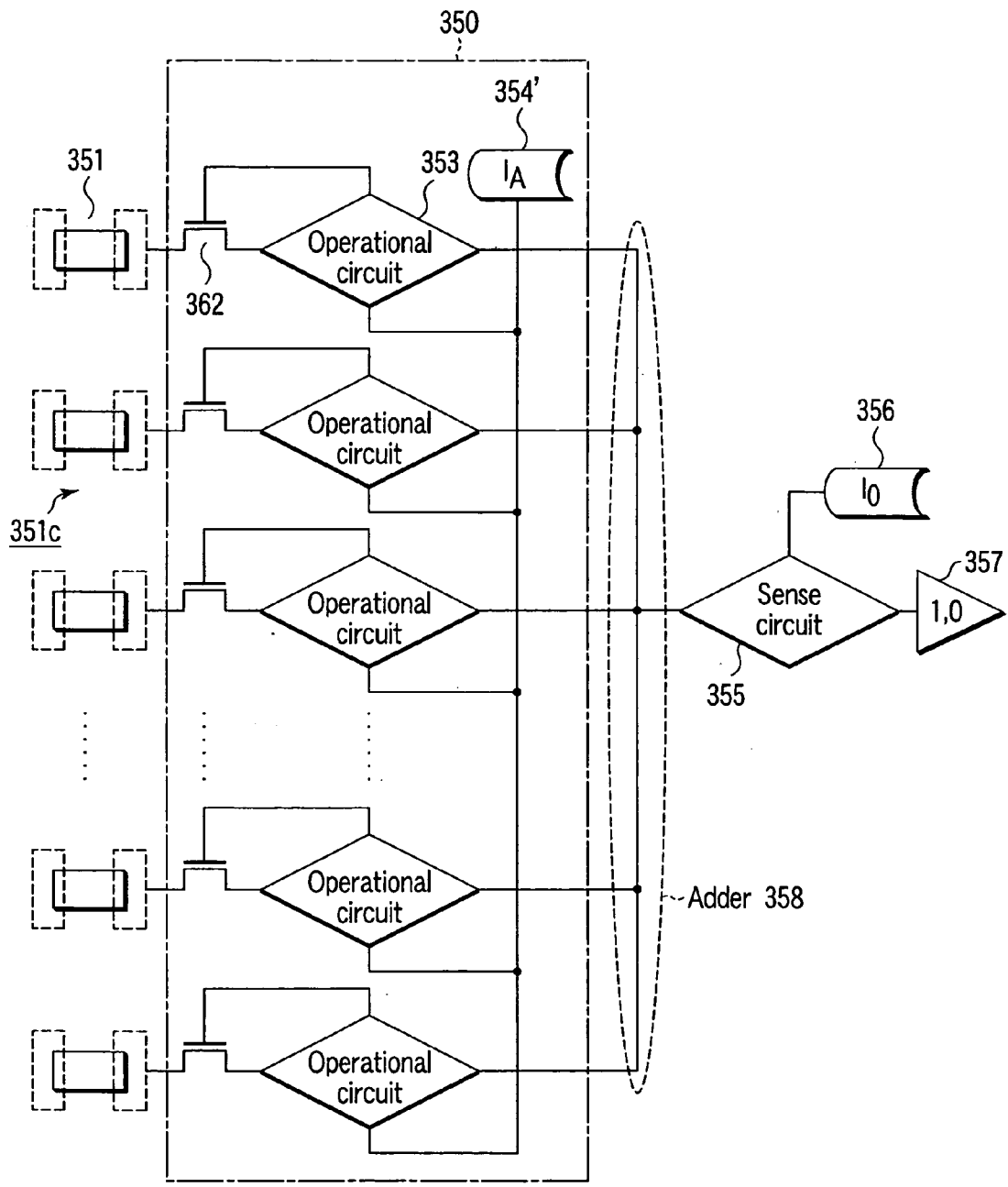
F I G. 113

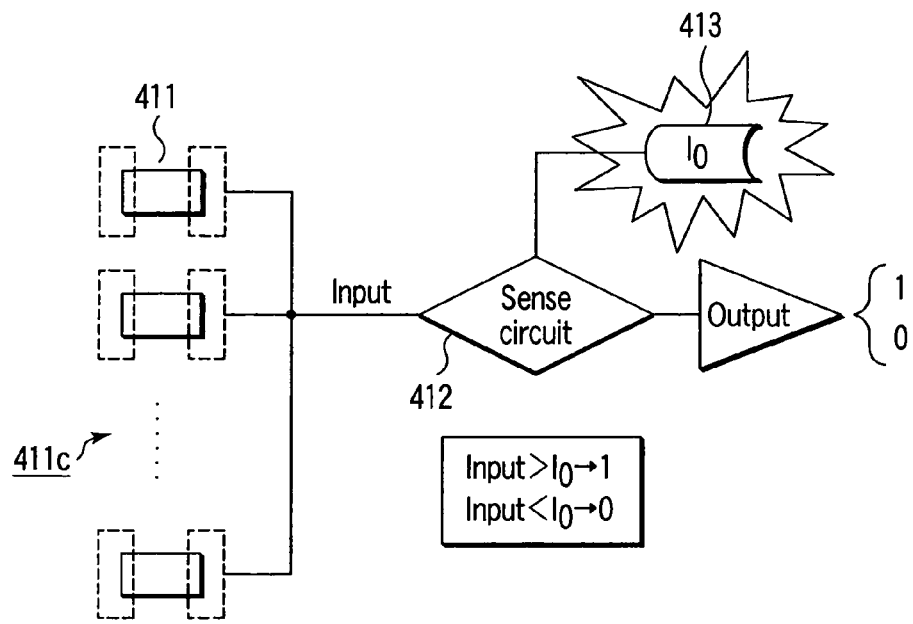
F I G. 114
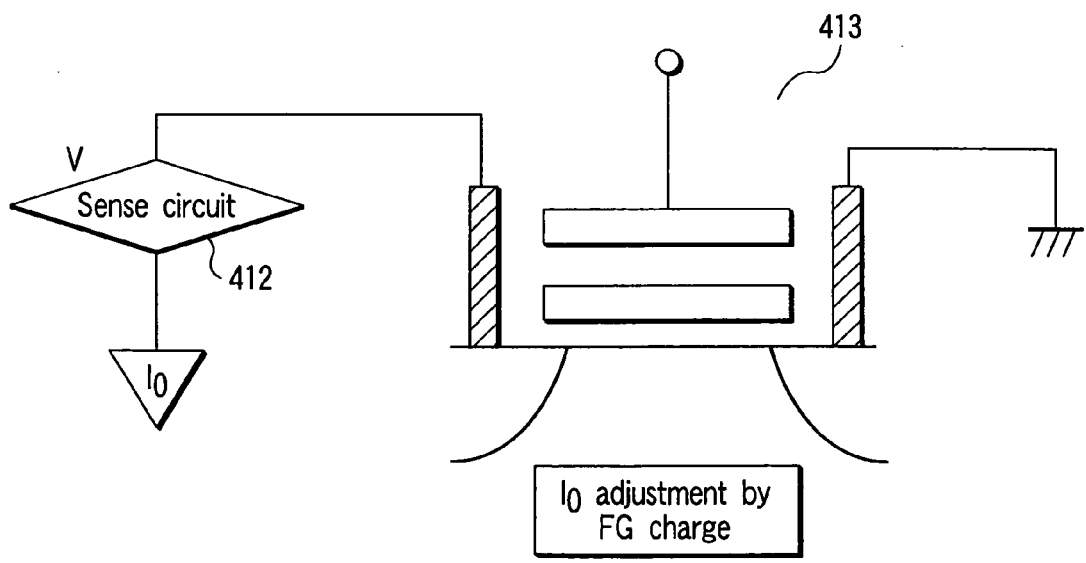
F I G. 115

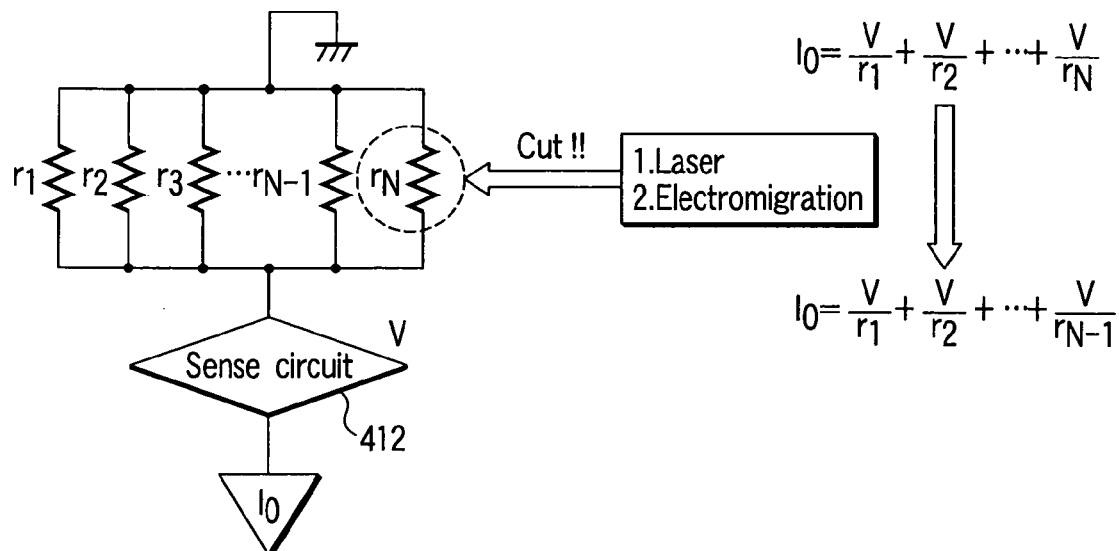
F I G. 116
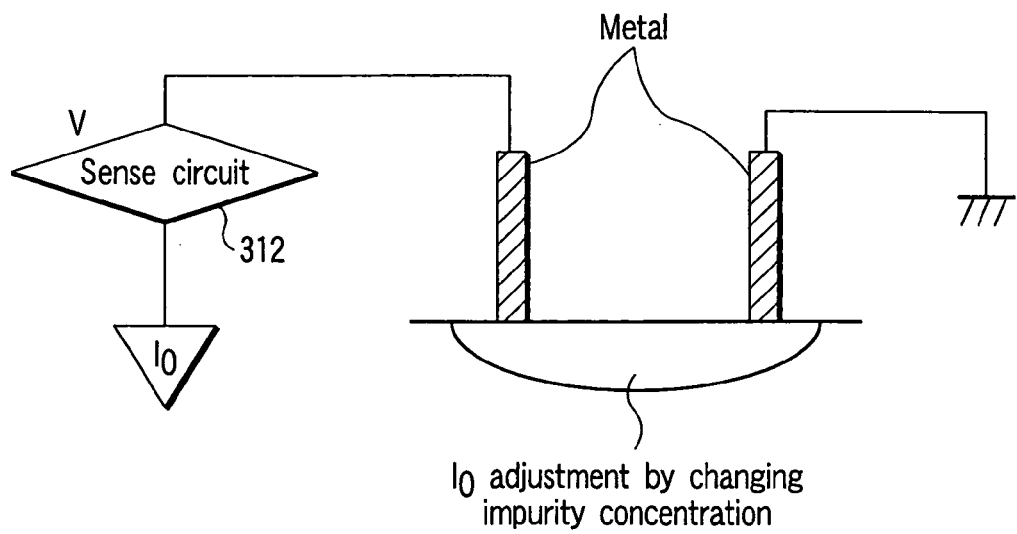
F I G. 117

TIME LIMIT FUNCTION UTILIZATION APPARATUS

CROSS-REFERENCE TO RELATED APPLICATIONS

The present application is a Continuation of U.S. application Ser. No. 10/612,405, filed Jul. 3, 2003, now U.S. Pat. No. 7,075,284 the entire contents of which is incorporated herein by reference.

This application is based upon and claims the benefit of priority from the prior Japanese Patent Applications No. 2002-198144, filed Jul. 8, 2002; No. 2002-336961, filed Nov. 20, 2002; and No. 2003-188792, filed Jun. 30, 2003, the entire contents of all of which are incorporated herein by reference.

BACKGROUND OF THE INVENTION

1. Field of the Invention

The present invention relates to a time limit function utilization apparatus, particularly, to a semiconductor integrated circuit formed from an age-based change device (aging device) whose output changes over time and a circuit technology controlling the life time of the aging device, more particularly, to an integrable electronic timer which accurately operates in an off-line state in which the timer is disconnected from a battery.

2. Description of the Related Art

A security system which sets an expiration date on a cipher or password has widely been used. For example, in satellite broadcasting, an expiration date is set on an encryption key, and the user is obligated to change the password at predetermined intervals, enhancing security.

For example, the following technique has been reported (see, e.g., Jpn. Pat. Appln. KOKAI Publication No. 10-189780). A nonvolatile semiconductor memory whose data holding life time is arbitrarily set is used for a memory card, commutation ticket, or the like. Data is held for a predetermined period, and after the lapse of the predetermined period, the data is deleted to inhibit the use of the memory card, commutation ticket, or the like.

The nonvolatile semiconductor memory determines the data holding life time by adjusting the atomic composition ratio in each gate insulating film of the nonvolatile memory which constitutes a memory. It is therefore difficult to reproduce an accurate holding life time. In order to form a plurality of memory areas with an arbitrarily set expiration date, memories having gate insulating films with different atomic composition ratios must be formed on a single substrate, which requires a complicated manufacturing method. Undesirably, the holding time can be easily prolonged by accessing a nonvolatile memory and refreshing data.

A technique capable of, even if power is cut, calculating and automatically setting the current time upon power-on again has also been reported (see, e.g., Jpn. Pat. Appln. KOKAI Publication No. 9-127271).

According to this technique, the lapsed time is measured by using a change in the threshold of a memory device such as an EPROM device. The lapsed time between power-off and the next power-on is calculated from a change in the threshold of the memory device, and added to the power-off time, obtaining the current time.

A time cell technique of determining the lapsed time from the discharge rate at which a charge accumulation element looses electrostatic charges via an insulator has also been reported. The time cell can be so programmed as to select a specific period to be measured (see, e.g., Jpn. Pat. Appln. KOKAI Publication No. 2002-246887).

The latter two techniques measure the lapsed time, detecting the threshold voltage change or the discharge rate change, by monitoring charge leakage from the floating gate of a memory cell. Thus, the two techniques are essentially the same and are said to be an age-bases change device (aging device).

A nonvolatile memory cell can be used as one means for implementing an electronic timer without any battery. An EEPROM with a two-layered gate structure of a floating gate and control gate generally has a charge holding function for almost 10 years. The charge holding period (life time) can be shortened by forming a tunnel oxide film as thin as 7 nm between the substrate and the floating gate. The precise control of the charge holding period can implement a battery-less electronic timer (BLET).

In an EEPROM of this type, if the film thickness of the tunnel oxide film varies in the manufacture, the life time greatly varies. For example, the film thickness for all bits is made to fall within an error of ±5% in a process for a 6-nm film thickness of the tunnel oxide film. At this time, as shown in FIG. 119, the gate leakage current which determines the life time of an aging device becomes 20 times larger for −5%, and becomes as small as ¹/₂₀ for +5%. Such great variations in leakage current lead to a large difference in the life time, which cannot be permitted in electronic timers.

This is a serious problem in manufacturing an aging device.

When an electronic timer without any battery is implemented using an aging device whose output changes over time, it is difficult to set an accurate operation time because manufacturing variations (of not only the tunnel oxide thickness but also other cell structure parameters) in aging device influence the life time.

Demands have arisen for the advent of a semiconductor integrated circuit capable of suppressing the influence of the presence of a false bit or manufacturing variations in aging device structure parameters (tunnel insulating film thickness, impurity concentration, junction area, gate end shape, and the like) on the life time of the aging device, imposing a time limit to the memory information, and enhancing the controllability of the electronic timer time.

BRIEF SUMMARY OF THE INVENTION

A time limit function utilization apparatus according to a first aspect of the present invention comprises a first functional block;

a second functional block;

a signal line which connects the first functional block and the second functional block and allows using a desired function that is generated by accessing the first functional block and the second functional block with each other; and a semiconductor time switch which is interposed in or connected to the signal line, and substantially disables or substantially enables mutual access between the first functional block and the second functional block upon a lapse of a first predetermined time.

A semiconductor integrated circuit according to a second aspect of the present invention comprises an aging circuit configured by parallel-connecting a plurality of aging devices in which an age-based change occurs while a power supply is disconnected, and an output signal sensed in read changes over time; and a sense circuit comparing the output signal from the aging circuit with a reference signal.

A semiconductor integrated circuit according to a third aspect of the present invention comprises a plurality of aging devices in which an age-based change occurs while a power supply is disconnected, and output signals sensed in read change over time;

a plurality of operational circuits arranged in correspondence with the plurality of aging devices, and having at least three terminals, respectively, first terminals of which receive the output signals from the plurality of aging devices;

a plurality of first memory areas electrically connected to second terminals of the plurality of operational circuits, respectively, and each storing at least one predetermined signal level;

an adder electrically connected to third terminals of the plurality of operational circuits and adding the output signals from the plurality of operational circuits appearing at the third terminals;

a plurality of circuit breakers which cut off output signals from the plurality of aging devices before the adder receives the output signal on the basis of operational results of the plurality of operational circuits that are obtained by comparing each of the output signals from the plurality of aging devices with the predetermined signal level;

a second memory area where a predetermined reference signal is stored, and a sense circuit which compares an output signal from the adder and the reference signal stored in the second memory.

BRIEF DESCRIPTION OF THE SEVERAL VIEWS OF THE DRAWING

FIG. 28 is a schematic view showing the section and connections of an aging device according to the 17th embodiment;

FIG. 29 is a schematic view showing the section and connections of an aging device according to the 18th embodiment;

FIG. 37 is a schematic view showing the section and connections of an aging device according to the 22nd embodiment;

FIG. 38 is a schematic view showing the section and connections of an aging device according to the 23rd embodiment;

FIG. 44 is a schematic view of the section and connections showing the operation method of the aging device according to the 26th embodiment;

FIG. 45 is a schematic view of the section and connections showing another operation method of the aging device according to the 26th embodiment;

FIGS. 46A and 46B are a schematic perspective view and plan view showing an aging device according to the 27th embodiment, respectively;

FIG. 47 is a schematic plan view showing the charge injection method of the aging device according to the 27th embodiment;

FIG. 48 is a schematic plan view showing the operation method of the aging device according to the 27th embodiment;

FIG. 49 is a schematic view showing the section and connections of an aging device according to the 28th embodiment;

FIG. 56 is a schematic sectional view showing the operation method of the aging device according to the 29th embodiment;

FIG. 57A is a schematic plan view showing an aging device according to the 30th embodiment;

FIG. 57B is a sectional view taken along the line 57B—57B in FIG. 57A;

FIG. 57C is a sectional view taken along the line 57C—57C in FIG. 57A;

FIG. 60A is a schematic sectional view for explaining still another charge injection method of the aging device according to the 30th embodiment;

FIG. 60B is a schematic sectional view for explaining the operation principle of the aging device shown in FIG. 60A;

FIG. 60C is a graph showing the aging device shown in FIG. 60A and the life time characteristic;

FIG. 61A is a schematic sectional view for explaining still another charge injection method of the aging device according to the 30th embodiment;

FIG. 61B is a schematic sectional view for explaining the operation principle of the aging device shown in FIG. 61A;

FIG. 61C is a graph showing the aging device shown in FIG. 61A and the life time characteristic;

FIG. 66 is a circuit diagram showing an aging device according to the 35th embodiment;

FIG. 67 is a schematic view showing the section and connections of the aging device according to the 35th embodiment;

FIG. 68A is a plan view showing the aging device according to the 35th embodiment;

FIG. 68B is a sectional view taken along the line 68B—68B in FIG. 68A;

FIG. 69A is a plan view showing an aging device according to a modification to the 35th embodiment;

FIG. 69B is a sectional view taken along the line 69B—69B in FIG. 69A;

FIG. 70 is a circuit diagram showing an aging device according to the 36th embodiment;

FIG. 74 is a graph showing the junction area dependence of the life time;

FIG. 75 is a graph showing the impurity concentration dependence of the life time;

FIG. 90 is a table showing a list of methods of realizing "forget" and "remember";

FIG. 92 is a schematic sectional view showing the cell of an aging circuit according to the 38th embodiment in which normally-on and normally-off aging devices are series-connected so as to turn on the aging circuit only during a predetermined time;

FIG. 93 is a schematic plan view showing another aging circuit according to the 38th embodiment in which a plurality of normally-on aging devices are parallel-connected, a plurality of normally-off aging devices are parallel-connected, and then the parallel-connected portions are series-connected so as to turn on the aging circuit only during a predetermined time;

FIG. 96 is a view showing a method of realizing an aging flag;

FIG. 97A is a schematic view showing a modification to the 37th embodiment in which series-connected sets of aging devices are parallel-connected;

FIG. 97B is a graph for explaining improvement of the influence of variations in tunnel film thickness by the arrangement in FIG. 97A;

FIG. 102 is a view showing another circuit arrangement in which a trimming circuit is incorporated in a parallelized aging circuit;

FIG. 103 is a view showing an improvement of the circuit in FIG. 102 in which a memory storing a trimming result is accessibly arranged;

FIGS. 104A and 104B are views showing an example using a bipolar transistor as a trimming transistor;

FIG. 105 is a view showing an improvement of the circuit in FIG. 102 having a fuse (resistor) which is disconnected in accordance with a trimming result;

FIG. 106 is a view showing another improvement of the circuit in FIG. 102 having a fuse (resistor) which is disconnected in accordance with a trimming result;

FIG. 107 is a view showing still another improvement of the circuit in FIG. 102 having a fuse (resistor) which is disconnected in accordance with a trimming result;

FIG. 108 is a view showing an example in which trimming fuses (resistors) are arranged at two portions;

FIG. 109 is a sectional view showing an example in which the diffusion layers of an aging device and trimming transistor are shared with each other;

FIGS. 110A and 110B are graphs showing the concept of trimming which ignores a thin film edge;

FIGS. 111A and 111B are graphs showing a comparison between temporal changes in the sum of drain current before and after trimming;

FIG. 112 is a view showing an example of mounting a trimming circuit having no thin film edge;

FIG. 113 is a view showing another example of mounting a trimming circuit having no thin film edge;

FIG. 114 is a view showing a circuit arrangement for explaining a reference signal utilization method;

Figure 118:
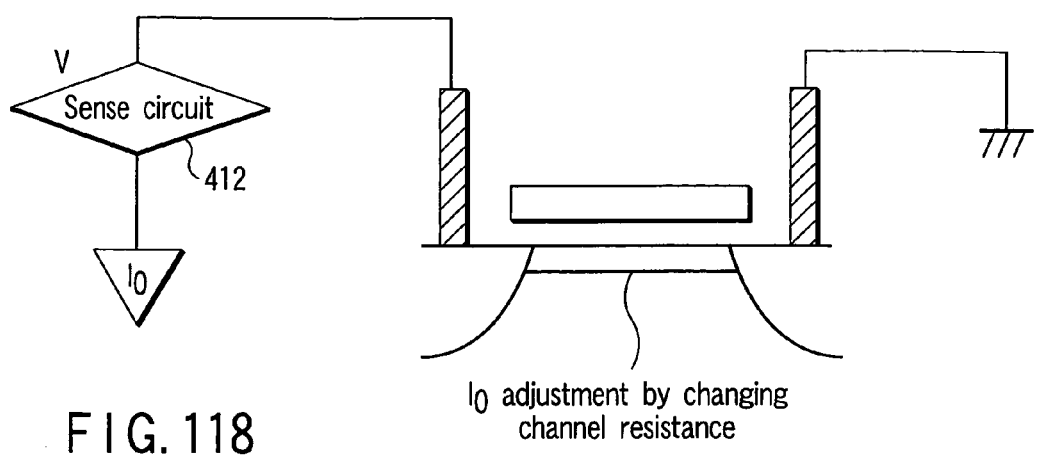

FIG. 115 is a view showing a tuning method using a flash memory;

FIG. 116 is a view showing a tuning method using parallel thin wires;

FIG. 117 is a view showing a tuning method using a diffusion layer;

FIG. 118 is a view showing a tuning method using a gate clamp; and

Figure 119:
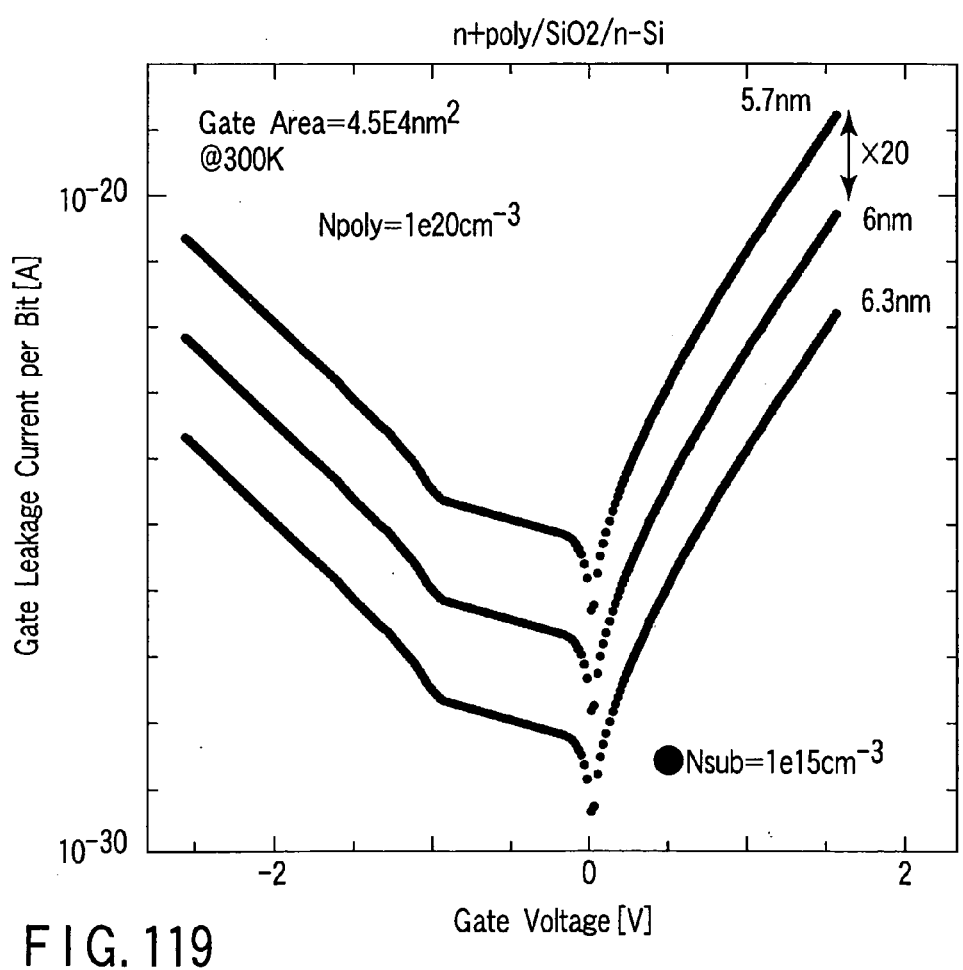

FIG. 119 is a graph showing the influence of variations in tunnel insulating film thickness on the gate leakage current.

DETAILED DESCRIPTION OF THE INVENTION

Embodiments of the present invention will be described in detail below with reference to the several views of the accompanying drawing. The present invention is not limited to the following embodiments, and can be variously modified.

(First Embodiment)

Figure 1:
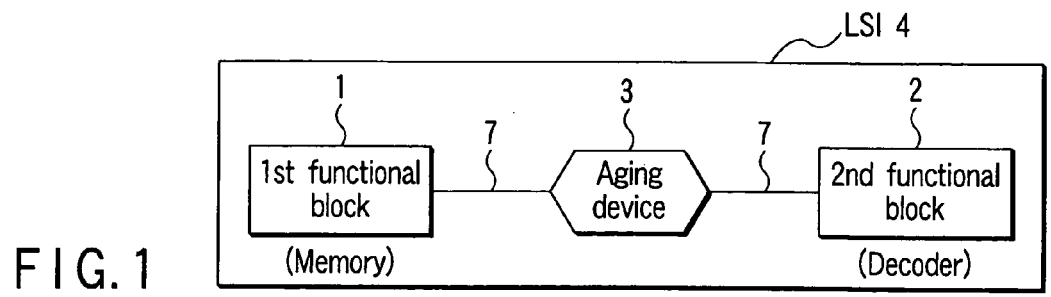
FIG. 1 is a conceptual view showing a time limit utilization apparatus according to the first embodiment of the present invention.

As shown in FIG. 1, the first embodiment comprises an integrated circuit (LSI) 4 in which a memory area (memory)

serving as the first functional block 1, a decoder which serves as the second functional block 2 and reads out information from the memory area, and a semiconductor time switch (automatic turn-off aging device) 3 which is connected between the memory 1 and the decoder 2 via the signal line 7 and turned off upon the lapse of a predetermined time are integrated.

As shown in FIG. 1, the aging device 3 is interposed between the memory 1 and the decoder 2. In this case, one terminal of the aging device 3 is connected to the memory 1, and the other terminal is connected to the decoder 2. The decoder 2 and memory 1 can access each other.

The aging device 3 is turned off upon the lapse of a predetermined time, and the memory 1 and decoder 2 are disconnected from each other. The decoder 2 cannot access the memory 1, and the LSI 4 malfunctions. For example, when the memory 1 stores a decryption key for decrypting a cipher, the decoder 2 cannot read the decryption key stored in the memory 1, and a time limit cipher is implemented.

(Second Embodiment)

Figure 2:
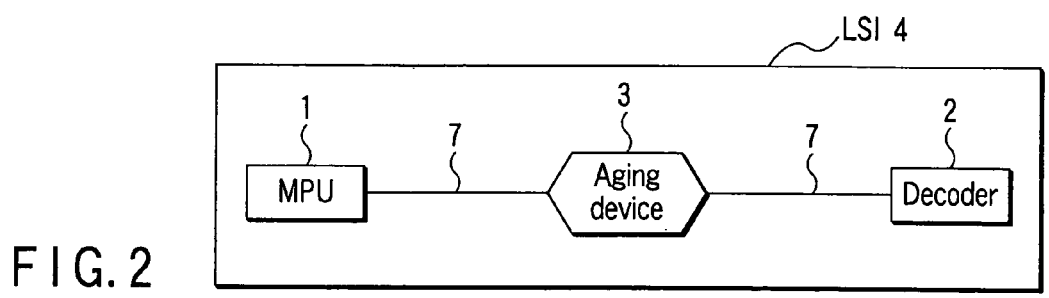
FIG. 2 is a conceptual view showing a time limit utilization apparatus according to the second embodiment.

As shown in FIG. 2, the second embodiment comprises an integrated circuit (LSI) 4 in which an operational area (micro-processor unit (MPU)) 1 serving as the first functional block, a decoder 2 serving as the second functional block, and a semiconductor time switch (aging device) 3 which is connected between the MPU 1 and the decoder 2 via the signal line 7 and turned off upon the lapse of a predetermined time are integrated.

As shown in FIG. 2, the aging device 3 is interposed between the MPU 1 and the decoder 2. In this case, one terminal of the aging device 3 is connected to the MPU 1, and the other terminal is connected to the decoder 2. The MPU 1 and decoder 2 can access each other.

The aging device 3 is turned off upon the lapse of a predetermined time, and the MPU 1 and decoder 2 are disconnected from each other. The MPU 1 and decoder 2 cannot access each other, and the LSI 4 malfunctions. For example, encryption information decrypted by the MPU 1 cannot be read by the decoder 2, and a time limit cipher is implemented.

(Third Embodiment)

Figure 3:
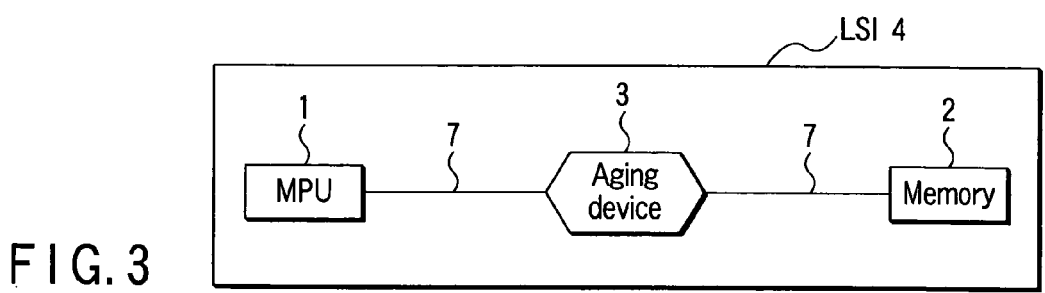
FIG. 3 is a conceptual view showing a time limit utilization apparatus according to the third embodiment.

As shown in FIG. 3, the third embodiment comprises an integrated circuit (LSI) 4 in which an operational area (MPU) 1 serving as the first functional block, a memory area (memory) 2 serving as the second functional block, and a semiconductor time switch (aging device) 3 which is connected between the MPU 1 and the memory 2 via the signal line 7 and turned off upon the lapse of a predetermined time are integrated.

As shown in FIG. 3, the aging device 3 is interposed between the MPU 1 and the memory 2. In this case, one terminal of the aging device 3 is connected to the MPU 1, and the other terminal is connected to the memory 2. The MPU 1 and memory 2 can access each other.

The aging device 3 is turned off upon the lapse of a predetermined time, and the MPU 1 and memory 2 are disconnected from each other. The MPU 1 and memory 2 cannot access each other, and the LSI 4 malfunctions. For example, the MPU 1 cannot read a decryption key stored in the memory 2, and a time limit cipher is implemented.

(Fourth Embodiment)

Figure 4:
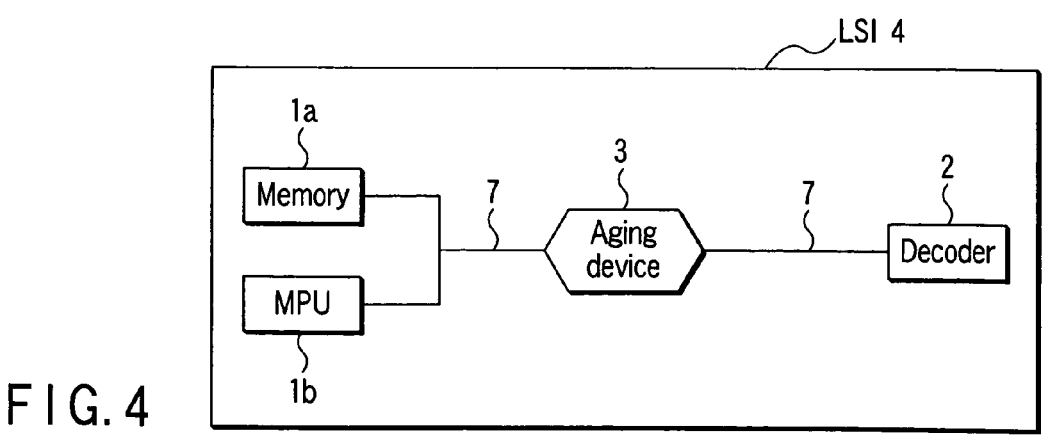
FIG. 4 is a conceptual view showing a time limit utilization apparatus according to the fourth embodiment.

As shown in FIG. 4, the fourth embodiment comprises an integrated circuit (LSI) 4 in which a memory area (memory) 1*a* and operational area (MPU) 1*b* serving as the first functional block, a decoder 2 serving as the second functional block, and a semiconductor time switch (aging device) 3 which is connected between the memory 1*a* and MPU 1*b* and the decoder 2 via the signal line 7 and turned off upon the lapse of a predetermined time are integrated.

As shown in FIG. 4, the aging device 3 is interposed between the memory 1*a* and MPU 1*b* and the decoder 2. In this case, one terminal of the aging device 3 is connected to the memory 1*a* and MPU 1*b*, and the other terminal is connected to the decoder 2. The memory 1*a* and MPU 1*b* and decoder 2 can access each other.

The aging device 3 is turned off upon the lapse of a predetermined time, and the memory 1*a* and MPU 1*b* and the decoder 2 are disconnected from each other. The memory 1*a* and MPU 1*b* and the decoder 2 cannot access each other, and the LSI 4 malfunctions. For example, a decryption key stored in the memory 1*a* cannot be read by the decoder 2. Alternatively, a cipher text decrypted by the MPU 1*b* using the decryption keys stored in the memory 1*a* cannot be read by the decoder 2, and a time limit cipher is implemented.

(Fifth Embodiment)

Figure 5:
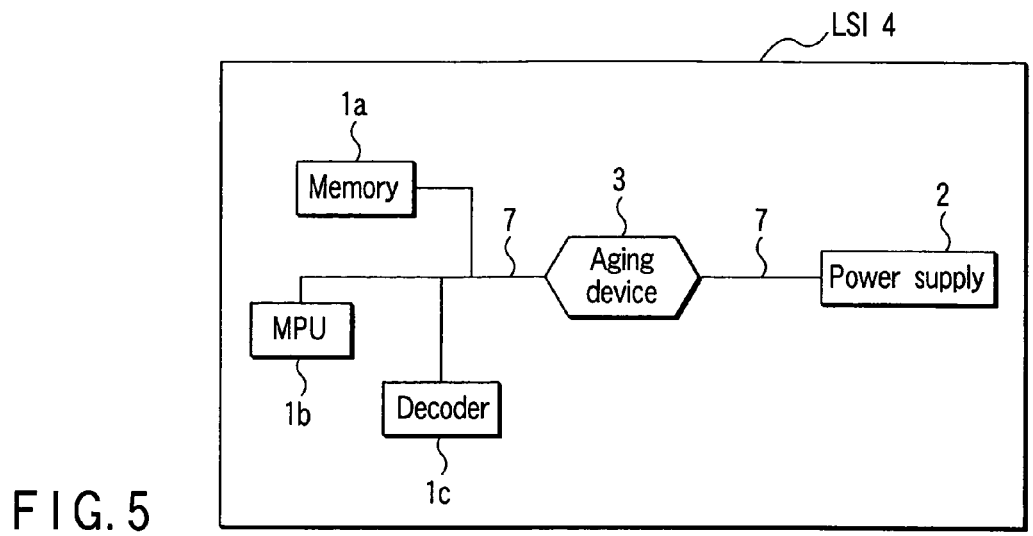
FIG. 5 is a conceptual view showing a time limit utilization apparatus according to the fifth embodiment.

As shown in FIG. 5, the fifth embodiment comprises an integrated circuit (LSI) 4 in which a memory area (memory) 1*a*, operational area (MPU) 1*b*, and decoder 1*c* serving as the first functional block, a power supply 2 serving as the second functional block, and a semiconductor time switch (aging device) 3 which is connected between the memory 1*a*, MPU 1*b*, and decoder 1*c* and the power supply 2 via the signal line 7 and turned off upon the lapse of a predetermined time (life time) are integrated.

As shown in FIG. 5, the aging device 3 is interposed between the memory 1*a*, MPU 1*b*, and decoder 1*c* and the power supply 2. In this case, one terminal of the aging device 3 is connected to the memory 1*a*, MPU 1*b*, and decoder 1*c*, and the other terminal is connected to the power supply 2. The memory 1*a*, MPU 1*b*, and decoder 1*c* receive power from the power supply 2.

The aging device 3 is turned off upon the lapse of a predetermined time, and the memory 1*a*, MPU 1*b*, and decoder 1*c* and the power supply 2 are disconnected from each other. The memory 1*a*, MPU 1*b*, and decoder 1*c* do not receive any power from the power supply 2, and the LSI 4 malfunctions.

Figure 76:
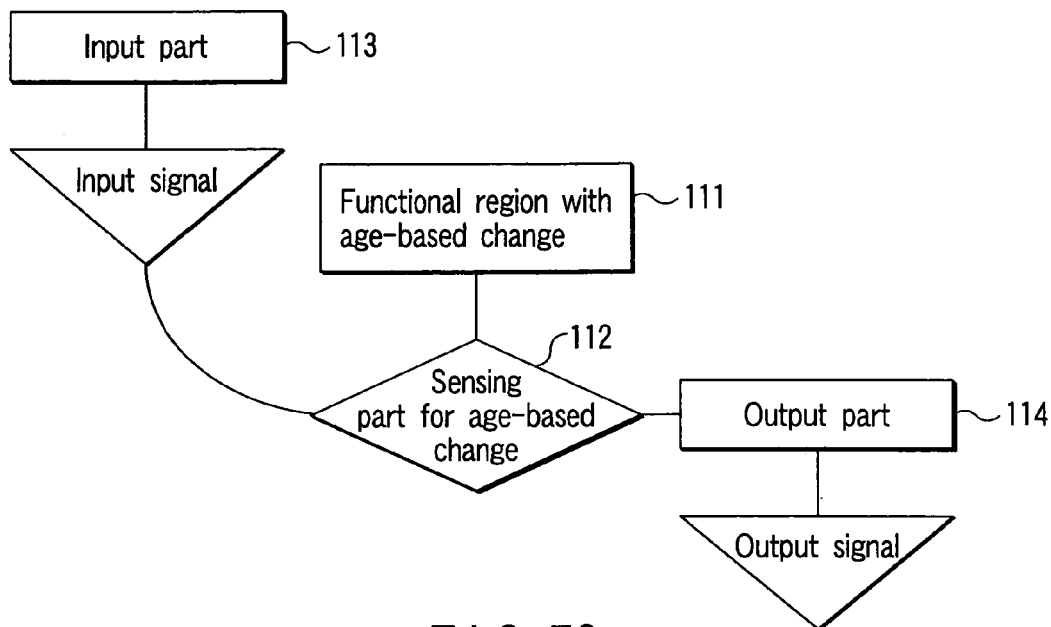
FIG. 76 is a view showing the basic arrangement of an aging device.

In the fifth embodiment, the aging device 3 are connected to the power supply 2. Note that this is different from the configuration in which the functional region 111 with age-based change depicted in FIG. 76 is connected to a power supply. Therefore, the age-based change characteristics of the aging device of this embodiment are not influenced by the power supply 2. This applies to the sixth and seventh embodiments as well.

(Sixth Embodiment)

Figure 6:
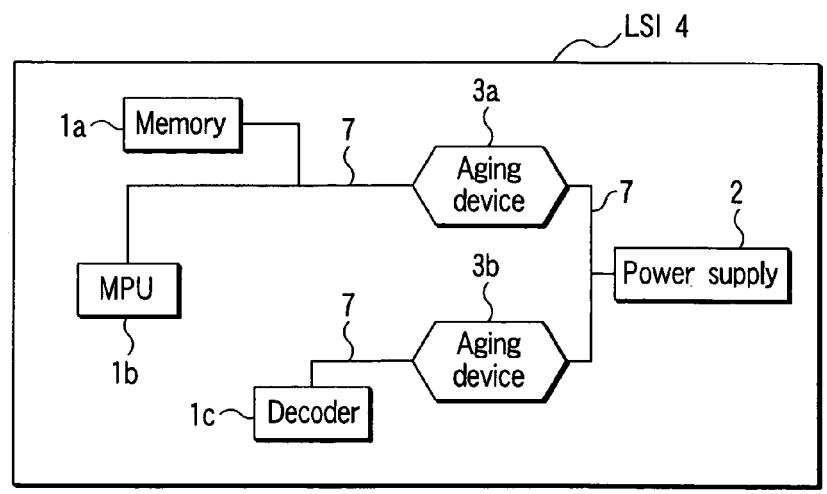
FIG. 6 is a conceptual view showing a time limit utilization apparatus according to the sixth embodiment.

As shown in FIG. 6, the sixth embodiment comprises an integrated circuit (LSI) 4 in which a memory area (memory) 1*a* and operational area (MPU) 1*b* serving as the first functional block, a power supply 2 serving as the second functional block, a 1st semiconductor time switch (aging device) 3*a* which is connected between the memory 1*a* and MPU 1*b* and the power supply 2 via the signal line 7 and turned off upon the lapse of a predetermined time (life time), a decoder 1*c* serving as the first functional block, and a 2nd semiconductor time switch (aging device) 3*b* which is connected between the decoder 1*c* and the power supply 2 via the signal line 7 and turned off upon the lapse of a predetermined time (life time) are integrated. If the life time of the aging device 3a is different from that of the aging device 3b, the function of LSI 4 is stepwise lost.

As shown in FIG. 6, the 1st aging device 3a is interposed between the memory 1a and MPU 1b and the power supply 2. In this case, one terminal of the 1st aging device 3a is connected to the memory 1a and MPU 1b, and the other terminal is connected to the power supply 2. The memory 1a and MPU 1b receive power from the power supply 2. The 2nd aging device 3b is interposed between the decoder 1c and the power supply 2. In this case, one terminal of the 2nd aging device 3b is connected to the decoder 1c, and the other terminal is connected to the power supply 2. The decoder 1c receives power from the power supply 2.

The 1st and 2nd aging devices 3a and 3b are turned off upon the lapse of a predetermined time, and the memory 1a and MPU 1b and the power supply 2 are disconnected from each other. Also, the decoder 1c and power supply 2 are disconnected from each other. The memory 1a, MPU 1b, and decoder 1c do not receive any power from the power supply 2, and the LSI 4 malfunctions.

(Seventh Embodiment)

Figure 7:
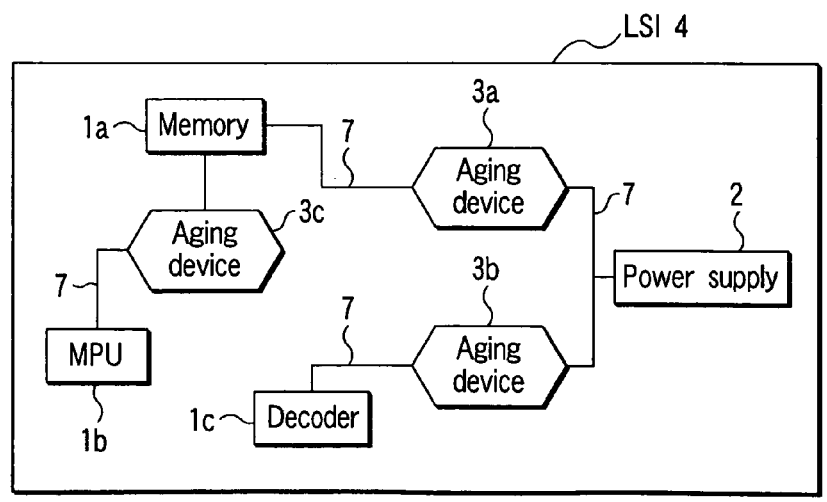
FIG. 7 is a conceptual view showing a time limit utilization apparatus according to the seventh embodiment.

As shown in FIG. 7, the seventh embodiment comprises an integrated circuit (LSI) 4 in which a memory area (memory) 1a serving as the first functional block, a power supply 2 serving as the second functional block, a 1st semiconductor time switch (aging device) 3a which is connected between the memory 1a and the power supply 2 via the signal line 7 and turned off upon the lapse of a predetermined time, a decoder 1c serving as the first functional block, and a 2nd semiconductor time switch (aging device) 3b which is connected between the decoder 1c and the power supply 2 via the signal line 7 and turned off upon the lapse of a predetermined time are integrated. Further, an operational area (MPU) 1b is connected to the memory 1a via a 3rd aging device 3c on the LSI 4.

As shown in FIG. 7, the 1st aging device 3a is interposed between the memory 1a and the power supply 2. In this case, one terminal of the 1st aging device 3a is connected to the memory 1a, and the other terminal is connected to the power supply 2. The memory 1a receives power from the power supply 2. The MPU 1b is connected to the power supply 2 via the 3rd aging device 3c, memory 1a, and 1st aging device 3a, and receives power from the power supply 2. The 2nd aging device 3b is interposed between the decoder 1c and the power supply 2. In this case, one terminal of the 2nd aging device 3b is connected to the decoder 1c, and the other terminal is connected to the power supply 2. The decoder 1c receives power from the power supply 2.

The 1st, 2nd, and 3rd aging devices 3a, 3b, and 3c are turned off upon the lapse of a predetermined time (life time), and the memory 1a and MPU 1b are disconnected from each other. Also, the memory 1a and MPU 1b are disconnected from the power supply 2. The decoder 1c and power supply 2 are disconnected from each other. The memory 1a, MPU 1b, and decoder 1c do not receive any power from the power supply 2, the MPU 1b and memory 1a cannot access each other, and the LSI 4 malfunctions.

In the above-mentioned embodiments, an automatic turn-off aging device (normally-off type) is used such that an aging device is connected between a plurality of functional blocks, and automatically disconnects the functional blocks upon the lapse of a predetermined period (life time). To the contrary, an automatic turn-on aging device (normally-on type) which automatically connects functional blocks upon the lapse of a predetermined period (life time) can be applied to the first to seventh embodiments.

In that case, LSI 4, which has not been functional before the predetermined time (life time) elapse, recovers the function after the predetermined time. As mentioned later in the 38th embodiment, it is possible to realize an aging device rendered "on" only during a predetermined period (for example, τA to τB). In this case, the access between the first functional block 1 and the second functional block 2 is made possible only during τA and τB, thereby enabling to set a period when the function of LSI 4 is effective. To the contrary, it is also possible to realize an aging device rendered "off" only during a predetermined period (for example, τA to τB). In this case, the access between the first functional block 1 and the second functional block 2 is made impossible only during τA and τB, thereby enabling to set a period when the function of LSI 4 is ineffective.

Thus, generally speaking, the function of LSI 4 can be changed with the lapse of time by changing the access condition between the first functional block 1 and the second functional block 2 with the lapse of time. Moreover, the access condition abovementioned can be an intensity of the signal on the signal line 7 between the first functional block 1 and the second functional blocks 2. This means that the intensity of the signal on the signal line 7 changes with the lapse of time. For example, if the first functional block 1 is a signal generator and the second functional block is a signal sensing part, the signal sensed at the signal sensing part is changed with the lapse of time owing to the aging device.

Thus, according to the aging device of the present embodiment, the access condition between the first functional block 1 and the second functional block 2 can be changed with the laps of time. The age-based change can be optionally determined by a user, or can be set as in a binary fashion, that is, "on" to "off", or "off" to "on". From this point of view, the aging device of this invention can be regarded as an age-based change device (precisely explained later). An aging circuit in which a plurality of the aging devices are connected in parallel can be used as a time switch (precisely explained later).

A time limit function utilization apparatus of bridging type, that is, in which a semiconductor time switch is interposed between a first functional block and a second functional block, has been explained. Hereinafter, in the 8th to 13th embodiments, a time limit function utilization apparatus of clamping type, that is, in which a semiconductor time switch is connected to the signal line between a first functional block and a second functional block, will be explained. To prevent the duplicated explanation, in the 8th to 13th embodiments, only an automatic turn-on type (normally-on type) aging device is exemplified. However, an automatic turn-off type aging device can be used instead.

More specifically, in the eighth to 13th embodiments, the first functional block connected to an input/output terminal and the second functional block as an internal circuit which stores information or a function are connected via a signal line. An automatic turn-on (normally-on type) aging device which is turned on upon the lapse of a predetermined time is connected between the signal line and ground, another signal line, a power supply line, or another internal circuit (third functional block).

An input/output terminal 5 in the eighth to 13th embodiments can be connected to the first functional block in the first to seventh embodiments. An internal circuit 6 is equivalent to the second functional block. A plurality of functional blocks may be connected to the input/output terminal 5 as the first functional blocks and a plurality of the internal circuits 6 may be provided as the second functional blocks.

(Eighth Embodiment)

Figure 8:
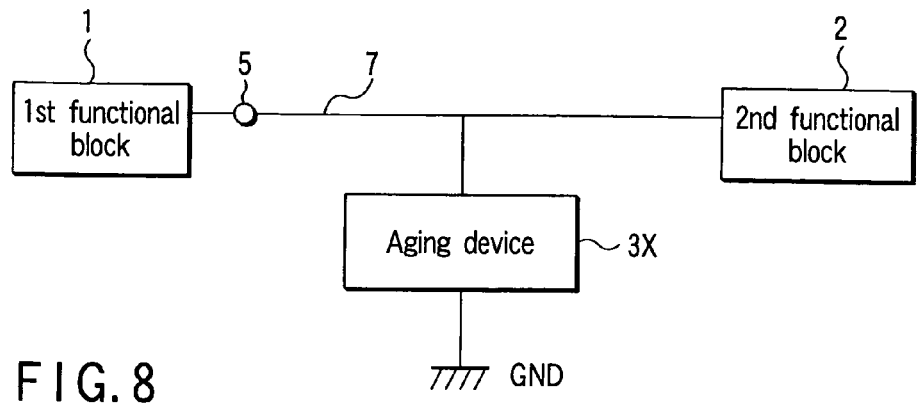
FIG. 8 is a conceptual view showing a time limit utilization apparatus according to the eighth embodiment.

In the eighth embodiment, as shown in FIG. 8, the first functional block 1 and the second functional block 2 are connected via a signal line 7. An automatic turn-on aging device 3X which is turned on upon the lapse of a predetermined time is connected between the signal line 7 and ground (GND) (which may be another signal line or a power supply line).

With this arrangement, the potential of the signal line 7 is clamped to the potential of GND (or another signal line or a power supply line), and no signal propagates between the first functional block 1 and the second functional block 2. This function can set time limit information or a time limit function which is stored in the second functional block 2.

In this embodiment, an automatic turn-off device can be used instead of the automatic turn-on aging device 3X.

(Ninth Embodiment)

Figure 9:
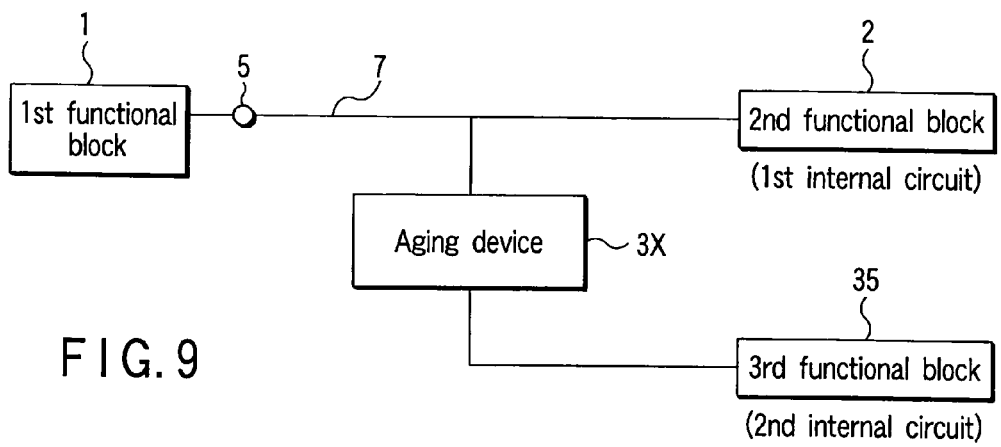
FIG. 9 is a conceptual view showing a time limit utilization apparatus according to the ninth embodiment.

In the ninth embodiment, as shown in FIG. 9, a first functional block 1 and a second functional block (1st internal circuit) 2 are electrically connected at first. Upon the lapse of a predetermined time, an automatic turn-on aging device 3X is turned on to electrically connect an input/output terminal (to be referred to an I/O terminal hereinafter) 5 to a third functional block 35 (2nd internal circuit) 35. The first functional block 1 is connected to the I/O Terminal 5. This applies a disturbance to a signal between the 2nd functional block (1st internal circuit) 2 and the I/O terminal 5, inhibiting the use of information or a function which is stored in the 2nd functional block (1st internal circuit) 2 upon the lapse of a predetermined time.

Alternatively, a signal from the third functional block (2nd internal circuit) 35 may be added to a signal from the second functional block (1st internal circuit) 2 to output the sum upon the lapse of a predetermined time. The same signal may be input from the first functional block 1 to the second and third functional blocks 2 and 35 via I/O terminal 5 upon the lapse of a predetermined time.

In this embodiment, an automatic turn-off device can be used instead of the automatic turn-on aging device 3X.

(10th Embodiment)

Figure 10:
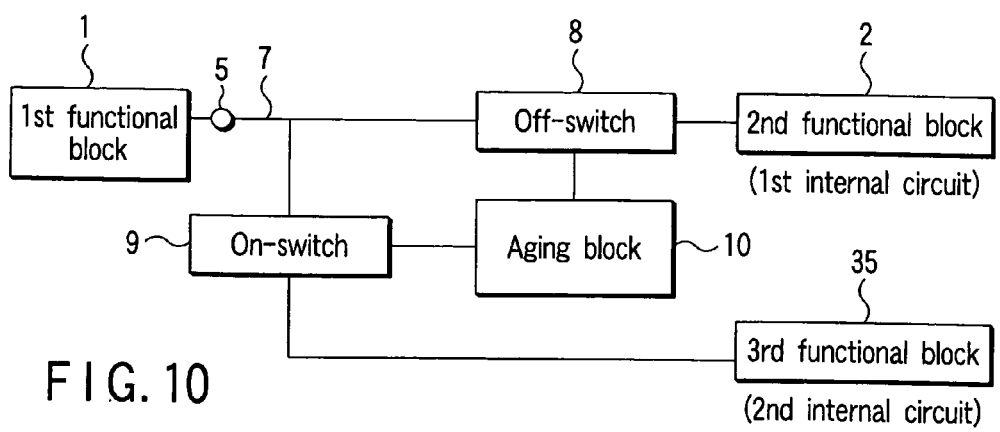
FIG. 10 is a conceptual view showing a time limit utilization apparatus according to the 10th embodiment.

In the 10th embodiment, as shown in FIG. 10, an off-type switch 8 is connected between an I/O terminal 5 to which a first functional block is connected and a second functional block (1st internal circuit) 2, and an on-type switch 9 is connected between the I/O terminal 5 and a third functional block (2nd internal circuit) 35. An aging block 10 is connected to the off-type switch 8 and on-type switch 9. Upon the lapse of a predetermined time, the off-type switch 8 is turned off from an on state by an output from the automatic turn-on aging block 10, and the on-type switch 9 is turned on from an off state.

The aging block 10 is essentially same as the aging device 3X, but some circuit elements are added to the aging device to stabilize operation, which will be explained in the 36th embodiment.

With this circuit arrangement, a signal propagates between the I/O terminal 5 and the third functional block (2nd internal circuit) 35 upon the lapse of a predetermined time. That is, information or a function in the internal circuit when viewed from the I/O terminal 5 can be automatically switched upon the lapse of a predetermined time. The functional blocks (internal circuits) 2 and 35 may share part of the circuits.

In this embodiment, it is possible to change the off-type switch 8 to an on-type switch, the on-type switch 9 to an off-switch, and the automatic turn-on aging block to an automatic turn-off aging block. In other words, it is possible to exchange the polarity of a switch or an aging block "on" to "off", or "off" to "on".

(11th Embodiment)

Figure 11:
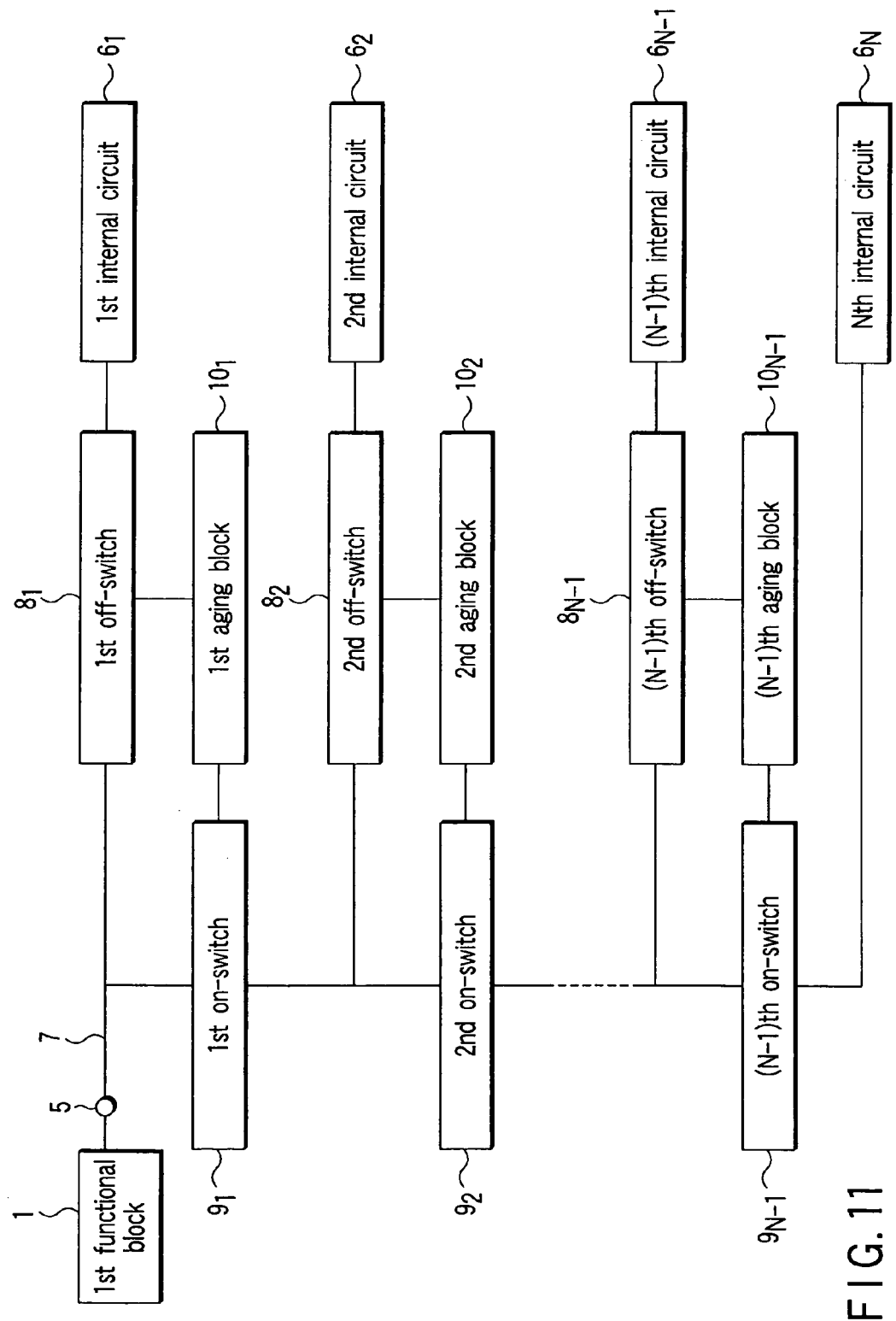
FIG. 11 is a conceptual view showing a time limit utilization apparatus according to the 11th embodiment.

As shown in FIG. 11, the 11th embodiment adopts N (N is a natural number) internal circuits corresponding to a second functional block, (N−1) automatic turn-on aging blocks, (N−1) off-type switches, and (N−1) on-type switches. An nth (n is a natural number: $1 \leq n \leq N$) off-type switch $8_n$ is connected to an nth internal circuit $6_n$. An nth on-type switch $9_n$ is connected between the nth off-type switch $8_n$ and an (n+1)th off-type switch $8_{(n+1)}$. The output line of an nth aging block $10_n$ is connected between the nth off-type switch $8_n$ and the nth on-type switch $9_n$. Aging blocks $10_n$ operate sequentially in numerical order of the first, second, third blocks and so on, and turns off a corresponding off-type switch from an on state and on a corresponding on-type switch from an off state.

With this circuit arrangement, information or a function in the internal circuit which can be used from the I/O terminal 5 to which a first functional block is connected can be changed stepwise. The internal circuits 6 may share part of the circuits.

In this embodiment, it is possible to change the off-type switch $8_n$ to an on-type switch, the on-type switch $9_n$ to an off-switch, and the automatic turn-on aging block to an automatic turn-off aging block. In other words, it is possible to exchange the polarity of a switch or an aging block "on" to "off", or "off" to "on".

(12th Embodiment)

Figure 12:
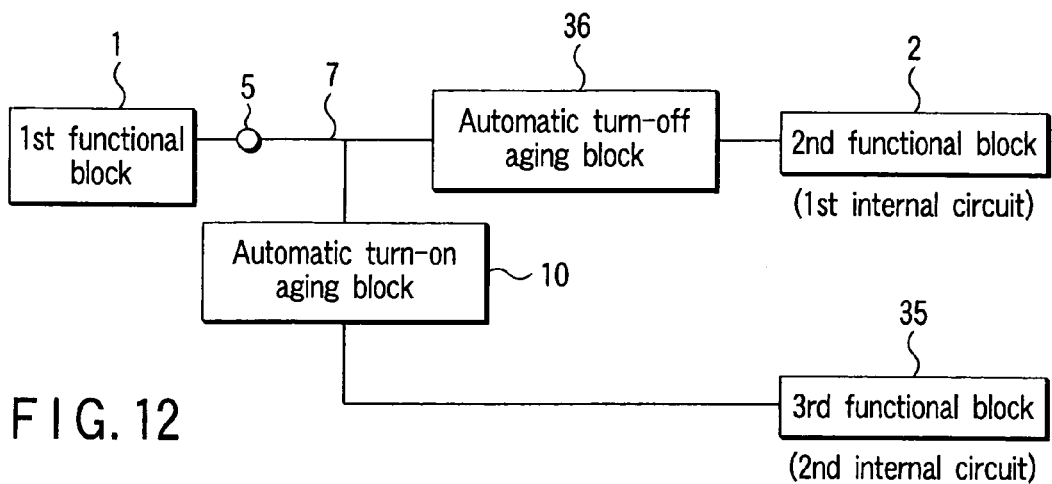
FIG. 12 is a conceptual view showing a time limit utilization apparatus according to the 12th embodiment.

In the 12th embodiment, as shown in FIG. 12, an automatic turn-off aging block 36 is connected between an I/O terminal 5 to which a first functional block is connected and a second functional block (1st internal circuit) 2, and an automatic turn-on aging block 10 is connected between the I/O terminal 5 and the third functional block (2nd internal circuit) 35. Upon the lapse of a predetermined time, the automatic turn-off aging block 36 is turned off, and the automatic turn-on aging block 10 is turned on.

With this circuit arrangement, a signal propagates between the I/O terminal 5 and the third functional block (2nd internal circuit) 35 upon the lapse of a predetermined time. That is, information or a function in the internal circuit when viewed from the I/O terminal 5 can be automatically switched upon the lapse of a predetermined time.

In the circuit arrangement of the 10th embodiment (FIG. 10), the second and third functional blocks 2 and 35 are simultaneously switched upon the lapse of a predetermined time. In the 12th embodiment, information or a function in the third functional block 35 can be used a predetermined time after the second functional block becomes unavailable. The internal circuits may share part of the circuits.

In this embodiments, the switch polarity of the automatic turn-off aging block $36_n$ and the automatic turn-on aging block $10_n$ may be reversed.

(13th Embodiment)

Figure 13:
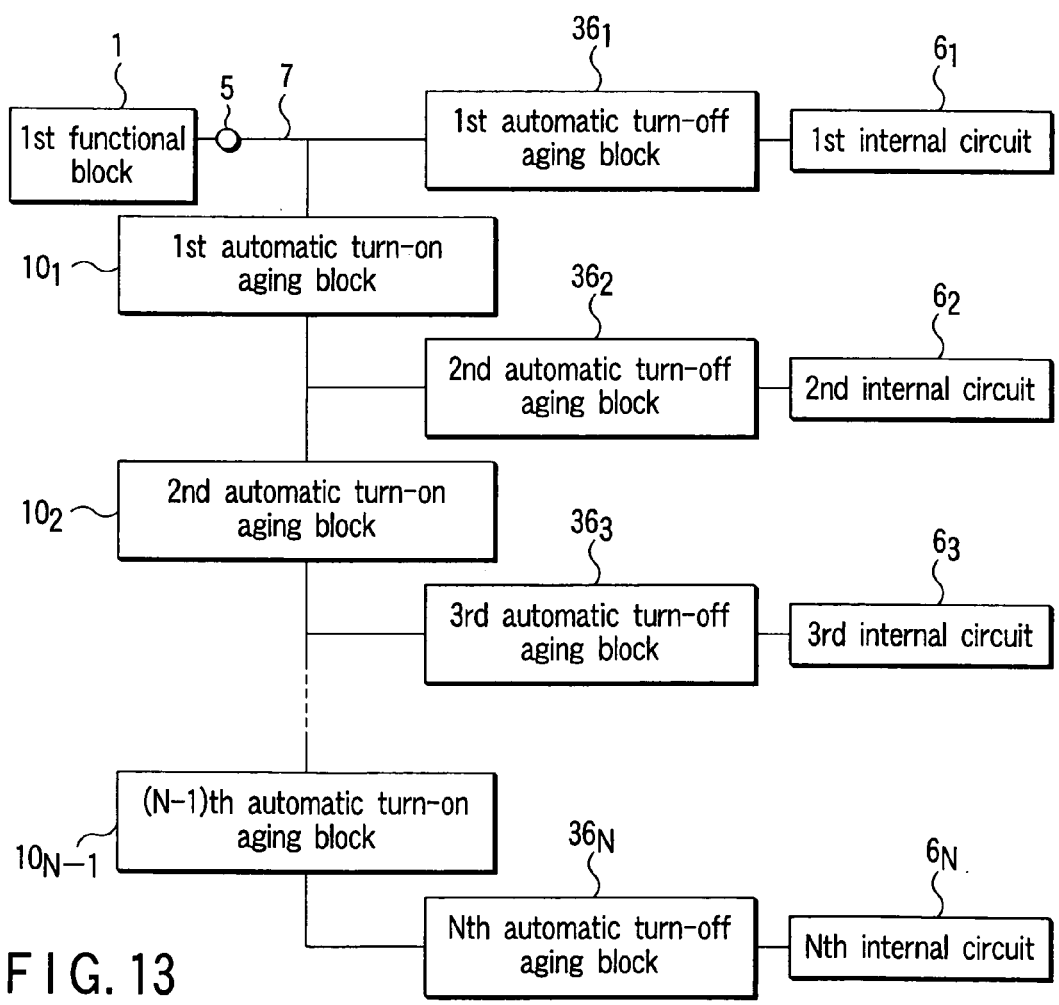
FIG. 13 is a conceptual view showing a time limit utilization apparatus according to the 13th embodiment.

As shown in FIG. 13, the 13th embodiment adopts N (N is a natural number) internal circuits, (N−1) automatic turn-off aging blocks, and (N−1) automatic turn-on aging blocks. An nth (n is a natural number: $1 \leq n \leq N$) automatic turn-off aging block $36_n$ is connected to an nth internal circuit. An nth automatic turn-on aging block is connected between the nth automatic turn-off aging block and an (n+1)th automatic turn-off aging block.

The automatic turn-off aging blocks $36_n$ and automatic turn-on aging blocks $10_n$ change (operate) sequentially in numerical order of the first, second, third blocks and so on. With this circuit arrangement, information or a function in the internal circuit which can be used from an I/O terminal 5 can be changed stepwise after a predetermined time. The internal circuits may share part of the circuits.

A detailed structure and operation method of the aging device will be explained in the 14th to 24th embodiments taking an automatic turn-off aging block as an example.

(14th Embodiment)

Figure 14:
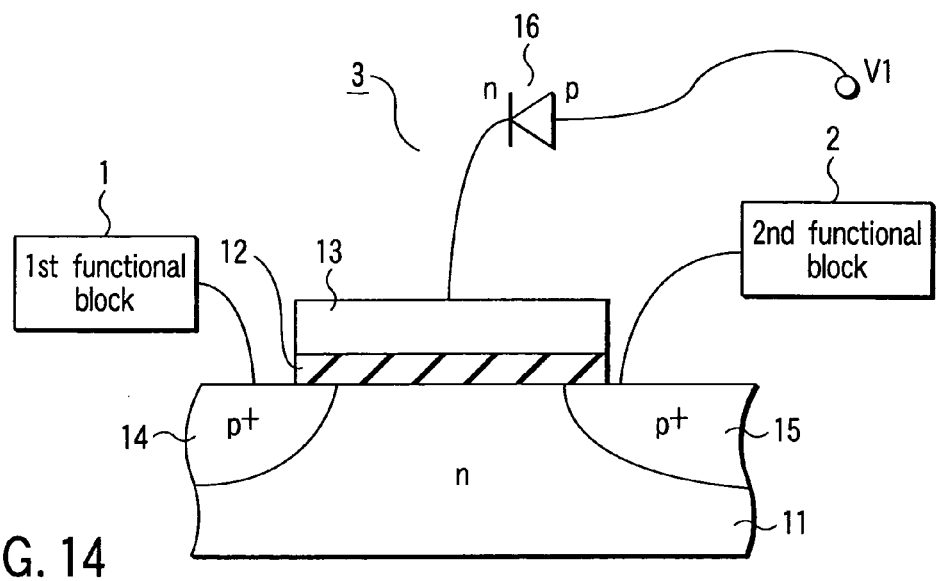
FIG. 14 is a schematic view showing the section and connections of an aging device according to the 14th embodiment.

FIG. 14 is a sectional view showing an aging device according to the 14th embodiment. In the aging device, a gate insulating film 12 is formed on an n-type semiconductor substrate 11, and a gate electrode 13 is formed on the gate insulating film 12. A p$^+$-type source region 14 and p$^+$-type drain region 15 are so formed as to interpose the gate insulating film 12. The n-type layer of a p-n junction 16 is connected to the gate electrode 13 of the pMOSFET, and the p-type layer is connected to an external terminal, forming an aging device.

The source region 14 of the aging device is connected to a first functional block 1. The drain region 15 is connected to a second functional block 2.

Figure 15:
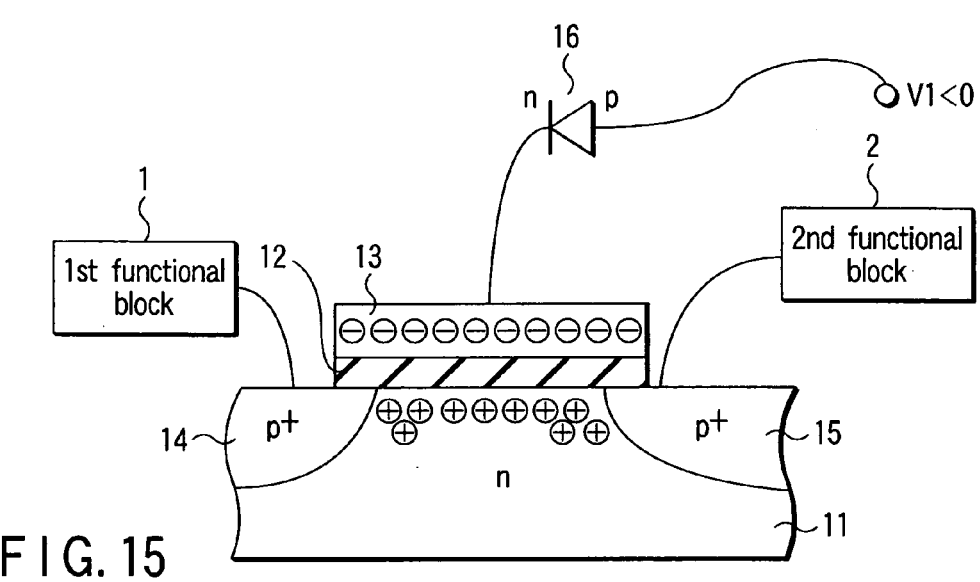
FIG. 15 is a schematic view showing the section and connections of the aging device according to the 14th embodiment.

In this aging device, as shown in FIG. 15, a voltage V1<0 is applied to the p-type layer of the p-n junction 16.

Figure 16:
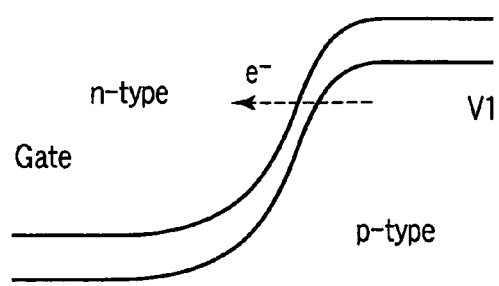
FIG. 16 is a view showing an energy band for explaining the operation principle of the aging device according to the 14th embodiment.

As shown in FIG. 16, electrons flow from the p-type region to the n-type region by band-to-band tunneling (BBT) or avalanche breakdown of the pn junction. As a result, electrons are injected into the gate electrode 13. After electrons are injected, the voltage V1 applied to the p-type layer of the p-n junction 16 is stopped, or the terminal is physically removed, and then followed by packaging.

Figure 17:
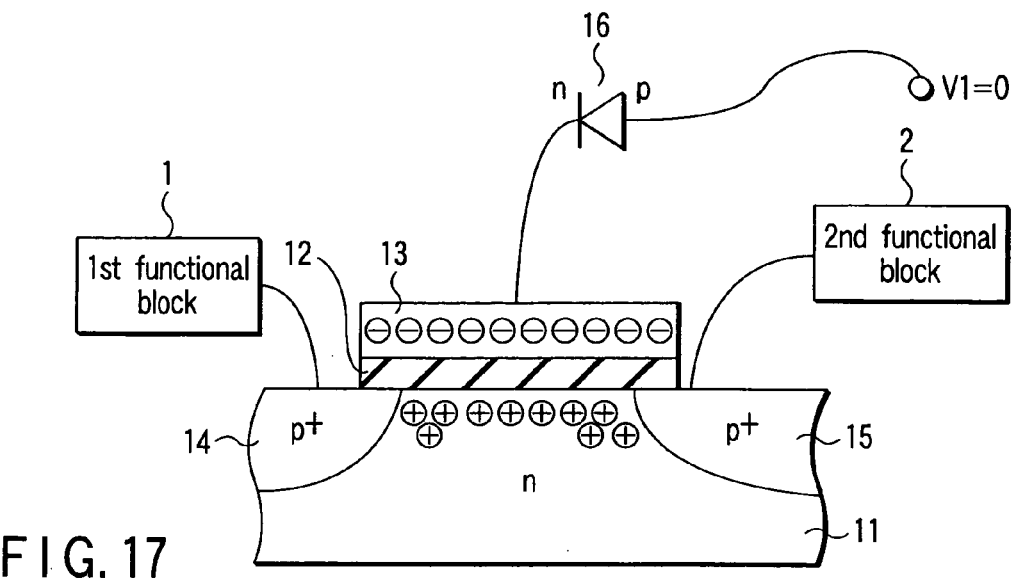
FIG. 17 is a schematic view showing the section and connections for explaining the operation principle of the aging device according to the 14th embodiment.

Even if the voltage V1 is 0 V, the channel is open, as shown in FIG. 17. The source region 14 and drain region 15 of the aging device are rendered conductive.

Figure 18:
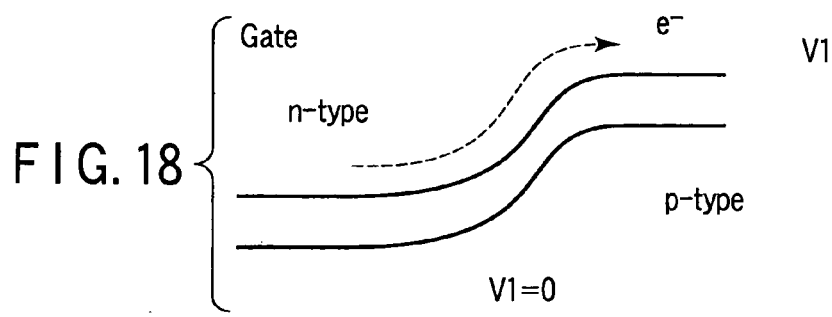
FIG. 18 is a view showing an energy band for explaining the operation principle of the aging device according to the 14th embodiment.

As shown in FIG. 18, redundant electrons accumulated in the gate electrode 13 escape from the n-type layer to p-type layer of the p-n junction 16 owing to the diffusion current, and the field applied to the channel weakens over time. Leakage of accumulated electrons may occur even in direct tunneling (direct tunnel gate leakage) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device, i.e., the time at which the aging device is turned off from an on state is proportional to the amount of electrons accumulated in the gate electrode 13, and inversely proportional to the diffusion current and direct tunnel gate leakage. The expiration date can be set within a predetermined range by adjusting the electron injection time, the gate volume, the junction area, the impurity concentration at the junction, the insulating film thickness, the channel area, the extension region, and the like.

Figure 19:
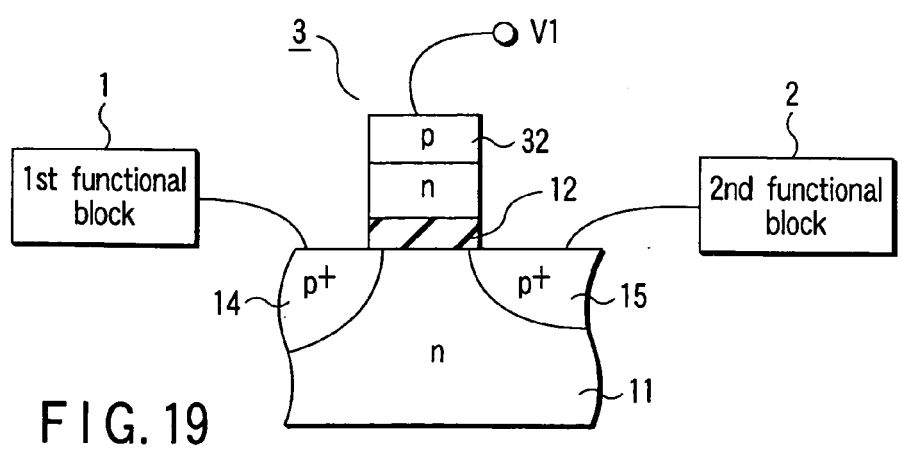
FIG. 19 is a schematic view showing the section and connections of a detailed arrangement example of the aging device according to the 14th embodiment.

FIG. 19 shows a layered structure for implementing the aging device of the 14th embodiment at low cost. As shown in FIG. 19, a p-n junction 32 is vertically formed on the gate insulating film 12, manufacturing the aging device of the 14th embodiment at low cost.

(15th Embodiment)

Figure 20:
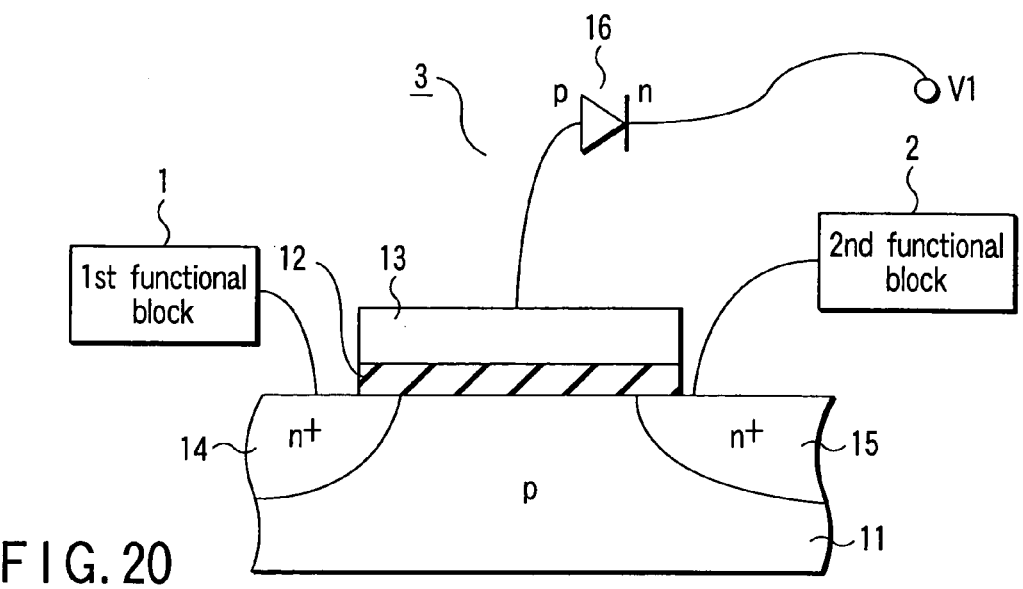
FIG. 20 is a schematic view showing the section and connections of an aging device according to the 15th embodiment.

FIG. 20 is a sectional view showing an aging device according to the 15th embodiment. In the aging device, a gate insulating film 12 is formed on a p-type semiconductor substrate 11, and a gate electrode 13 is formed on the gate insulating film 12. An n$^+$-type source region 14 and n$^+$-type drain region 15 are so formed as to interpose the gate insulating film 12. The p-type layer of a p-n junction 16 is connected to the gate electrode 13, and the n-type layer is connected to an external terminal, forming an aging device.

The source region 14 of the aging device is connected to a first functional block 1. The drain region 15 is connected to a second functional block 2.

Figure 21:
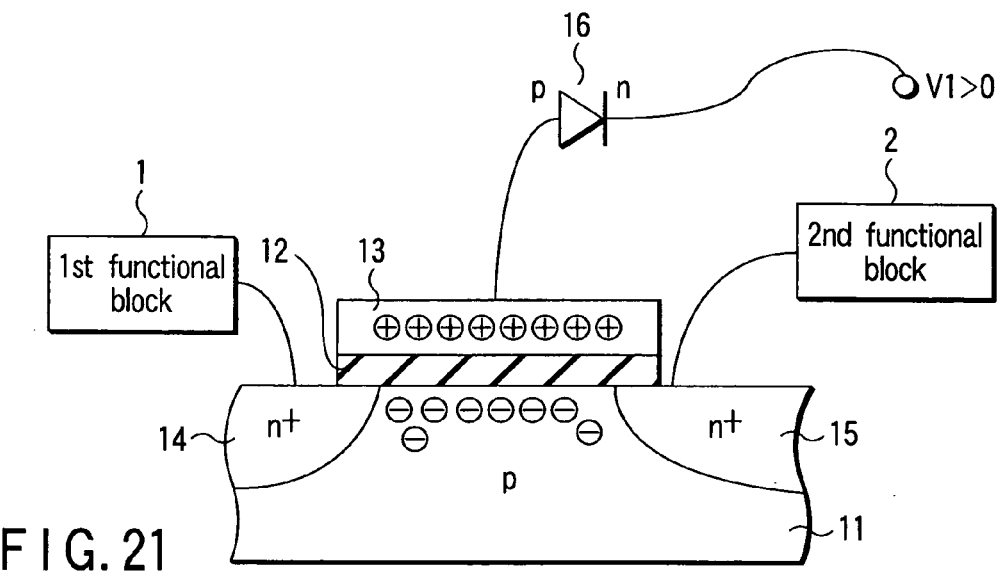
FIG. 21 is a schematic view showing the section and connections for explaining the operation principle of the aging device according to the 15th embodiment.

In this aging device, as shown in FIG. 21, a voltage V1>0 is applied to the n-type layer of the p-n junction 16.

Figure 22:
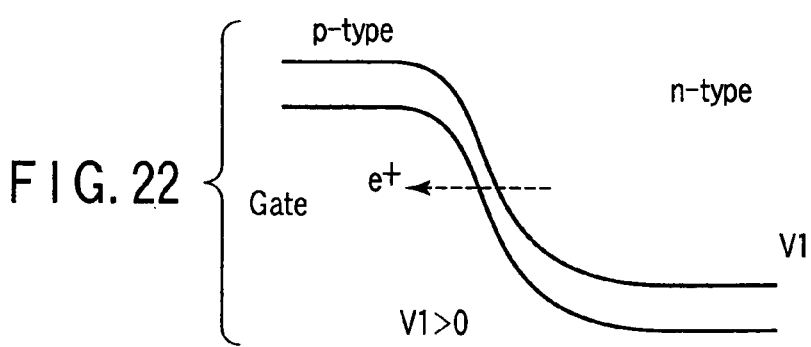
FIG. 22 is a view showing an energy band for explaining the operation principle of the aging device according to the 15th embodiment.

As shown in FIG. 22, holes flow from the n-type region to the p-type region by band-to-band tunneling (BBT) or avalanche breakdown. As a result, holes are injected into the gate electrode 13. After holes are injected, the voltage V1 applied to the n-type layer of the p-n junction 16 is stopped, or the terminal is physically removed, and then followed by packaging.

Figure 23:
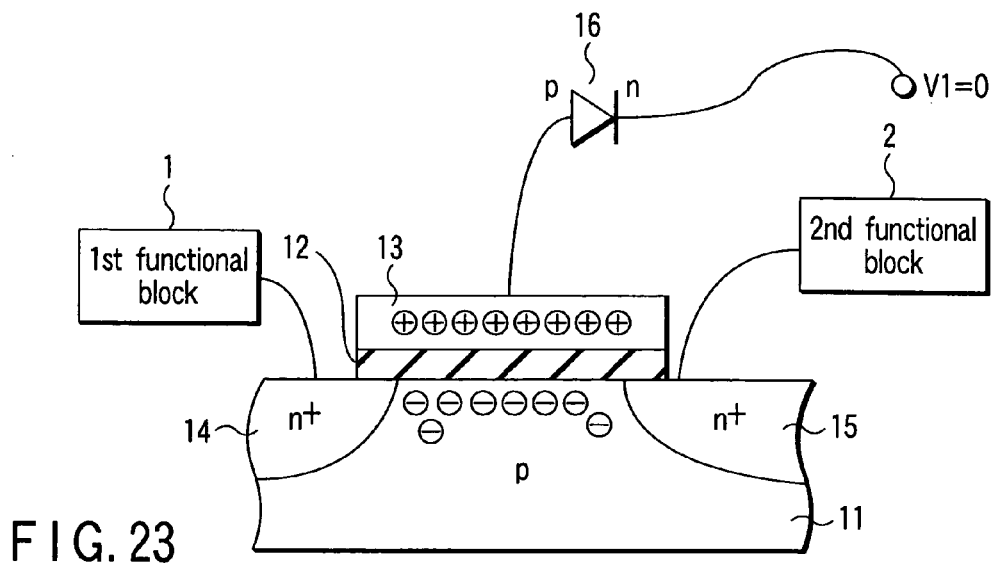
FIG. 23 is a schematic view showing the section and connections for explaining the operation principle of the aging device according to the 15th embodiment.

Even if the voltage V1 is 0 V, the channel is open, as shown in FIG. 23. The aging device is turned on.

Figure 24:
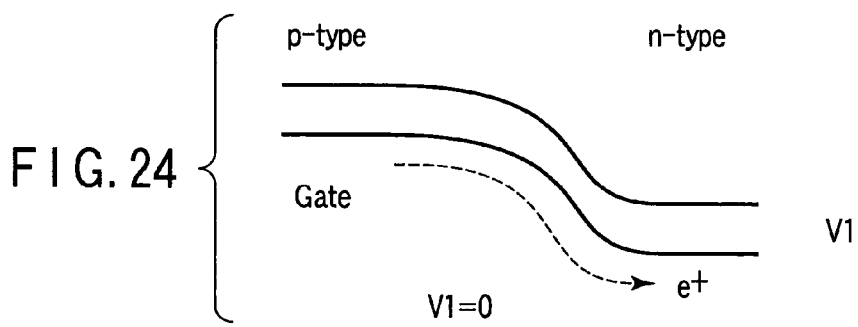
FIG. 24 is a view showing an energy band for explaining the operation principle of the aging device according to the 15th embodiment.

As shown in FIG. 24, redundant holes accumulated in the gate electrode 13 escape from the p-type layer to n-type layer of the p-n junction 16 owing to the diffusion current, and the field applied to the channel weakens over time. Leakage of accumulated holes may occur even in direct tunneling (direct tunnel gate leakage) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device, i.e., the time at which the aging device is turned off is proportional to the amount of positive charges accumulated in the gate electrode 13, and inversely proportional to the diffusion current and direct tunnel gate leakage current. The expiration date can be set within a predetermined range by adjusting the hole injection time, the gate volume, the junction area, the junction concentration, the insulating film thickness, the channel area, the extension region, and the like.

Figure 25:
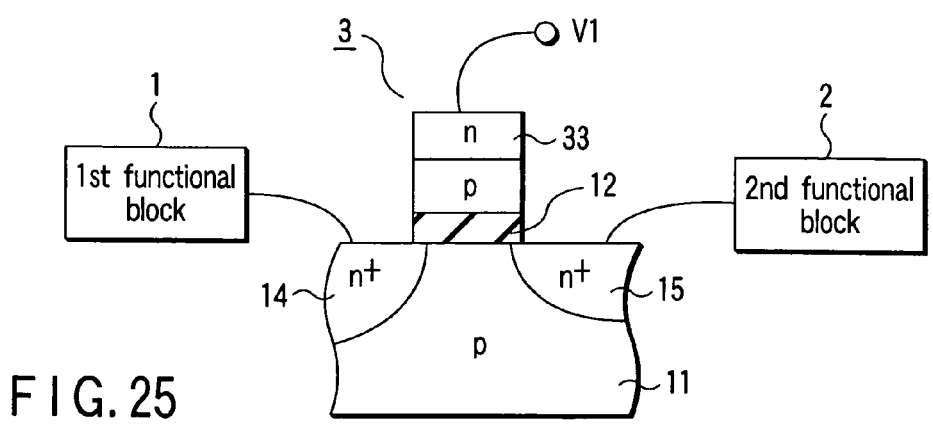
FIG. 25 is a schematic view showing the section and connections of a detailed arrangement example of the aging device according to the 15th embodiment.

FIG. 25 shows a layered structure for implementing the aging device of the 15th embodiment at low cost. As shown in FIG. 25, a p-n junction 33 is vertically formed on the gate insulating film 12, manufacturing the aging device of the 15th embodiment at low cost.

(16th Embodiment)

Figure 26:
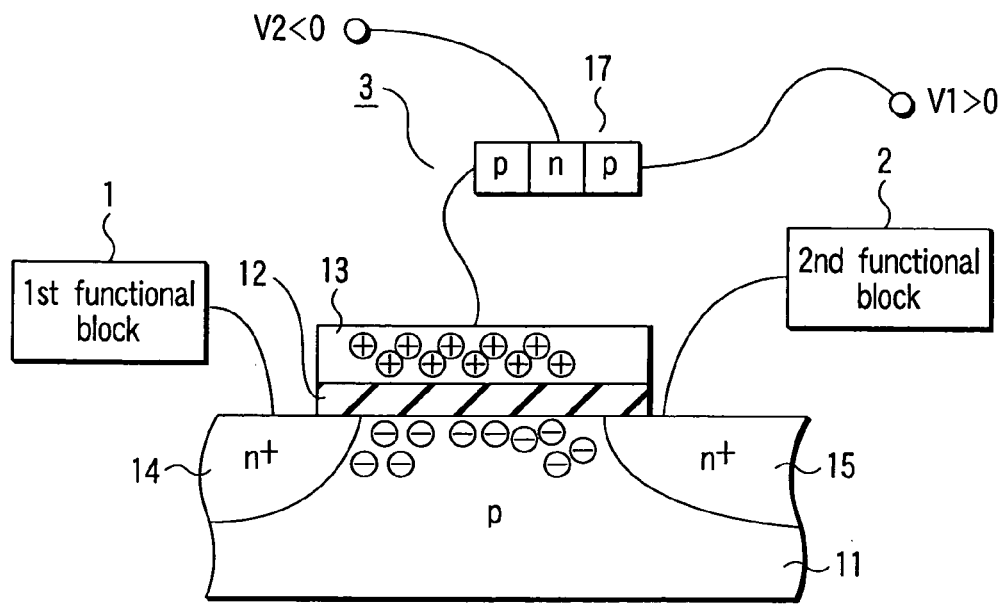
FIG. 26 is a schematic view showing the section and connections of an aging device according to the 16th embodiment.

FIG. 26 is a sectional view showing an aging device according to the 16th embodiment. In the aging device, a gate insulating film 12 is formed on a p-type semiconductor substrate 11, and a gate electrode 13 is formed on the gate insulating film 12. An n$^+$-type source region 14 and n$^+$-type drain region 15 are so formed as to interpose the gate insulating film 12. One p-type layer of a pnp junction 17 is connected to the gate electrode 13, the other p-type layer is connected to an external terminal, and the n-type layer is connected to another external terminal, forming an aging device.

The source region 14 of the aging device is connected to a first functional block 1. The drain region 15 is connected to a second functional block 2.

In this aging device, a voltage V1>0 is applied to the other p-type layer of the pnp junction 17, and a voltage V2<0 is applied to the n-type layer. As a result, as shown in FIG. 26, holes flow from the right p-type region to the left p-type region via the n-type region, and are injected into the gate electrode 13. After holes are injected, the voltages V1 and V2 applied to the p- and n-type layers of the pnp junction 17 are stopped, or the terminals are physically removed, and then followed by packaging.

Figure 27:
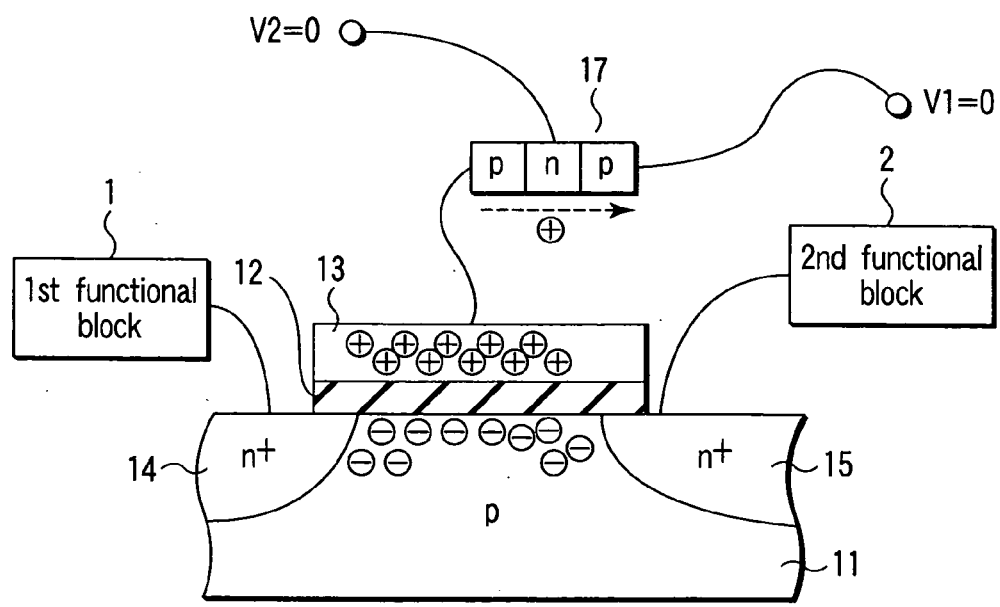
FIG. 27 is a schematic view showing the section and connections for explaining the operation principle of the aging device according to the 16th embodiment.

Even if the voltages V1 and V2 are 0 V, the channel is open, as shown in FIG. 27. The aging device is turned on.

Redundant holes accumulated in the gate electrode 13 escape from one p-type layer, which is on a gate side to the other p-type layer of the pnp junction 17 via the n-type layer owing to the diffusion current, as shown in FIG. 27, and the field applied to the channel weakens over time.

Leakage of accumulated holes may occur even in the direct tunnel gate leakage identical to that in the 14th and 15th embodiments. When the inversion layer disappears, no current flows between the source region 14 and drain region 15. That is, the aging device is turned off. The expiration date (life time) of the aging device can be adjusted similarly to the 15th embodiment.

Similar to the 14th or 15th embodiment, the aging device of the 16th embodiment can also be implemented at low cost by vertically forming the pnp junction 17 on the gate electrode 13.

(17th Embodiment)

FIG. 28 is a sectional view showing an aging device according to the 17th embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. One $n^+$-type layer of an $n^+nn^+$ junction 18 is connected to the gate electrode 13, the other $n^+$-type layer is connected to an external terminal, and the n-type layer is connected to another external terminal, forming an aging device.

The source region 14 of the aging device is connected to a first functional block 1. The drain region 15 is connected to a second functional block 2.

In this aging device, a voltage V1>0 is applied to the other $n^+$-type layer of the $n^+nn^+$ junction 18, and a voltage V2>0 is applied to the n-type layer.

As shown in FIG. 28, electrons are removed from the gate electrode 13 via the $n^+nn^+$ junction 18 to positively charge the gate electrode 13. Thereafter, the voltages V1 and V2 applied to the $n^+$- and n-type layers of the $n^+nn^+$ junction 18 are stopped, or the terminals are physically removed, and then followed by packaging.

Even if the voltages V1 and V2 are 0 V, the channel is open, and the aging device is turned on.

Electrons flows in the gate electrode 13 via the $n^+nn^+$ junction 18 by the diffusion current by the amount of electrons which have been removed from the gate electrode 13. Hence, the field applied to the channel weakens over time. Injection of electrons may occur even in direct tunneling (direct tunnel gate leakage) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device, i.e., the time at which the aging device is turned off is proportional to the amount of electrons removed from the gate electrode 13, and inversely proportional to the diffusion current and direct tunnel gate leakage. The expiration date can be set within a predetermined range by adjusting the electron removal time, the gate volume, the junction area, the impurity concentration at the junction, the insulating film thickness, the channel area, the extension region, and the like.

Similar to the 14th or 15th embodiment, the aging device of the 17th embodiment can also be implemented at low cost by vertically forming the $n^+nn^+$ junction 18 on the gate electrode 13.

(18th Embodiment)

FIG. 29 is a sectional view showing an aging device according to the 18th embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. One $p^+$-type layer of a $p^+pp^+$ junction 19 is connected to the gate electrode 13, the other $p^+$-type layer is connected to an external terminal, and the p-type layer is connected to another external terminal, forming an aging device.

The source region 14 of the aging device is connected to a first functional block 1. The drain region 15 is connected to a second functional block 2.

In this aging device, a voltage V1>0 is applied to the other $p^+$-type layer of the $p^+pp^+$ junction 19, and a voltage V2<0 is applied to the p-type layer.

Holes are injected into the gate electrode 13 via the $p^+pp^+$ junction 19 to positively charge the gate electrode 13. After that, the voltages V1 and V2 applied to the $p^+$- and p-type layers of the $p^+pp^+$ junction 19 are stopped, or the terminals are physically removed, and then followed by packaging.

Even if the voltages V1 and V2 are 0 V, the channel is open, and the aging device is turned on.

Figure 30:
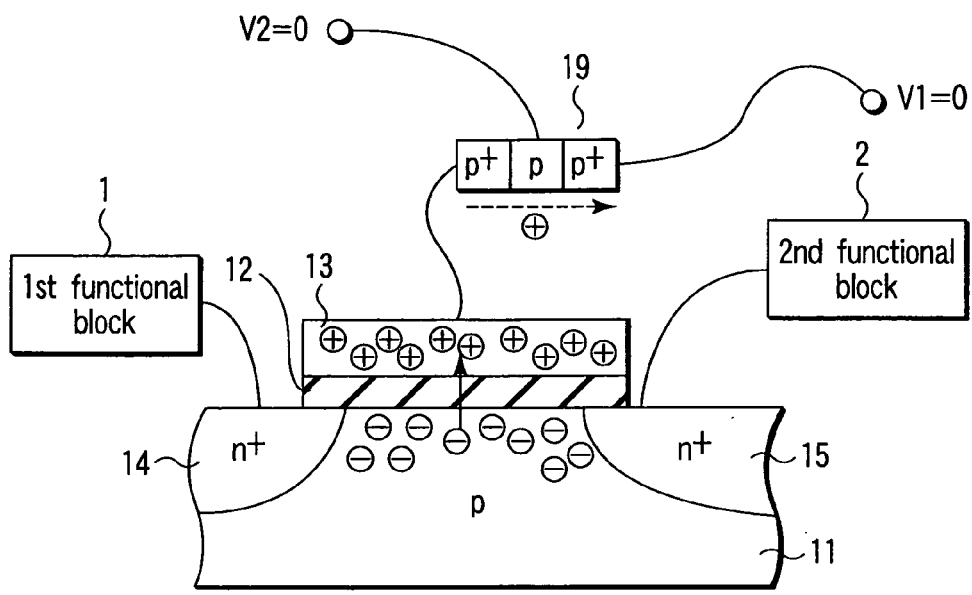
FIG. 30 is a schematic view showing the section and connections of the aging device according to the 18th embodiment.

As shown in FIG. 30, holes are removed from the gate electrode 13 via the $p^+pp^+$ junction 19 by the diffusion current, and the field applied to the channel weakens over time.

Removal of holes may occur even in the direct tunnel gate leakage identical to that in the 14th and 15th embodiments. When the inversion layer disappears, no current flows between the source region 14 and drain region 15. That is, the aging device is turned off. The expiration date (life time) of the aging device can be adjusted similarly to the 15th embodiment.

Similar to the 14th or 15th embodiment, the aging device of the 18th embodiment can also be implemented at low cost by vertically forming the $p^+pp^+$ junction 19 on the gate electrode 13.

(19th Embodiment)

Figure 31:
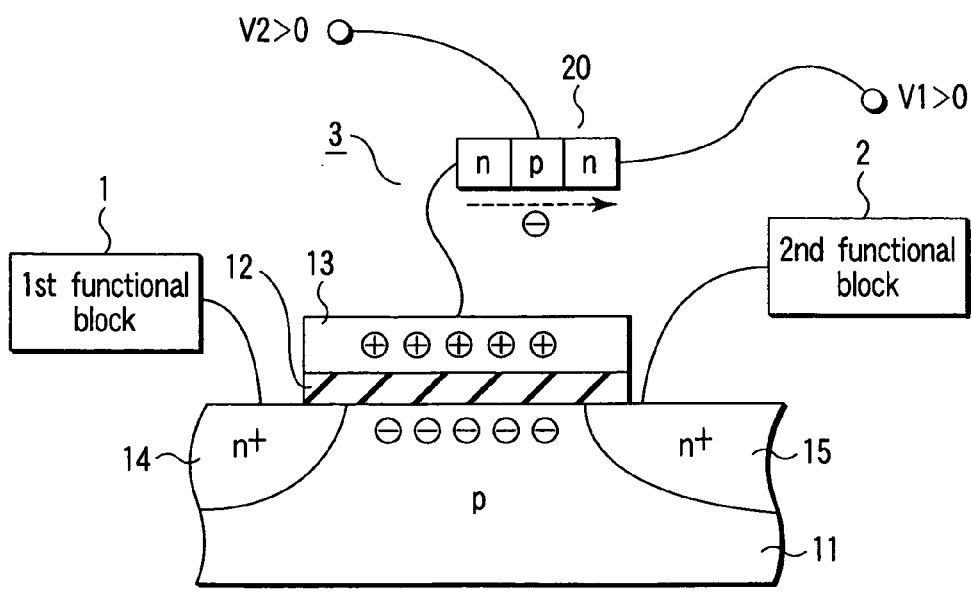
FIG. 31 is a schematic view showing the section and connections of an aging device according to the 19th embodiment.

FIG. 31 is a sectional view showing an aging device according to the 19th embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. One n-type layer of an npn junction 20 is connected to the gate electrode 13, the other n-type layer is connected to an external terminal, and the p-type layer is connected to another external terminal, forming an aging device.

The source region 14 of the aging device is connected to a first functional block 1. The drain region 15 is connected to a second functional block 2.

In this aging device, a voltage V1>0 is applied to the other n-type layer of the npn junction 20, and a voltage V2>0 is applied to the p-type layer.

As shown in FIG. 31, electrons are removed from the gate electrode 13 via the npn junction 20 to positively charge the gate electrode 13. Thereafter, the voltages V1 and V2 applied to the n- and p-type layers of the npn junction 20 are stopped, or the terminals are physically removed, and then followed by packaging.

Even if the voltages V1 and V2 are 0 V, the channel is open, and the aging device is turned on.

Figure 32:
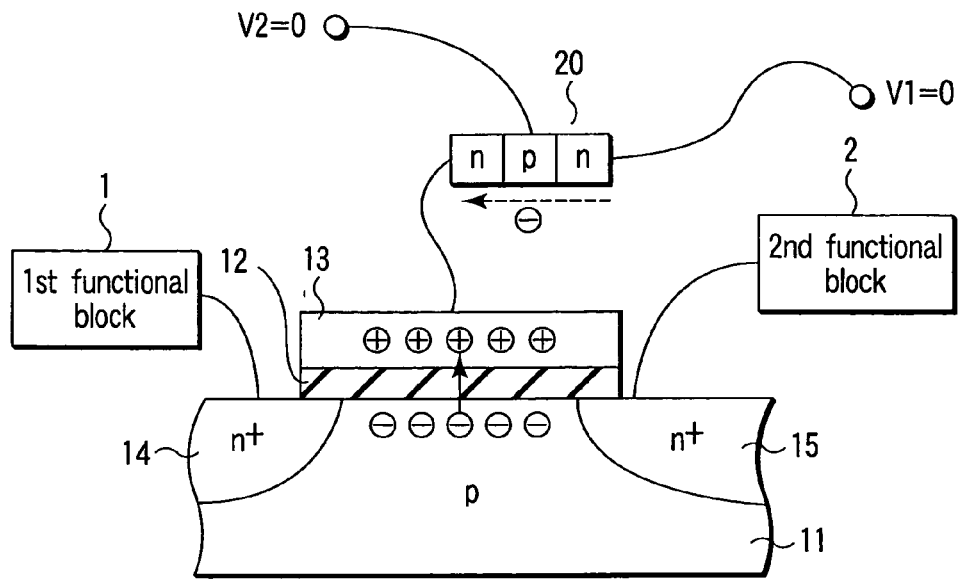
FIG. 32 is a schematic view showing the section and connections of the aging device according to the 19th embodiment.

As shown in FIG. 32, electrons are injected into the gate electrode 13 via the npn junction 20 by the diffusion current by the amount of electrons which have been removed from the gate electrode 13. Accordingly, the field applied to the channel weakens over time.

Injection of electrons may occur even in the direct tunnel gate leakage similar to that in the 17th embodiment. When the inversion layer disappears, no current flows between the source region 14 and drain region 15. That is, the aging device is turned off. The expiration date (life time) of the aging device can be adjusted similarly to the 17th embodiment.

Similar to the 14th or 15th embodiment, the aging device of the 19th embodiment can also be implemented at low cost by vertically forming the npn junction 20 on the gate electrode 13.

(20th Embodiment)

Figure 33:
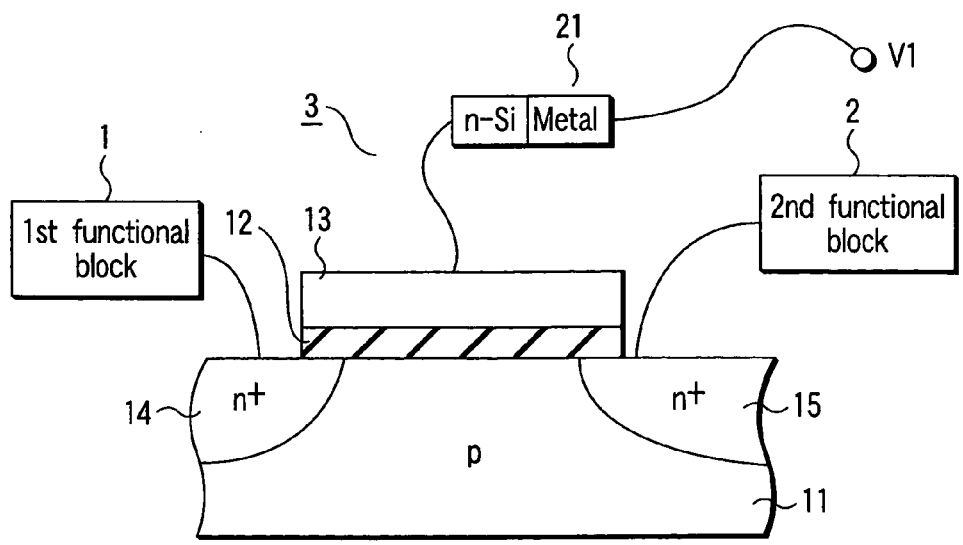
FIG. 33 is a schematic view showing the section and connections of an aging device according to the 20th embodiment.

FIG. 33 is a sectional view showing an aging device according to the 20th embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. The n-type silicon layer of a metal/n-type silicon Schottky junction 21 is connected to the gate electrode 13, and the metal layer is connected to an external terminal, forming an aging device.

The source region 14 of the aging device is connected to a first functional block 1. The drain region 15 is connected to a second functional block 2.

In this aging device, a voltage V1>0 is applied to the metal layer of the Schottky junction 21.

Electrons are removed from the gate electrode 13 via the Schottky junction 21 to positively charge the gate electrode 13. Thereafter, the voltage V1 applied to the metal layer of the Schottky junction 21 is stopped, or the terminal is physically removed, and then followed by packaging.

Even if the voltage V1 is 0 V, the channel is open, and the aging device is turned on.

Electrons are injected into the gate-electrode 13 via the Schottky junction 21 by Schottky tunneling of electrons by the amount of electrons which have been removed from the gate electrode 13. Accordingly, the field applied to the channel weakens over time.

Injection of electrons may occur even in the direct tunnel gate leakage identical to that in the 17th embodiment. When the inversion layer disappears, no current flows between the source region 14 and drain region 15. That is, the aging device is turned off. The expiration date (life time) of the aging device can be adjusted similarly to the 17th embodiment.

Figure 34:
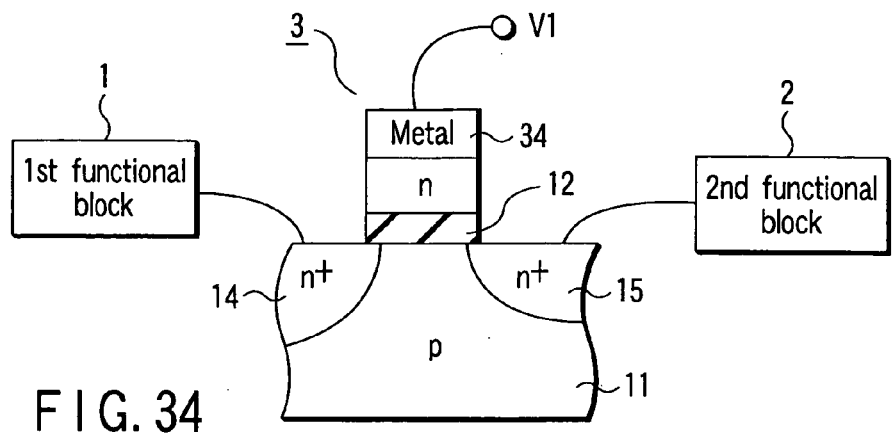
FIG. 34 is a schematic view showing the section and connections of a detailed arrangement example of the aging device according to the 20th embodiment.

FIG. 34 shows a layered structure for implementing the aging device of the 20th embodiment at low cost. As shown in FIG. 34, a Schottky junction 34 is vertically formed on the gate insulating film 12, manufacturing the aging device of the 20th embodiment at low cost.

Use of Schottky tunneling as charge leakage means enables to suppress the temperature dependency of a life time.

(21st Embodiment)

Figure 35:
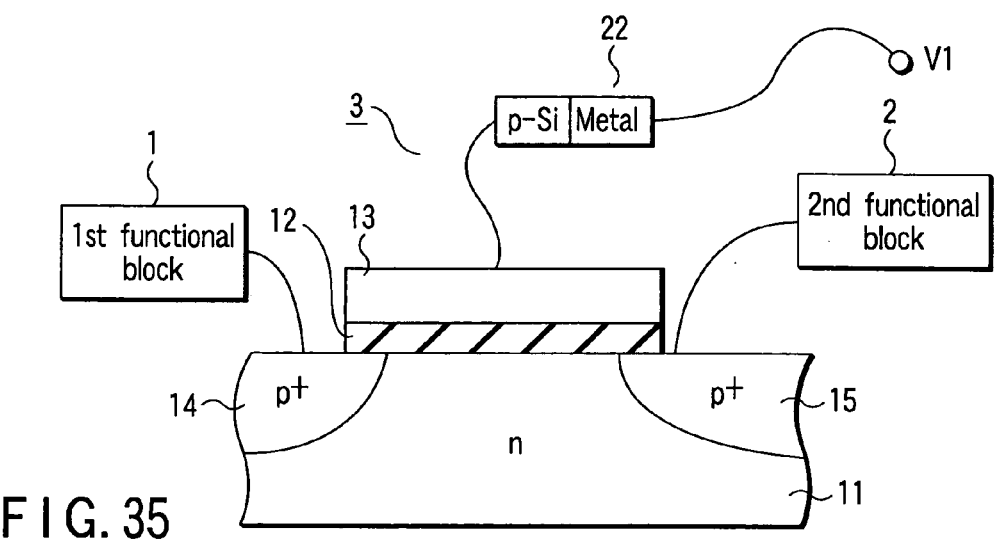
FIG. 35 is a schematic view showing the section and connections of an aging device according to the 21st embodiment.

FIG. 35 is a sectional view showing an aging device according to the 21st embodiment. In the aging device, a gate insulating film 12 is formed on an n-type semiconductor substrate 11, and a gate electrode 13 is formed on the gate insulating film 12. A $p^+$-type source region 14 and $p^+$-type drain region 15 are so formed as to interpose the gate insulating film 12. The p-type silicon layer of a metal/p-type silicon Schottky junction 22 is connected to the gate electrode 13 of the pMOSFET, and the metal layer is connected to an external terminal, forming an aging device.

The source region 14 of the aging device is connected to a first functional block 1. The drain region 15 is connected to a second functional block 2.

In this aging device, a voltage V1<0 is applied to the metal layer of the Schottky junction 22.

Holes are then extracted from the gate electrode 13 via the Schottky junction 22 to negatively charge the gate electrode 13. Thereafter, the voltage V1 applied to the metal layer of the Schottky junction 22 is stopped, or the terminal is physically removed, and then followed by packaging.

Even if the voltage V1 is 0 V, the channel is open, and the aging device is turned on.

Holes are injected into the gate electrode 13 via the Schottky junction 22 by Schottky tunneling of holes by the amount of holes which have been removed from the gate electrode 13, and the field applied to the channel weakens over time.

Injection of holes (removal of electrons) may occur even in the direct tunnel gate leakage identical to that in the 14th embodiment. When the inversion layer disappears, no current flows between the source region 14 and drain region 15. That is, the aging device is turned off. The expiration date (life time) of the aging device can be adjusted similarly to the 14th embodiment.

Figure 36:
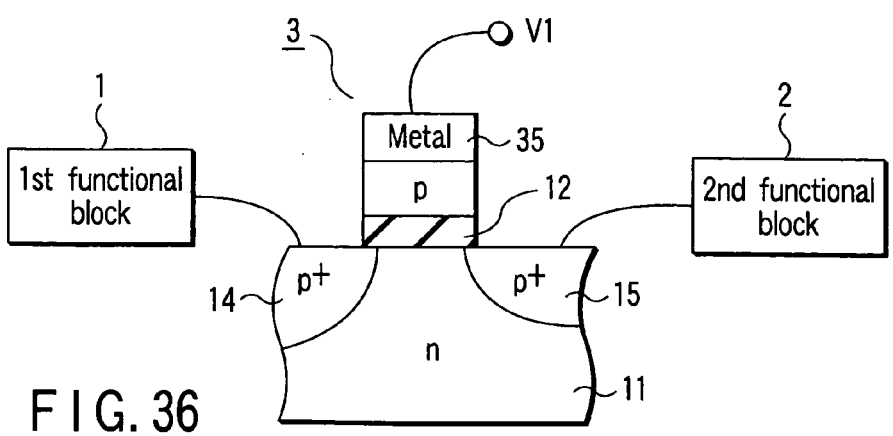
FIG. 36 is a schematic view showing the section and connections of a detailed arrangement example of the aging device according to the 21st embodiment.

FIG. 36 shows a layered structure for implementing the aging device of the 21st embodiment at low cost. As shown in FIG. 36, a Schottky junction 35 is vertically formed on the gate 12, manufacturing the aging device of the 21st embodiment at low cost.

(22nd Embodiment)

FIG. 37 is a sectional view showing an aging device according to the 22nd embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. The $n^+$-type source region of an nMOSFET 23 is connected to the gate electrode 13, and the gate and $n^+$-type drain region are connected to external terminals, forming an aging device.

The source region 14 of the aging device is connected to a first functional block 1. The drain region 15 is connected to a second functional block 2.

In this aging device, a voltage V2>0 is applied to the gate of the nMOSFET 23, and a voltage V1>0 is applied to the $n^+$-type drain region.

Electrons are removed from the gate electrode 13 via the nMOSFET 23 to positively charge the gate electrode 13. The gate voltage V2 to the nMOSFET 23 is stopped, and the drain voltage V1 is stopped. Alternatively, the terminals are physically removed, and then followed by packaging.

Even if the voltages V1 and V2 are 0 V, the source region 14 and drain region 15 are rendered conductive, and the aging device is turned on.

Electrons are injected into the gate electrode 13 via the nMOSFET 23 by the leakage current, and the field applied to the channel weakens over time. Injection of electrons may occur even in direct tunneling (direct tunnel gate leakage) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device can be adjusted similarly to the 17th embodiment. The expiration date can also be set within a predetermined range by adjusting the nMOSFET gate width, the gate length, the impurity concentration in the diffusion layer, the channel concentration, the insulating film thickness, the extension region, and the like.

Use of Schottky tunneling as charge leakage means enables to suppress the temperature dependency of a life time.

(23rd Embodiment)

FIG. 38 is a sectional view showing an aging device according to the 23rd embodiment. In the aging device, a gate insulating film 12 is formed on a p-type semiconductor substrate 11, and a gate electrode 13 is formed on the gate insulating film 12. An $n^+$-type source region 14 and $n^+$-type drain region 15 are so formed as to interpose the gate insulating film 12. The $p^+$-type source region of a PMOSFET 24 is connected to the gate electrode 13, and the gate and $p^+$-type drain region are connected to external terminals, forming an aging device.

The source region 14 of the aging device is connected to a first functional block 1. The drain region 15 is connected to a second functional block 2.

In this aging device, a voltage V2<0 is applied to the gate of the pMOSFET 24, and a voltage V1>0 is applied to the $p^+$-type drain region.

Holes are injected into the gate electrode 13 via the pMOSFET 24 to positively charge the gate electrode 13. The gate voltage V2 to the PMOSFET 24 is stopped, and the drain voltage V1 is stopped. Alternatively, the terminals are physically removed, and then followed by packaging.

Even if the voltages V1 and V2 are 0 V, the source region 14 and drain region 15 are rendered conductive, and the aging device is turned on.

Holes leak from the gate electrode 13 via the pMOSFET 24 by the leakage current, and the field applied to the channel weakens over time. Leakage of holes may occur even in direct tunneling (direct tunnel gate leakage of holes) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device can be adjusted similarly to the 15th embodiment. The expiration date can also be set within a predetermined range by adjusting the gate width of the pMOSFET 24, the gate length, the impurity concentration in the diffusion layer, the channel concentration, the insulating film thickness, the extension region, and the like.

(24th Embodiment)

Figure 39:
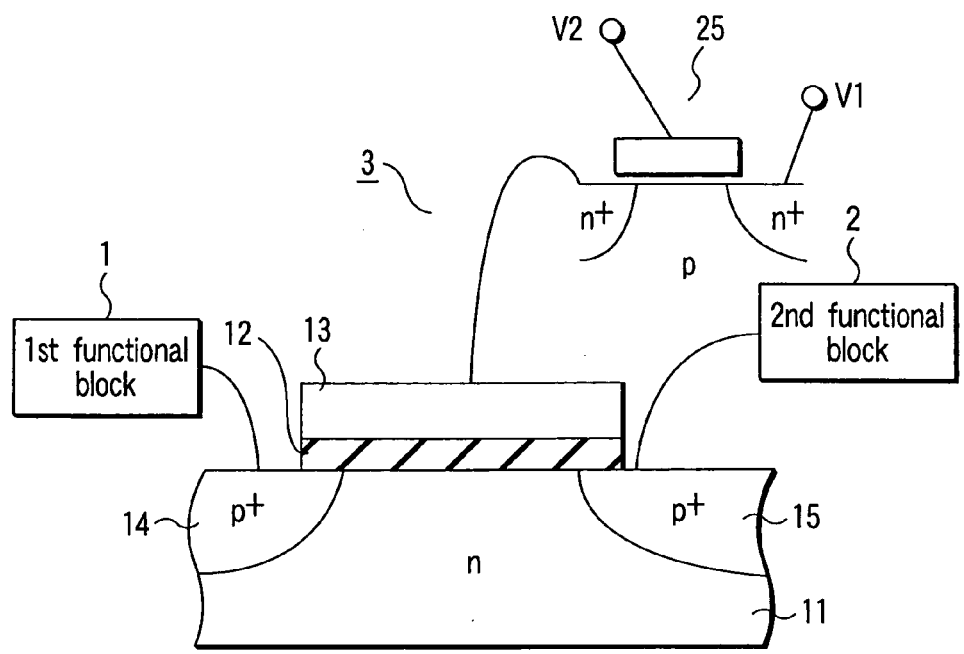
FIG. 39 is a schematic view showing the section and connections of an aging device according to the 24th embodiment.

FIG. 39 is a sectional view showing an aging device. In the aging device, a gate insulating film 12 is formed on an n-type semiconductor substrate 11, and a gate electrode 13 is formed on the gate insulating film 12. A $p^+$-type source region 14 and $p^+$-type drain region 15 are so formed as to interpose the gate insulating film 12. The $n^+$-type source region of an nMOSFET 25 is connected to the gate electrode 13 of the pMOSFET, and the gate and $n^+$-type drain region are connected to external terminals, forming an aging device.

The source region 14 of the aging device is connected to a first functional block 1. The drain region 15 is connected to a second functional block 2.

In this aging device, a voltage V2>0 is applied to the gate of the nMOSFET 25, and a voltage V1<0 is applied to the $n^+$-type source region.

Electrons are injected into the gate electrode 13 via the nMOSFET 25 to negatively charge the gate electrode 13. The gate voltage V2 to the nMOSFET 25 is stopped, and the drain voltage V1 is stopped. Alternatively, the terminals are physically removed, and then followed by packaging.

Even if the voltages V1 and V2 are 0 V, the source region 14 and drain region 15 are rendered conductive, and the aging device is turned on.

Electrons are removed from the gate electrode 13 via the nMOSFET 25 by the leakage current, and the field applied to the channel weakens over time. Removal of electrons may occur even in the direct tunnel gate leakage identical to that in the 14th embodiment. When the inversion layer disappears, no current flows between the source region 14 and drain region 15. That is, the aging device is turned off.

The expiration date (life time) of the aging device can be determined similarly to the 14th embodiment. The expiration date can also be set within a predetermined range by adjusting the gate width of the nMOSFET 25, the gate length, the impurity concentration in the diffusion layer, the channel concentration, the insulating film thickness, and the like.

(25th Embodiment)

Figure 40:
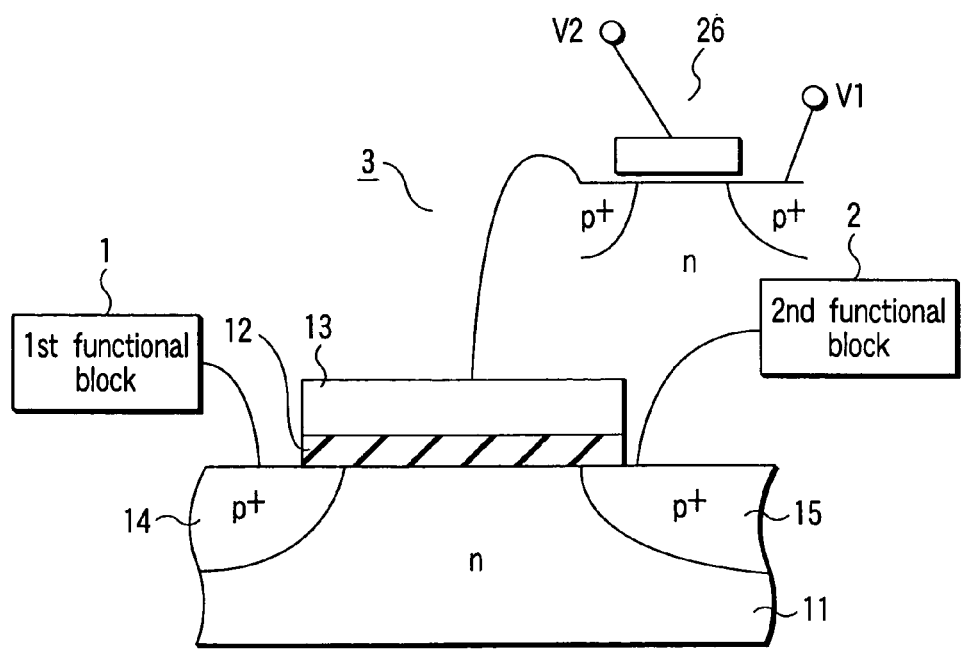
FIG. 40 is a schematic view showing the section and connections of an aging device according to the 25th embodiment.

FIG. 40 is a sectional view showing an aging device according to the 25th embodiment. In the aging device, a gate insulating film 12 is formed on an n-type semiconductor substrate 11, and a gate electrode 13 is formed on the gate insulating film 12. A $p^+$-type source region 14 and $p^+$-type drain region 15 are so formed as to interpose the gate insulating film 12. The $p^+$-type source region of a pMOSFET 26 is connected to the gate electrode 13, and the gate and $p^+$-type drain region are connected to external terminals, forming an aging device.

The source region 14 of the aging device is connected to a first functional block 1. The drain region 15 is connected to a second functional block 2.

In this aging device, a voltage V2<0 is applied to the gate of the PMOSFET 26, and a voltage V1<0 is applied to the $p^+$-type source region.

Holes are removed from the gate electrode 13 via the pMOSFET 26 to negatively charge the gate electrode 13. The gate voltage V2 to the pMOSFET 26 is stopped, and the drain voltage V1 is stopped. Alternatively, the terminals are physically removed, and then followed by packaging.

Even if the voltages V1 and V2 are 0 V, the source region 14 and drain region 15 are rendered conductive, and the aging device is turned on.

Holes are injected into the gate electrode 13 via the pMOSFET 26 by the leakage current, and the field applied to the channel weakens over time. Injection of holes may occur even in direct tunneling of holes (direct tunnel gate leakage) between the gate electrode 13 and the channel or between the gate electrode 13 and the diffusion layers of the source region 14 and drain region 15 for a sufficiently thin gate insulating film 12. When the inversion layer disappears, no current flows between the source region 14 and drain region 15. That is, the aging device is turned off.

The expiration date (life time) of the aging device, i.e., the time at which the aging device is turned off is proportional to the amount of holes removed from the gate electrode 13, and inversely proportional to the leakage current and the direct tunneling gate leakage. The expiration date can be set within a predetermined range by adjusting the hole removal time, the gate volume, the junction area, the impurity concentration at the junction, the insulating film thickness, the channel area, the extension region, and the like.

The expiration date can also be set within a predetermined range by adjusting the gate width of the pMOSFET 26, the gate length, the impurity concentration in the diffusion layer, the channel concentration, the insulating film thickness, the extension region, and the like.

(26th Embodiment)

Figure 41:
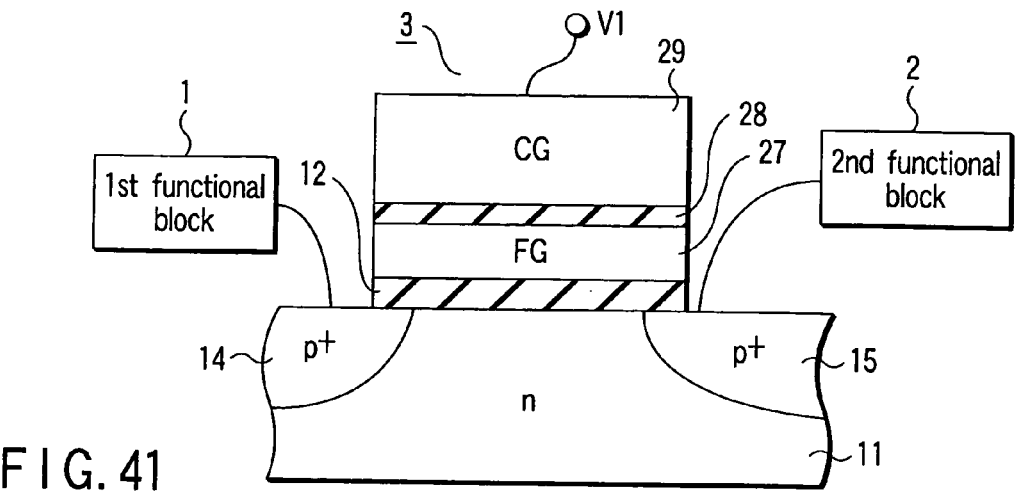
FIG. 41 is a schematic view showing the section and connections of an aging device according to the 26th embodiment.

FIG. 41 is a sectional view showing an aging device according to the 26th embodiment. In the aging device, a gate insulating film 12 is formed on an n-type semiconductor substrate 11, and a floating gate 27 is formed on the gate insulating film 12. An insulating film 28 is formed on the floating gate 27, and a control gate 29 is formed on the insulating film 28. A p$^+$-type source region 14 and p$^+$-type drain region 15 are so formed as to interpose the gate insulating film 12. The control gate 29 is connected to an external terminal, forming an aging device.

The source region 14 of the aging device is connected to a first functional block 1. The drain region 15 is connected to a second functional block 2.

Figure 42:
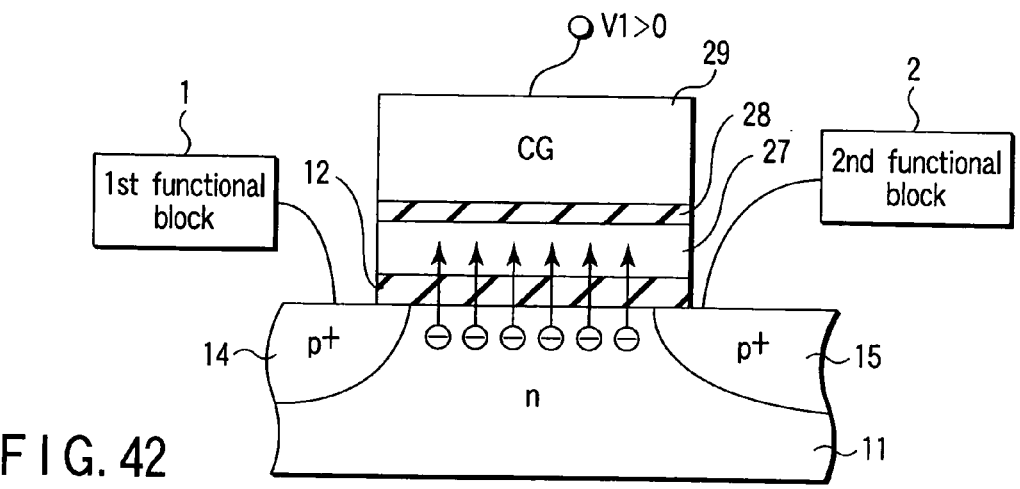
FIG. 42 is a schematic view of the section and connections showing the charge injection method of the aging device according to the 26th embodiment.

FIG. 42 is a sectional view for explaining a method of injecting electrons into the floating gate 27 of the aging device.

A positive voltage V1>0 is applied to the control gate 29, and electrons are injected from the n-type semiconductor substrate 11 into the floating gate 27 by FN tunneling.

Figure 43:
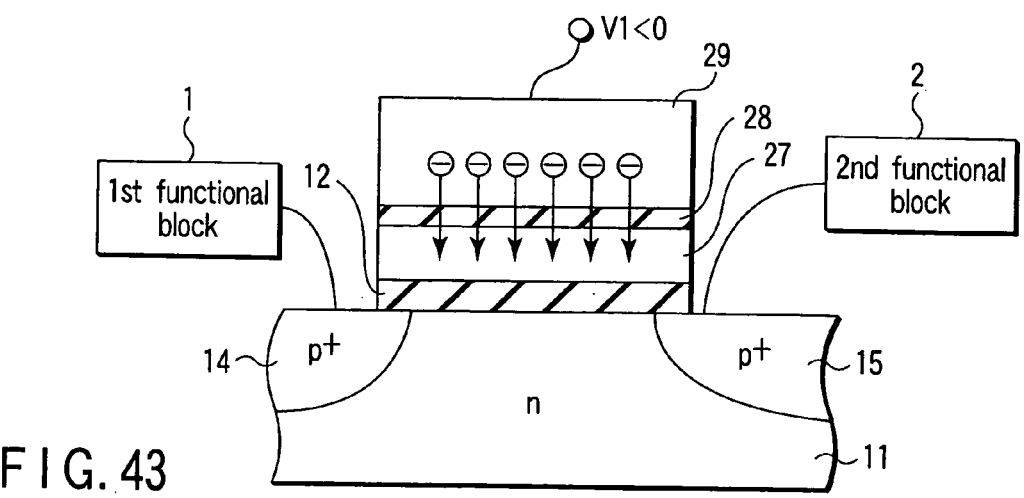
FIG. 43 is a schematic view of the section and connections showing another charge injection method of the aging device according to the 26th embodiment of the present invention.

FIG. 43 is a sectional view showing another method of injecting electrons into the floating gate 27.

A negative voltage V1<0 is applied to the control gate 29, and electrons are injected from the control gate 29 into the floating gate 27 by FN tunneling.

If the voltage V1 applied to the control gate 29 is high enough to cause FN tunneling, electrons can be injected into the floating gate 27 regardless of the polarity.

If the gate insulating film 12 between the floating gate 27 and the semiconductor substrate 11 is sufficiently thin, or the insulating film 28 between the control gate 29 and the floating gate 27 is sufficiently thin, electrons can be injected by direct tunneling.

Thereafter, the voltage V1 to the control gate 29 is stopped, or the terminal is physically removed, and then followed by packaging.

Even if the voltage V1 is 0 V, the source region 14 and drain region 15 are rendered conductive, and the aging device is turned on.

As shown in FIGS. 44 and 45, electrons are removed from the floating gate 27 to the semiconductor substrate 11, source region 14, drain region 15, and control gate 29 by the leakage current of direct tunneling. Accordingly, the field applied to the channel weakens over time. When the inversion layer disappears, no current flows between the source region 14 and drain region 15. That is, the aging device is turned off.

If the gate insulating film 12 between the floating gate 27 and the semiconductor substrate 11 is thinner than the insulating film 28 between the floating gate 27 and the control gate 29, electron emission shown in FIG. 44 becomes prominent. If the insulating film 28 between the floating gate 27 and the control gate 29 is thinner than the gate insulating film 12 between the floating gate 27 and the semiconductor substrate 11, electron emission shown in FIG. 45 becomes prominent. If the insulating film 28 is as thin as the gate insulating film 12, electron emission is given by the sum of two leakage currents.

The expiration date (life time) of the aging device, i.e., the time at which the aging device is turned off is proportional to the amount of electrons accumulated in the floating gate 27, and inversely proportional to the leakage current. The expiration date can be adjusted within a predetermined range by adjusting the electron injection time, the gate volume, the gate area, the impurity concentration, the insulating film thickness, the channel area, the extension region, and the like.

An aging device can also be implemented by a p-type semiconductor substrate instead of the n-type semiconductor substrate, and the source and drain of n-type diffusion layers instead of the source and drain of p-type diffusion layers. In this case, the operation principle and structure are the same except that positive charges (realized by FN tunnel emission of electrons) are first injected into the floating gate and positive charges (realized by direct tunnel injection of electrons) are emitted.

(27th Embodiment)

FIG. 46A is a schematic perspective view showing an aging device according to the 27th embodiment. In the aging device, a gate insulating film 12 is formed on an n-type semiconductor substrate 11, and a floating gate 27 is formed on the gate insulating film 12. A control gate 29 is formed on the n-type semiconductor substrate 11 so as to be adjacent to the floating gate 27.

An insulating film is formed between the floating gate 27 and the control gate 29, but is not illustrated in FIG. 46A.

A p$^+$-type source region 14 and p$^+$-type drain region 15 are so formed as to interpose the gate insulating film 12. The control gate 29 is connected to an external terminal, forming an aging device.

The source region 14 of the aging device is connected to a first functional block 1. The drain region 15 is connected to a second functional block 2.

FIG. 46B is a plan view of the aging device when viewed from the top.

As shown in FIG. 46B, the control gate 29 is formed at a position opposite to the short side of the floating gate 27. An insulating film 28 (not shown in FIG. 46A) is formed between the control gate 29 and the floating gate 27. The control gate 29 is arranged at a position spaced apart from the source region 14 and drain region 15 which are diffusion layers. This arrangement can reduce the influence of the control gate 29 on the diffusion layers.

The time at which the aging device is turned off can be changed by forming devices having different gate widths (short sides) on a single substrate.

FIG. 47 is a plan view for explaining a method of injecting electrons into the floating gate 27 of the aging device.

A negative voltage V1<0 is applied to the control gate 29, and electrons are injected from the control gate 29 into the floating gate 27 by FN tunneling.

If the insulating film 28 between the control gate 29 and the floating gate 27 is sufficiently thin, electrons can be injected by direct tunneling. As a result, the source region 14 and drain region 15 are rendered conductive.

FIG. 48 is a plan view showing emission of electrons from the floating gate 27 to the control gate 29 of the aging device by direct tunneling.

The life time can be set within a predetermined range by adjusting the area by which the floating gate 27 and control gate 29 face each other, because the direct tunnel current is proportional to the area of the facing portion.

An aging device can also be implemented by a p-type semiconductor substrate instead of the n-type semiconductor substrate, and the source and drain of n-type diffusion layers instead of the source and drain of p-type diffusion layers. In this case, the operation principle and structure are the same except that positive charges (realized by FN tunnel emission of electrons) are first injected into the floating gate and positive charges (realized by direct tunnel injection of electrons) are emitted.

(28th Embodiment)

FIG. 49 is a sectional view showing an aging device according to the 28th embodiment. In the aging device, a gate insulating film 12 is formed on an n-type semiconductor substrate 11, and a floating gate 27 is formed on the gate insulating film 12. An insulating film 28 is formed on the floating gate 27, and a control gate 29 is formed on the insulating film 28. A p$^+$-type source region 14 and p$^+$-type drain region 15 are so formed as to interpose the gate insulating film 12. The control gate 29 is connected to an external terminal, forming an aging device.

The source region 14 of the aging device is connected to a first functional block 1. The drain region 15 is connected to a second functional block 2.

In this aging device, the gate insulating film 12 is thinner at an end portion 30 than the remaining portion. The floating gate 27 overhangs the source region 14.

Figure 50:
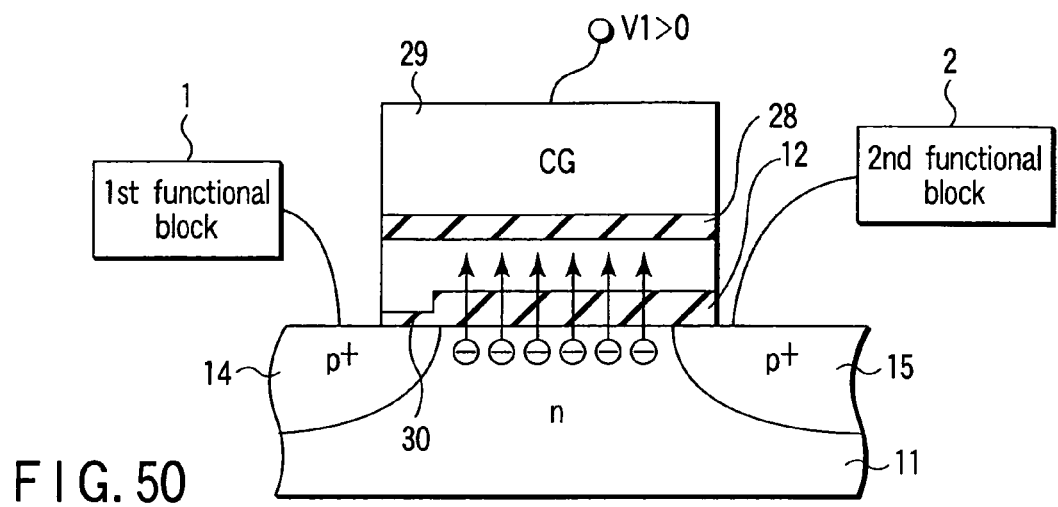
FIG. 50 is a schematic sectional view showing the charge injection method of the aging device according to the 28th embodiment.

FIG. 50 is a sectional view for explaining a method of injecting electrons into the floating gate 27 of the aging device. As shown in FIG. 50, a positive voltage V1>0 is applied to the control gate 29, and electrons are injected from the semiconductor substrate 11 into the floating gate 27 by FN tunneling.

If the gate insulating film 12 between the semiconductor substrate 11 and the floating gate 27 is sufficiently thin, electrons can also be injected by direct tunneling.

Figure 51:
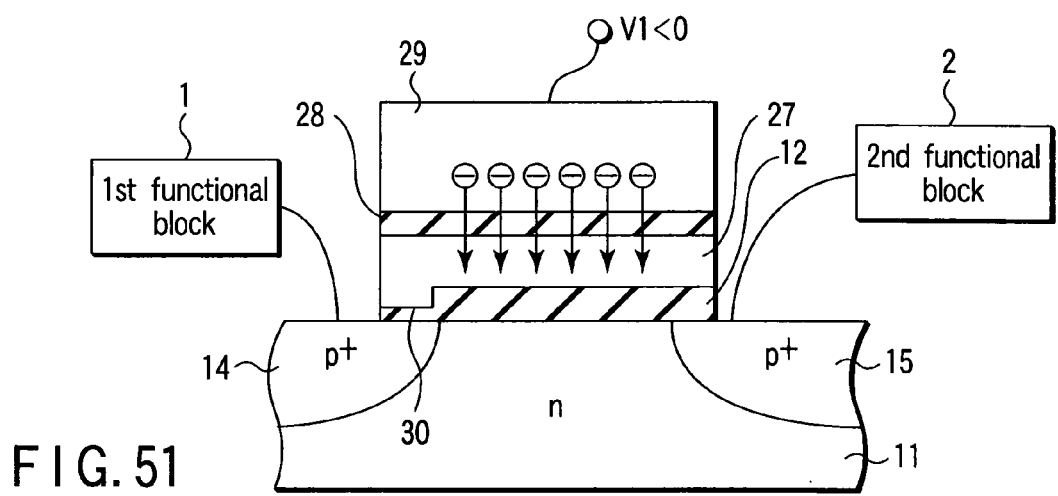
FIG. 51 is a schematic sectional view showing another charge injection method of the aging device according to the 28th embodiment.

FIG. 51 is a sectional view for explaining another method of injecting electrons into the floating gate 27 of the aging device.

As shown in FIG. 51, a negative voltage V1<0 is applied to the control gate 29, and electrons are injected from the control gate 29 into the floating gate 27 by FN tunneling.

If the gate insulating film 28 between the control gate 29 and the floating gate 27 is sufficiently thin, electrons can also be injected by direct tunneling.

After electrons are injected into the floating gate 27, the voltage V1 applied to the control gate 29 is stopped, or the terminal is physically removed, and then followed by packaging.

Accordingly, the source region 14 and drain region 15 are rendered conductive. In other words, even if the voltage of the control gate 29 is 0 V, the aging device is turned on.

Figure 52:
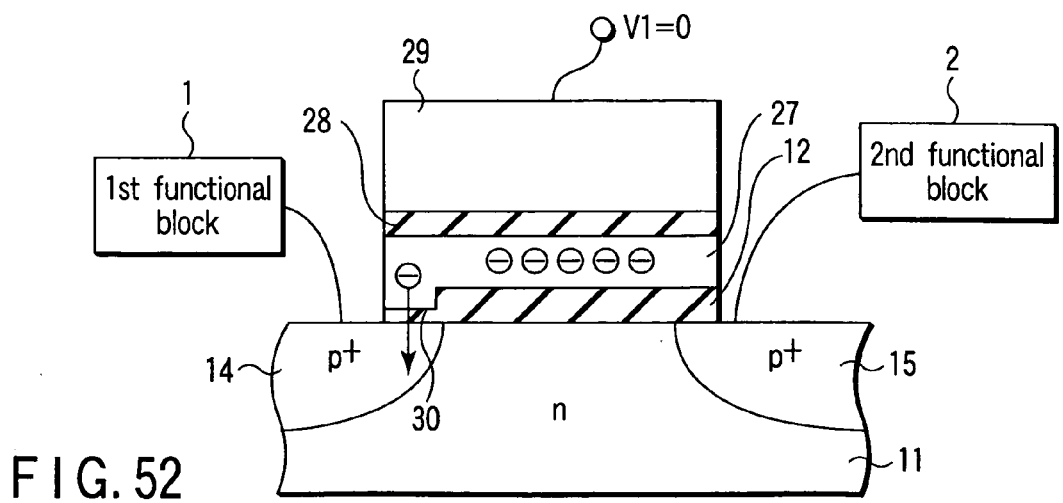
FIG. 52 is a schematic sectional view showing the operation method of the aging device according to the 28th embodiment.

As shown in FIG. 52, redundant electrons accumulated in the floating gate 27 are emitted to the source region 14 by direct tunnel gate leakage via the end portion 30 where the gate insulating film 12 is thinner. The field applied to the channel weakens over time, and when the inversion layer disappears, no current flows between the source region 14 and drain region 15. The first and second functional blocks 1 and 2 cannot be accessed, making the conduction therebetween in an off state.

The expiration date (life time) of the aging device is proportional to the amount of negative charges injected into the gate, and inversely proportional to direct tunnel gate leakage. The expiration date can be set within a predetermined range by adjusting the injection time, the volume of the floating gate 27, the thickness of the gate insulating film 12 at the end portion 30 where the floating gate 27 overhangs the source region 14, the overlapping area of the end portion 30 where the floating gate 27 overhangs the source region 14, and the like.

An aging device can also be implemented by a p-type semiconductor substrate instead of the n-type semiconductor substrate, and the source and drain of n-type diffusion layers instead of the source and drain of p-type diffusion layers. In this case, the operation principle and structure are the same except that positive charges (realized by FN tunnel emission of electrons) are first injected into the floating gate and positive charges (realized by direct tunnel injection of electrons) are emitted. The end portion 30 may be formed on the drain 15 side.

(29th Embodiment)

Figure 53:
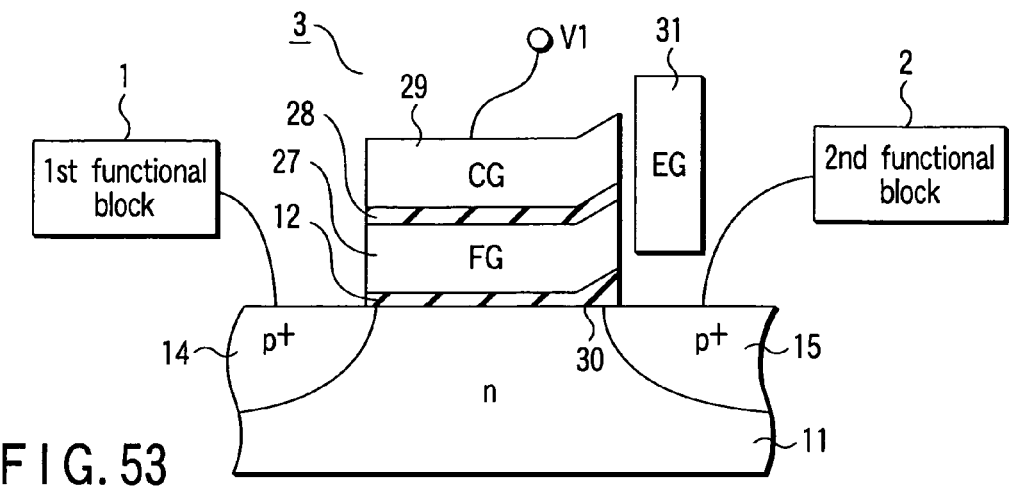
FIG. 53 is a schematic view showing the section and connections of an aging device according to the 29th embodiment.

FIG. 53 is a sectional view showing an aging device according to the 29th embodiment. In the aging device, a gate insulating film 12 is formed on an n-type semiconductor substrate 11, and a floating gate 27 is formed on the gate insulating film 12. An insulating film 28 is formed on the floating gate 27, and a control gate 29 is formed on the insulating film 28. A side gate 31 is formed on the side surfaces of the control gate 29 and floating gate 27. An insulating film is formed between the side gate 31 and the control gate 29 and floating gate 27, but is not illustrated.

A p$^+$-type source region 14 and p$^+$-type drain region 15 are so formed as to interpose the gate insulating film 12. The control gate 29 is connected to an external terminal, forming an aging device.

The source region 14 of the aging device is connected to a first functional block 1. The drain region 15 is connected to a second functional block 2.

In this aging device, the gate insulating film 12 is thicker at an end portion 30 on the side gate 31 side than the remaining portion.

Figure 54:
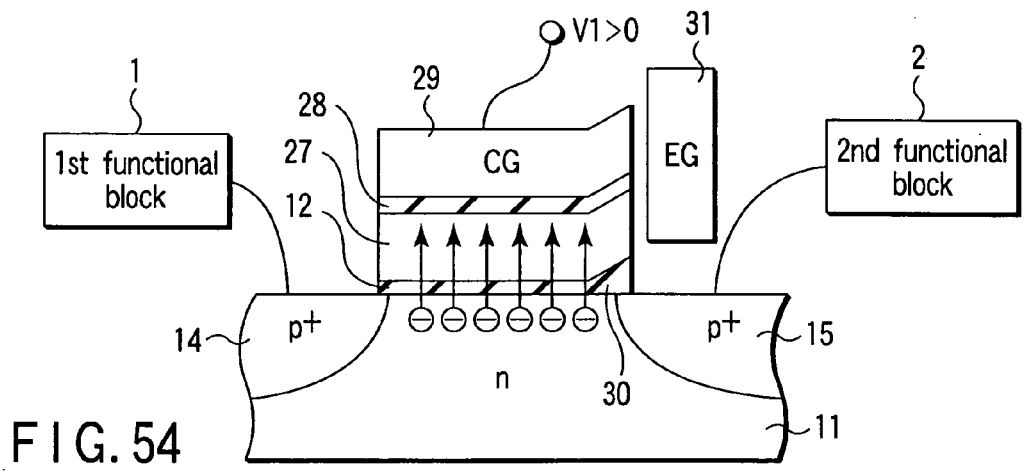
FIG. 54 is a schematic sectional view showing the charge injection method of the aging device according to the 29th embodiment.

FIG. 54 is a sectional view for explaining a method of injecting electrons from the semiconductor substrate 11 into the floating gate 27. As shown in FIG. 54, a positive voltage V1>0 is applied to the control gate 29, and electrons are injected from the semiconductor substrate 11 into the floating gate 27 by FN tunneling.

If the gate insulating film 12 between the semiconductor substrate 11 and the floating gate 27 is sufficiently thin, electrons can also be injected by direct tunneling.

Figure 55:
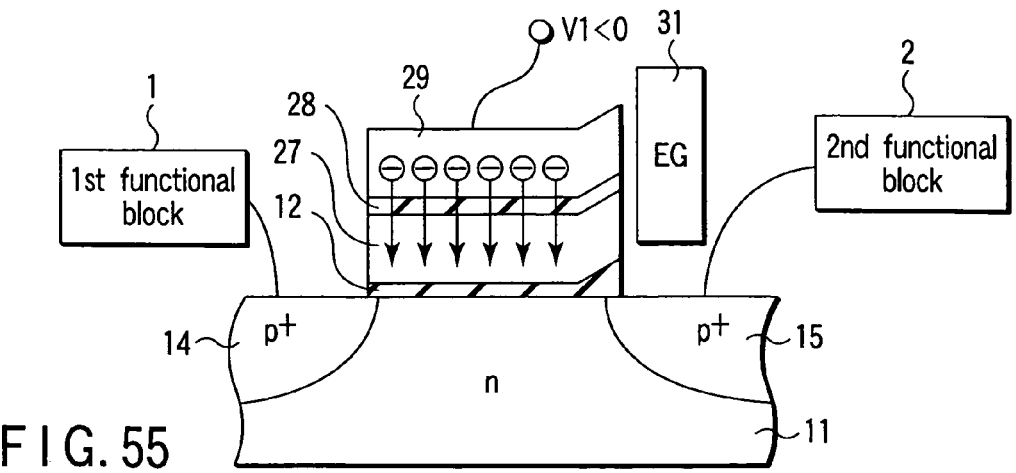
FIG. 55 is a schematic sectional view showing another charge injection method of the aging device according to the 29th embodiment.

FIG. 55 is a sectional view for explaining another method of injecting electrons into the floating gate 27. As shown in FIG. 55, a negative voltage V1<0 is applied to the control gate 29, and electrons are injected from the control gate 29 into the floating gate 27 by FN tunneling.

If the insulating film 28 between the control gate 29 and the floating gate 27 is sufficiently thin, electrons can also be injected by direct tunneling.

After electrons are injected into the floating gate 27, the voltage V1 applied to the control gate 29 is stopped, or the terminal is physically removed, and then followed by packaging.

Accordingly, the source region 14 and drain region 15 are rendered conductive. In other words, even if the voltage of the control gate 29 is 0 V, the aging device is turned on.

As shown in FIG. 56, redundant electrons accumulated in the floating gate 27 are emitted to the semiconductor substrate 11, control gate 29, and side gate 31 by direct tunneling. The potential of the side gate 31 may be floated or kept at a predetermined potential.

In this manner, the field applied to the channel weakens over time, and when the inversion layer disappears, no current flows between the source region 14 and drain region 15.

The expiration date (life time) of the aging device is proportional to the amount of negative charges accumulated in the floating gate 27, and inversely proportional to direct tunneling current. The expiration date can be set within a predetermined range by adjusting the electron injection time, the volume of the floating gate 27, the gate area, the area by which the floating gate 27 and side gate 31 face each other, the thickness of the gate insulating film 12 between the semiconductor substrate 11 and the floating gate 27, the thickness of the insulating film 28 between the floating gate 27 and the control gate 29, the thickness of an insulating film (not shown) between the floating gate 27 and the side gate 31, the extension region, and the like.

An aging device can also be implemented by a p-type semiconductor substrate instead of the n-type semiconductor substrate, and the source and drain of n-type diffusion layers instead of the source and drain of p-type diffusion layers. In this case, the operation principle and structure are the same except that positive charges (realized by FN tunnel emission of electrons) are first injected into the floating gate and positive charges (realized by direct tunnel injection of electrons) are emitted. The side gate 31 and end portion 30 may be formed on the source region 14 side.

The manufacture of an aging device with a double-gate structure described in the above embodiments requires at least two film formation processes at high cost. To prevent this, a method of implementing a long-life, low-cost aging device with a single gate structure using only one polysilicon gate electrode at a low integration degree will be explained in the 30th to 34th embodiments.

(30th Embodiment)

FIG. 57A is a plan view showing an aging device according to the 30th embodiment. FIG. 57B is a sectional view taken along the line 57B—57B in FIG. 57A. FIG. 57C is a sectional view taken along the line 57C—57C in FIG. 57A.

In the 30th embodiment, a control gate 45 is formed in a semiconductor substrate 41. The control gate 45 is electrically isolated from source 42, channel 46, and drain 43 regions (to be referred to as an SGD region hereinafter) by an element isolation region 47 by LOCOS (LOCal Oxidation of Silicon) (FIG. 57C).

As shown in FIG. 57B, the section of the SGD region has a general MOS structure. A channel region 46 is formed below the (floating) gate electrode 44 between the source region 42 and the drain region 43.

The floating gate electrode 44 is formed from polysilicon. As shown in FIG. 57C, the floating gate electrode 44 is formed on the semiconductor substrate 41 via gate insulating films 48 and 49 and the element isolation region 47 so as to be bridged between the control gate 45 and the channel region 46 in the SGD region. The gate insulating films (tunnel oxide films) 48 and 49 on the two sides of the element isolation region 47 can have the same film thickness.

Figure 58A:
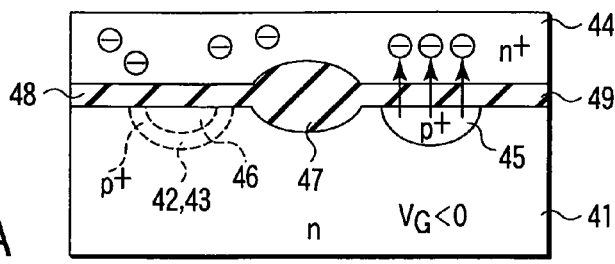
FIG. 58A is a schematic sectional view for explaining the charge injection method of the aging device according to the 30th embodiment.
Figure 58B:
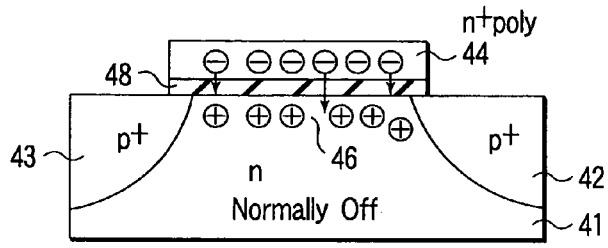
FIG. 58B is a schematic sectional view for explaining the operation principle of the aging device shown in FIG. 58A.
Figure 58C:
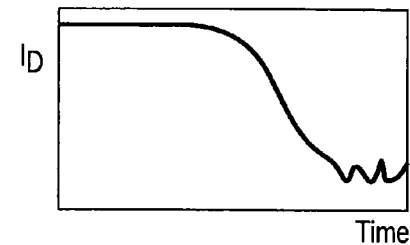
FIG. 58C is a graph showing the aging device shown in FIG. 58A and the life time characteristic.

FIGS. 58A to 58C are views showing a normally-off (automatic turn-off) device for explaining the operation principle of the aging device according to the 30th embodiment. FIG. 58A is a sectional view corresponding to FIG. 57C. Source and drain layers 42 and 43 of $p^+$-type diffusion layers and a control gate 45 of a $p^+$-type diffusion layer are formed in an n-type substrate 41. When a negative high voltage is applied to the control gate 45, electrons are injected into an $n^+$-type polysilicon floating gate 44 by hole tunneling.

Electrons diffuse in the (floating) gate 44 on the SGD region. As shown in FIG. 58B, holes are attracted to the MOSFET channel region 46 to form a channel, turning on the MOSFET. Electrons injected into the floating gate 44 leak to the channel region 46 via the gate insulating film 48 by direct tunneling. The MOSFET is turned off upon the lapse of a predetermined time.

FIG. 58C shows a change in MOSFET drain current $I_D$ over time. The MOSFET is turned off upon the lapse of a predetermined time, which is a feature of a normally-off device.

Figure 59A:
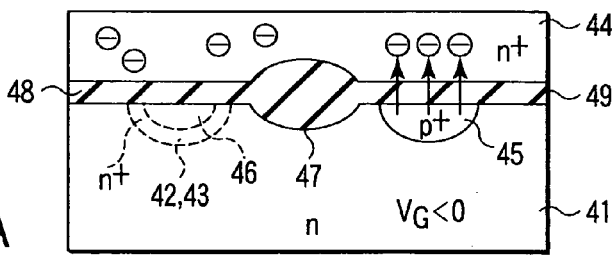
FIG. 59A is a schematic sectional view for explaining another charge injection method of the aging device according to the 30th embodiment.
Figure 59B:
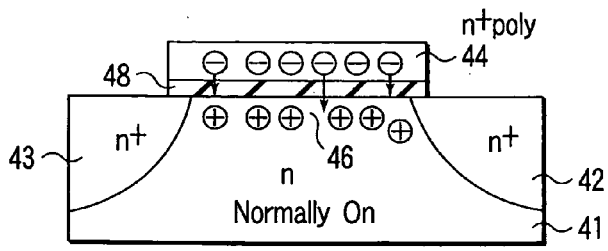
FIG. 59B is a schematic sectional view for explaining the operation principle of the aging device shown in FIG. 59A.
Figure 59C:
FIG. 59C is a graph showing the aging device shown in FIG. 59A and the life time characteristic.

FIGS. 59A to 59C are views showing a normally-on (automatic turn-on) device for explaining the operation principle of another aging device according to the 30th embodiment. FIG. 59A is a sectional view corresponding to FIG. 57C. Source and drain layers 42 and 43 of $n^+$-type diffusion layers and a control gate 45 of a $p^+$-type diffusion layer are formed in an n-type substrate 41. When a negative high voltage is applied to the control gate 45, electrons are injected into an $n^+$-type polysilicon floating gate 44 by hole tunneling.

Electrons diffuse in the (floating) gate 44 on the SGD region. As shown in FIG. 59B, holes are attracted to the MOSFET channel region 46 to turn off the MOSFET. Electrons injected into the floating gate 44 leak to the channel region 46 via the gate insulating film 48 by direct tunneling. The MOSFET is turned on upon the lapse of a predetermined time.

FIG. 59C shows a change in MOSFET drain current $I_D$ over time. The MOSFET is turned on upon the lapse of a predetermined time, which is a feature of a normally-on device.

FIGS. 60A to 60C are views showing a normally-on device for explaining the operation principle of still another aging device according to the 30th embodiment. FIG. 60A is a sectional view corresponding to FIG. 57C. Source and drain layers 42 and 43 of $p^+$-type diffusion layers and a control gate 45 of an $p^+$-type diffusion layer are formed in a p-type substrate 41. When a positive high voltage is applied to the control gate 45, holes are injected into a $p^+$-type polysilicon floating gate 44 by hole tunneling.

Holes diffuse in the (floating) gate 44 on the SGD region. As shown in FIG. 60B, electrons are attracted to the MOSFET channel region 46 to turn off the MOSFET. Holes injected into the floating gate 44 leak to the channel region 46 via the gate insulating film 48 by direct tunneling. The MOSFET is turned on upon the lapse of a predetermined time.

FIG. 60C shows a change in MOSFET drain current $I_D$ over time. The MOSFET is turned on upon the lapse of a predetermined time, which is a feature of a normally-on device.

FIGS. 61A to 61C are views showing a normally-off device for explaining the operation principle of still another aging device according to the 30th embodiment. FIG. 61A is a sectional view corresponding to FIG. 57C. Source and drain layers 42 and 43 of n+-type diffusion layers and a control gate 45 of an n+-type diffusion layer are formed in a p-type substrate 41. When a positive high voltage is applied to the control gate 45, holes are injected into a p+-type polysilicon floating gate 44 by hole tunneling.

Holes diffuse in the (floating) gate 44 on the SGD region. As shown in FIG. 61B, electrons are attracted to the MOSFET channel region 46 to turn on the MOSFET. Holes injected into the floating gate 44 leak to the channel region 46 via the gate insulating film 48 by direct tunneling. The MOSFET is turned off upon the lapse of a predetermined time.

FIG. 61C shows a change in MOSFET drain current $I_D$ over time. The MOSFET is turned off upon the lapse of a predetermined time, which is a feature of a normally-off device.

(31st Embodiment)

Figure 62A:
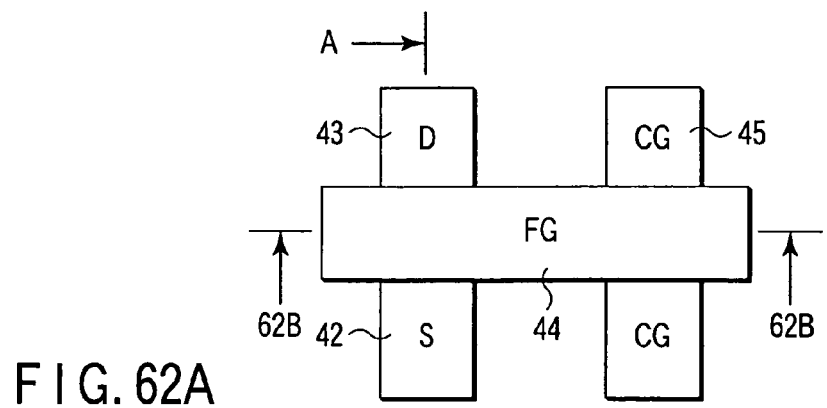
FIG. 62A is a schematic plan view showing an aging device according to the 31st embodiment.
Figure 62B:
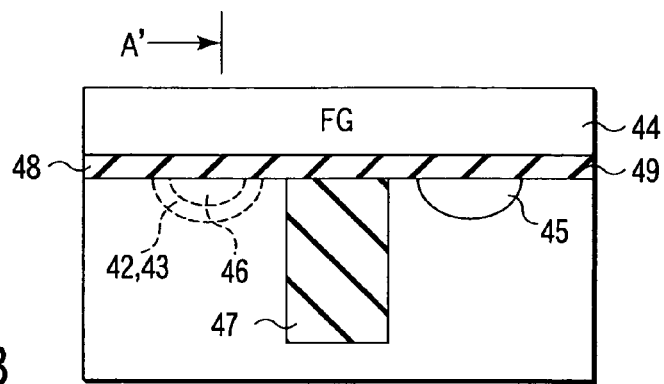
FIG. 62B is a sectional view taken along the line 62B—62B in FIG. 62A.

FIG. 62A is a plan view showing an aging device according to the 31st embodiment. FIG. 62B is a sectional view taken along the line 62B—62B in FIG. 62A. A sectional view taken along the line A–A' is the same as FIG. 57B, and will be omitted.

The 31st embodiment is a modification of the 30th embodiment, and an element isolation region 47 is formed by STI (Shallow Trench Isolation). The remaining structure is the same as that in the 30th embodiment, and a detailed description thereof will be omitted.

(32nd Embodiment)

Figure 63A:
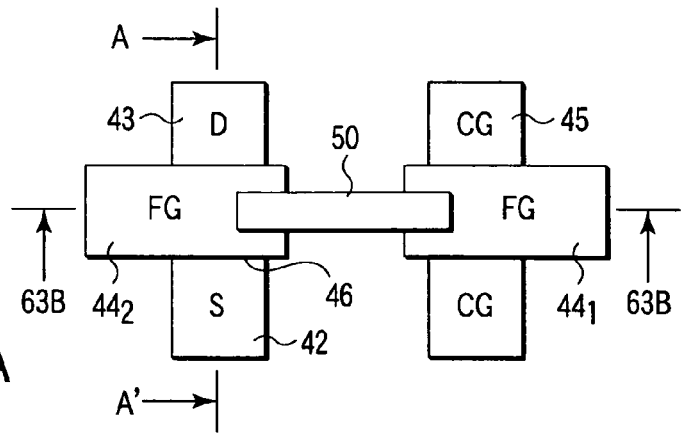
FIG. 63A is a schematic plan view showing an aging device according to the 32nd embodiment.
Figure 63B:
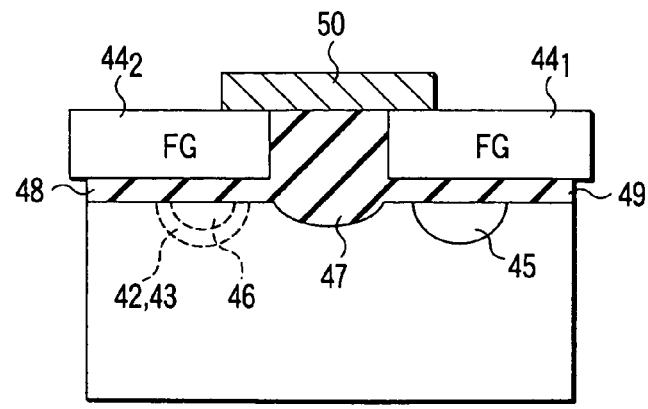
FIG. 63B is a sectional view taken along the line 63B—63B in FIG. 63A.

FIG. 63A is a plan view showing an aging device according to the 32nd embodiment. FIG. 63B is a sectional view taken along the line 63B—63B in FIG. 63A. A sectional view taken along the line A–A' is the same as FIG. 57B, and will be omitted.

The 32nd embodiment is a modification of the 30th embodiment. Floating gate electrodes $44_1$ and $44_2$ are respectively formed from polysilicon on a control gate 45 and on a channel region 46 in the SGD region. The two floating gate electrodes $44_1$ and $44_2$ are connected by a metal interconnection 50. Also in this arrangement, electrons or holes injected from a control gate 45 diffuse from the floating gate $44_1$ into the floating gate $44_2$ via the metal interconnection 50. The aging device can operate similarly to that of the 30th embodiment.

(33rd Embodiment)

Figure 64A:
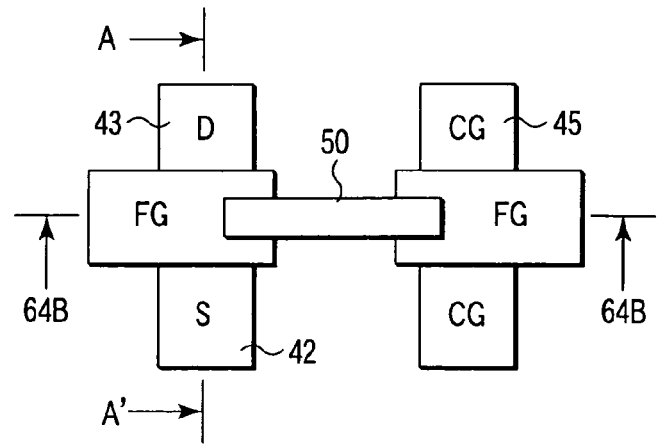
FIG. 64A is a schematic plan view showing an aging device according to the 33rd embodiment.
Figure 64B:
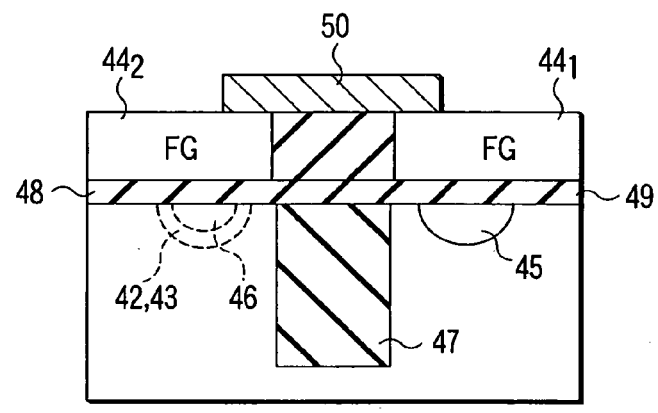
FIG. 64B is a sectional view taken along the line 64B—64B in FIG. 64A.

FIG. 64A is a plan view showing an aging device according to the 33rd embodiment. FIG. 64B is a sectional view taken along the line 64B—64B in FIG. 64A. A sectional view taken along the line A–A' is the same as FIG. 57B, and will be omitted.

In the 33rd embodiment, an element isolation region 47 is formed by STI instead of LOCOS in the 32nd embodiment. Also in this arrangement, the aging device can operate similarly to that of the 30th embodiment.

(34th Embodiment)

Figure 65A:
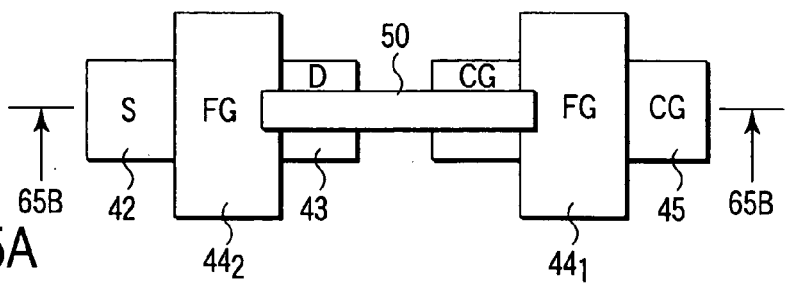
FIG. 65A is a schematic plan view showing an aging device according to the 34th embodiment.
Figure 65B:
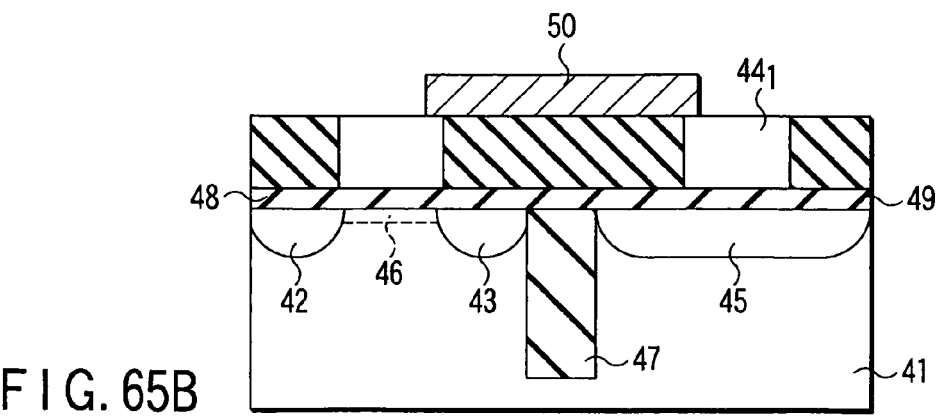
FIG. 65B is a sectional view taken along the line 65B—65B in FIG. 65A.

FIG. 65A is a plan view showing an aging device according to the 34th embodiment. FIG. 65B is a sectional view taken along the line 65B—65B in FIG. 65A. In the 34th embodiment, a control gate 45, and source and drain diffusion layers 42 and 43 are electrically isolated by an element isolation region 47 formed by LOCOS or STI (in FIG. 65B, STI). Floating gate electrodes $44_1$ and $44_2$ are respectively formed from polysilicon on the control gate and the source and drain diffusion layers 42 and 43. The two floating gate electrodes $44_1$ and $44_2$ are connected by a metal interconnection 50.

The 34th embodiment is different from the 33rd embodiment in that the control gate 45 is arranged in the direction of a MOSFET channel 46. By using the metal interconnection 50, the control gate 45 and the source 42 and drain 43 which are electrically isolated from each other can be freely laid out.

Gate insulating films (tunnel oxide films) 48 and 49 on the two sides of the element isolation region 47 can have the same film thickness. The operation principle is the same as that in the 30th embodiment.

An aging device (age-based change device) or aging block applied to the eighth to 13th embodiments will be explained.

(35th Embodiment)

As shown in FIG. 66, the 35th embodiment is related to a detailed circuit arrangement example of the eighth embodiment using a grounded gate MOSFET (to be referred to as a GGMOS hereinafter). The work function of the gate insulating film, substrate-side impurity concentration, or gate material is so adjusted as to attain a normally-on MOSFET 61 which constitutes an aging device 3X. Similar to the above-described embodiments, excessive electrons are accumulated in a charge accumulation gate 62 at the start of a change over time. The presence of excessive electrons keeps the MOSFET 61 OFF.

As an excessive electron injection method, excessive electrons can be injected into the gate via any one of the p-n junction, the pnp junction, the n+nn+ junction, the p+pp+ junction, the npn junction, and the Schottky junction. When a floating gate is used, electrons can be injected from a portion of the insulating member surrounding the floating gate by FN tunneling.

The charge accumulation gate 62 is connected to a p-n diode 63. Upon the lapse of a predetermined time, excessive electrons are emitted to ground (GND) by the diffusion current of the p-n diode 63 connected to the n-type charge accumulation gate 62. The MOSFET 61 shifts to the ON state, the potential of the signal line is clamped, and no signal propagates between the signal line and the internal circuit. In this case, the potential of the signal line may be clamped to that of another signal line or a power supply line in place of ground potential.

FIG. 67 is a sectional view showing an aging device structure using the GGMOS in the direction of channel length according to the 35th embodiment. Each aging device is electrically isolated from other regions by STI element isolation regions 66. A signal line 7 is connected to a drain region 64.

To inject electrons into the charge accumulation gate 62, a high write voltage is applied to, e.g., the signal line 7 to generate collision ions at the junction between the n+-type region of the drain 64 and a p-well 68. Secondary electrons generated at this time are injected into the charge accumulation gate 62.

When electrons are written in the charge accumulation gate 62, an aging device 3X is turned off. In this state, a signal propagates between an I/O terminal 5 and an internal circuit 6. When electrons in the charge accumulation gate 62 are emitted, the potential of the signal line 7 is clamped to the potential of ground (GND) (or another signal line or a power supply line). After that, no signal propagates between the signal line 7 and the internal circuit 6.

FIGS. 68A and 68B are a plan view showing the aging device using the GGMOS according to the 35th embodiment, and a sectional view in the direction of channel width. A p$^+$-type region 67 is formed on a side of the n$^+$-type region for forming the charge accumulation gate 62 on which ground (GND) (or another signal or a power supply line) is connected. With this structure, an aging device which realizes the function of the present invention can be easily formed. As shown in FIG. 68B, it is necessary that the position of a junction between the n-type region 62 and the p-type region 67 is apart from the edge of the STI region 66.

FIGS. 69A and 69B are a plan view showing the aging device using the GGMOS according to a modification of the 35th embodiment, and a sectional view in the direction of channel width. The emission time of excessive electrons is adjusted by changing the area of a portion where the charge accumulation gate 62 and p$^+$-type region 67 form a p-n junction.

In the 35th embodiment, excessive electrons are emitted using the p-n junction 63. Instead of the p-n junction, a tunnel junction using an insulator may be formed to emit excessive electrons by the tunnel current. A Schottky junction may also be used.

The 35th embodiment has described the automatic turn-on aging device 3X using an nMOSFET, but a pMOSFET may be adopted. In this case, excessive holes are injected into the charge accumulation gate 62.

(36th Embodiment)

As shown in FIG. 70, the 36th embodiment is related to a detailed circuit arrangement of the 10th embodiment (FIG. 10). A normally-on switch 8 is formed from an nMOSFET, a normally-off switch 9 is formed from a pMOSFET, and their gates are connected to the output line of an aging block 10.

The aging block 10 is comprised of a load resistor 68 and an automatic turn-on aging device 3X which are series-connected between Vdd and Vss. While excessive electrons exist in the charge accumulation gate, the automatic turn-on aging device 3X is OFF, and the aging block 10 outputs a high voltage (in FIG. 70, Vdd). In this state, the nMOSFET 8 is ON, and the pMOSFET 9 is OFF. A signal propagates between an I/O terminal 5 and a 1st internal circuit 6$_1$.

Upon the lapse of time, the automatic turn-on aging device 3X shifts to the ON state, and the aging block 10 outputs a low voltage (in FIG. 70, Vss). In this state, the nMOSFET 8 is OFF, and the pMOSFET 9 is ON. A signal propagates between the I/O terminal 5 and a 2nd internal circuit 6$_2$.

Figure 71:
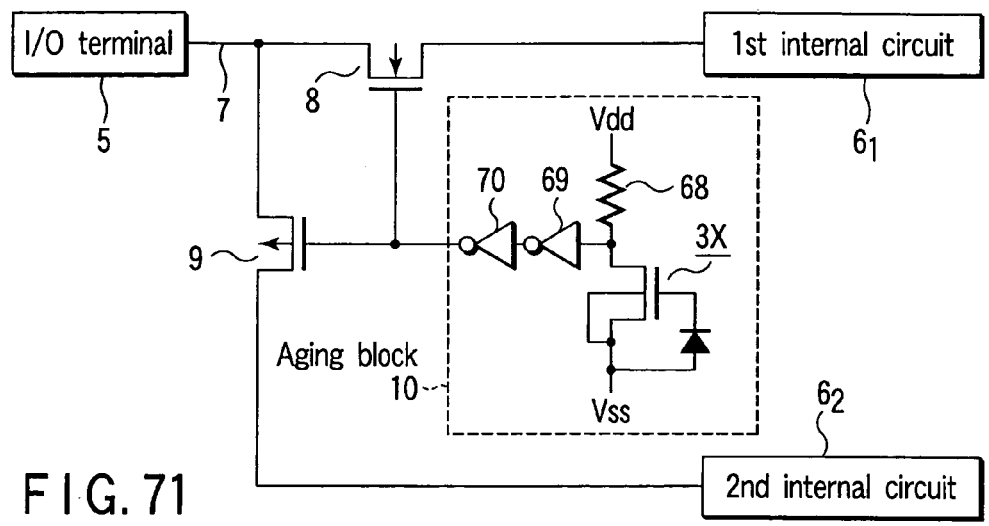
FIG. 71 is a circuit diagram showing an aging device according to a modification to the 36th embodiment.

FIG. 71 shows a modification to the 36th embodiment. In the arrangement of the aging block 10 shown in FIG. 70, the output voltage is determined by resistance distribution of the load resistor 68 and automatic turn-on aging device 3X, and the voltage level of Vdd or Vss is not always ensured.

To solve this, the output from the aging block 10 is stabilized at Vdd or Vss by connecting an even number of inverters 69 and 70 to the output of the automatic turn-on aging device 3X, as shown in FIG. 71.

The aging block 36 described in the 12th embodiment adopts an automatic turn-off aging device. The automatic turn-off aging device can be implemented by modifying the devices in FIG. 67 to FIGS. 69A and 69B. That is, excessive carriers which invert the channel are injected into the charge accumulation gate of a normally-off MOSFET, and discharged upon the lapse of time. The automatic turn-off aging devices 3 in the 14th to 29th embodiments can also be used.

A method of calculating the time (life time) at which the aging device described in the above embodiment changes from ON to OFF will be explained.

Let S be the area of a gate electrode (including a floating gate) which holds charges, $T_{ox}$ be the thickness of a gate insulating film below the gate electrode, $\epsilon_{ox}$ be the permittivity of the oxide, $V_{th}$ be the threshold voltage of the gate insulating film, and $I_{ag}$ be the leakage current from the gate. The life time of the aging device can be calculated by $$\tau_{ag} = \frac{\varepsilon_{ox} S}{T_{ox}} \left[ \frac{\ln(I_{ag}(\Delta_0))}{\left(\frac{\partial I_{ag}}{\partial \Delta}\right)_{\Delta_0}} - \frac{\ln(I_{ag}(\Delta_{ag}))}{\left(\frac{\partial I_{ag}}{\partial \Delta}\right)_{\Delta_{ag}}} \right]$$

Note that $$\Delta_0 = \frac{T_{ox}}{\varepsilon_{ox}} \cdot Q_s, \quad \Delta_{ag} = B_0 \cdot \left( \sqrt{1 + \frac{2|V_{th}|}{B_0}} - 1 \right),$$

$$B_0 = \varepsilon_{si} \cdot q \cdot N_B \cdot T_{ox}^2 / \varepsilon_{ox}^2$$

where $Q_s$ is the surface charge density below the gate electrode by charges injected into the gate electrode, $\epsilon Si$ is the silicon permittivity, q is the elementary charge, $N_B$ is the impurity concentration of the substrate. $I_{ag}$ has a different expression depending on the embodiment. In the 14th and 15th embodiments in which the p-n junction is connected to the gate electrode, $$I_{ag}(\Delta(t)) = qA \left[ \frac{1}{2} \frac{n_i}{\tau_0} W_D \exp\left(\frac{q \cdot V_{eff}(t)}{2k_B T}\right) + \left(\frac{D_e}{L_e} n_{p0} + \frac{D_h}{L_h} p_{n0}\right) \cdot \left(\exp\left(\frac{q \cdot V_{eff}(t)}{k_B T}\right) - 1\right) \right],$$

$$V_{eff}(t) = \frac{B_0}{2} \cdot \left[ \left(1 + \frac{\Delta(t)}{B_0}\right)^2 - 1 \right]$$

is established where A is the junction area, $\Delta(t)$ is the aging potential, $t$ is the time, $n_i$ is the intrinsic carrier concentration, $\tau_O$ is the carrier life time in the depletion layer, $W_D$ is the depletion layer width around the junction, kB is the Boltzmann constant, T is the absolute temperature, $D_e$ is the electron diffusion coefficient, $L_e$ is the electron diffusion length, $n_{po}$ is the electron concentration in p-type silicon, $D_h$ is the hole diffusion coefficient, $L_h$ is the hole diffusion length, and $p_{no}$ is the hole concentration in n-type silicon.

$I_{ag}$ corresponding to the 16th to 19th embodiments is given by $$I_{ag}(\Delta(t)) = qA \left[ \frac{1}{2} \frac{n_i}{\tau_0} W_D \exp\left(\frac{q \cdot V_{eff}(t)}{2k_B T}\right) + \left(\frac{D_e}{L_e} n_{p0} + \frac{D_h}{L_h} p_{n0}\right) \cdot \left(\exp\left(\frac{q \cdot V_{eff}(t) - V_B}{k_B T}\right) - 1\right) \right]$$

where $V_B$ is the base voltage.

In the use of the Schottky junction in the 20th and 21st embodiments, $$I_{ag} = A \cdot R \cdot T^2 \exp\left(-\frac{q\phi_B}{k_B T}\right) \cdot \left[\exp\left(\frac{q \cdot V_{\mathit{eff}}(t)}{k_B T}\right) - 1\right]$$

where R is the Richardson constant, and $\phi_B$ is the Schottky barrier height.

$I_{ag}$ corresponding to the 22nd to 25th embodiments is given by $$I_{ag}(\Delta(t)) = \frac{W_G}{L_G}\mu_n C_{ox}[(V_G - V_{TH})V_{\mathit{eff}}(t) - (V_{\mathit{eff}}(t))^2]$$

where $W_G$ is the gate width of the MOSFET connected to the gate which holds charges, $L_G$ is the gate length of the MOSFET connected to the gate which holds charges, $\mu_n$ is the mobility of the MOSFET connected to the gate which holds charges, $C_{ox}$ is the gate capacitance of the MOSFET connected to the gate which holds charges, and $V_G$ is the voltage applied to the gate of the MOSFET connected to the gate which holds charges.

$I_{ag}$ corresponding to the 26th to 29th embodiments is given by $$I_{ag}(\Delta(t)) = A\frac{24 q m_{DE}}{\pi^2 h^3}\int dE \cdot \sqrt{(E-EC_1)\cdot(E-EC_2)} \cdot (f_1(\Delta(t)) - f_2) \times D(E)$$

where $m_{DE}$ is the density-of-state effective mass, $EC_1$ is the conduction band edge of the floating gate, $EC_2$ is the conduction band edge of the control gate or the silicon surface, $f_1$ is the occupation probability of electrons in the floating gate, $f_2$ is the occupation probability of electrons in the control gate or the silicon surface, and $D(E)$ is the probability at which electrons with energy E tunnel between the floating gate and the control gate. The calculation method is disclosed in Jpn. Pat. Appln. KOKAI Publication No. 2002-76338.

All the expressions of $I_{ag}$ in the present embodiment have been described. The calculation results of the life time ($\tau_{ag}$) by $I_{ag}$ in the use of, e.g., the p-n junction will be described. This calculation reveals the value of $\tau_{ag}$ changing in accordance with various parameters which determine the aging device structure. An optimal device structure can be determined in accordance with manufacturing conditions, system performance, or user's request. Calculation using another $I_{ag}$ can be achieved similarly to this example, and a detailed description thereof will be omitted.

Figure 72:
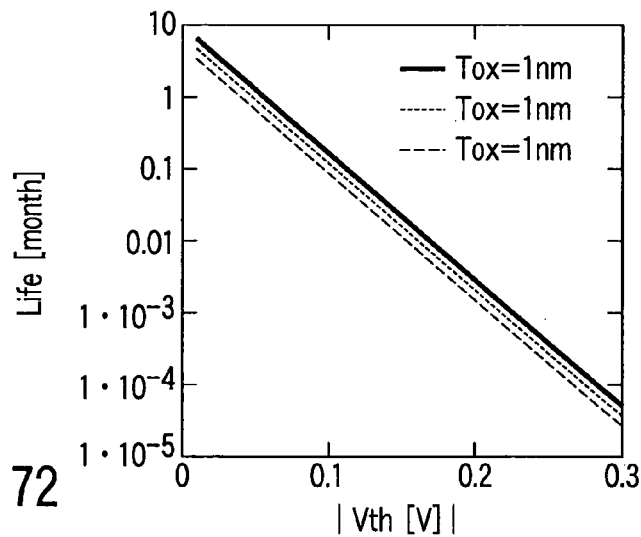
FIG. 72 is a graph showing the threshold voltage dependence of the life time.

FIG. 72 shows the threshold voltage dependence. The abscissa represents the threshold, and the ordinate represents the life time.

As shown in FIG. 72, as the threshold voltage increases, the life time shortens. The threshold voltage control is suitable for adjusting the life time from several weeks to several months by using a semiconductor substrate or the polysilicon impurity concentration.

Figure 73:
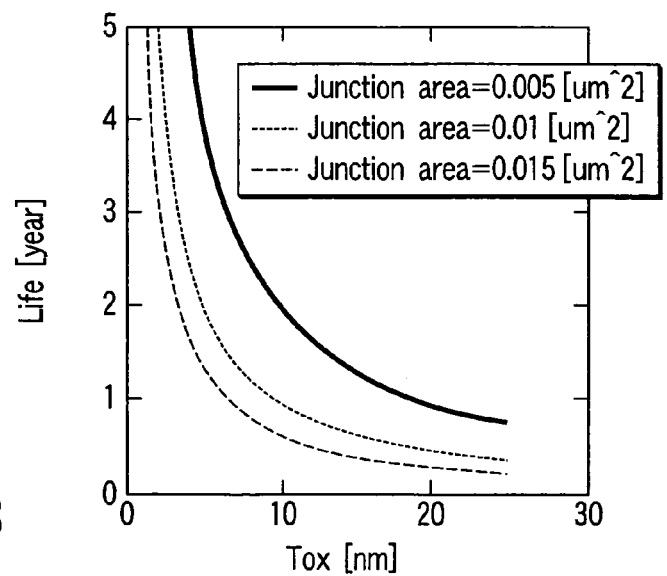
FIG. 73 is a graph showing the gate insulating film thickness dependence of the life time.

FIG. 73 shows the dependence on the film thickness of the gate insulating film. The abscissa represents the thickness of the gate insulating film, and the ordinate represents the life time.

As shown in FIG. 73, as the gate insulating film becomes thicker, the threshold increases and the life time shortens. If the film thickness is over 10 nm, the film thickness dependence is weak, such formation is effective for adjusting the life time for several months.

FIG. 74 shows the dependence on the junction area of the p-n junction. The abscissa represents the junction area of the p-n junction, and the ordinate represents the life time.

As shown in FIG. 74, as the junction area increases, the leakage current increases and the life time shortens. This is effective for adjusting the life time from several months to several years depending on the gate area.

FIG. 75 shows the dependence on the impurity concentration of the p-n junction. The abscissa represents the logarithm of the acceptor concentration at the junction, and the ordinate represents the life time.

As shown in FIG. 75, as the donor or acceptor concentration increases, the life time becomes longer. The life time is effectively adjusted using a region with a relatively gradual slope in FIG. 75. For example, for a donor concentration of $1\times10^{16}$ cm$^{-3}$, the life time almost free from variations can be designed at an acceptor concentration of $1\times10^{17}$ cm$^{-3}$.

As shown in FIG. 74, the life time becomes shorter in proportion to the junction area. By using this property, the life time can be freely adjusted with a small error.

According to the above-described embodiments, the first and second functional blocks can be disconnected or connected upon the lapse of a predetermined time by a semiconductor time switch interposed in or connected to a signal line between the first and second functional blocks. An expiration date can be set for a desired function obtained by the two functions. Upon the lapse of a predetermined time, the information or function of an internal circuit which can be used from an I/O terminal can be switched.

An accurate operation life time of the semiconductor time switch can be set by adjusting the charge injection time into a MOS structure, the gate volume, the junction area, the impurity concentration at the junction, the insulating film thickness, the channel area, the extension region, or the like. The life time determined by structural parameters of the device can be set only by the design or initial charge injection, and a time limit function utilization apparatus which can prevent tampering of the life time can be provided.

In the time limit function utilization apparatus, it is desirable that the first functional block is a memory which stores an encoded encryption key, the second functional block is a decoder which decodes the encryption key, and a desired function is the decoded encryption key.

If the abovementioned life time control technique is presented in low cost, it can be mounted on a wireless IC tag, or a radio frequency identification tag (RFID). There are many applications of RFID on which is mounted an encryption key with a time limit by a solid state aging device. Some examples will be presented hereinafter.

The first example is an application to transportation system. There is many problems in current transportation system, such that all packages in a container cannot be checked one by one, and there is a danger that materials for mass destruction weapons for terrorism, or illegal drugs are mixed up in a general purpose transportation system. So it is under study to legislate to attach RFID on each transportation package for the security of the transportation system.

However, it is not so technically difficult to tamper and reuse RFID, whose information stored therein is illegally renewed after peeling off used RFID from a transportation package. Therefore, used RFID must be reclaimed without fail. Terrorist's possession of leaked RFID from reclaiming, even if it is a small quantity, causes social unrest. Reclaiming itself requires an extra cost. If the encryption key registered in a tag has a time limit by means of a solid state aging device, there is no need to reclaim the tags, and cost is saved without impairment of the security.

The second example is an application to products having a consuming time limit. RFID attachment to a package of a perishable product is under study to secure traceability. However, tampering or replacing of the tag, and exchanging of the package itself reduce half its original effect. Therefore, the officially delivered and controlled encryption key must have a time limit by means of a solid state aging device. The encryption key mounted on RFID cannot be read if the products are not distributed within a consuming time limit, so that consumers can identify the products within the consuming limit or not by means of, for example, a sensor carried by a personal handy phone.

The third example is an application to maintaining of the brand value. Rouge or perfume products out of a consuming limit are sometimes sold at a lower price, so that the manufactures cannot keep the gross sales without lowering the prices of the regular brand products. Consumers are hardly conscious of the consuming limit of such products. Similar to the second example, if the product carries a RFID tag having an encryption key with a time limit by means of a solid state aging device, the tag can inform whether the product is within the consuming limit or not to a personal handy phone carried by a consumer. Thereby, the consumer recognize the presence of the consuming limit of such kind of products.

The fourth example is a peel off sticker having an embedded RFID with a time limit by means of a solid state aging device. This sticker can be attached to a member card, admission ticket and so forth to set a time limit to them, without using a valuable IC card. In this case, consumers (a private concern, school, office, home, friend, and circle) can freely issue a private authentication with a time limit. This will also be applied to votes, official documents and so forth. Thus, tremendous applications are considered by coupling the solid state aging device and RFID.

The applications of the solid state aging device are divide into two major categories. One is a battery-less electronic timer, which is expected to be mounted on a system LSI. The other is an encryption key with a time limit, which is expected to be mounted on RFID. The application to an electric timer will be discussed later.

The semiconductor time switch of the present embodiments comprises source and drain regions which are formed apart from each other in a semiconductor layer, and a gate which is formed in the channel region between the source and drain regions. The first functional block is connected to one of the source and drain regions, and the second functional block is connected to the other one of the source and drain regions, i.e., the source and drain regions are used as the connection terminals of the switch.

The semiconductor time switch is configured such that a current flows between the source and drain regions by supplying charges to the gate in advance, charges escape from the gate over time, and no current flows between the source and drain regions upon the lapse of a predetermined time.

Alternatively, the semiconductor time switch may be configured such that no current flows between the source and drain regions by supplying charges to the gate in advance, charges escape from the gate over time, and a current flows between the source and drain regions upon the lapse of a predetermined time.

Charges are injected into the gate via any one of a p-n junction, pnp junction, $n^+nn^+$ junction, $p^+pp^+$ junction, npn junction, and Schottky junction.

The gate of the semiconductor time switch is formed by vertically stacking on a semiconductor layer a p-n junction, pnp junction, $n^+nn^+$ junction, $p^+pp^+$ junction, npn junction, or Schottky junction.

The semiconductor time switch comprises source and drain regions which are formed apart from each other in a semiconductor layer, a floating gate which is formed in the channel region between the source and drain regions, and a control gate which is formed near the floating gate. The first functional block is connected to one of the source and drain regions, and the second functional block is connected to the other one of the source and drain regions.

The time switch is configured such that a conduction is made, or not made through the path of the source and drain regions by supplying charges to the floating gate in advance, charges escape from the floating gate over time, and conduction is not made, or made through the path of the source and drain regions upon the lapse of time.

Charges escape from the floating gate into at least one of the source region, drain region, channel region and control gate.

When a floating gate is used, charges are injected to the floating gate from a portion of the insulating member surrounding the floating gate by FN tunneling or direct tunneling.

A side electrode may be formed near the side surface of the floating gate and charges escape from the floating gate into the side gate.

The above-described embodiments have described the arrangement of the time limit function utilization apparatus mainly in terms of the system. The following embodiments are related to a semiconductor integrated circuit which can suppress the influence of the presence of a false bit or manufacturing variations in aging device structure parameters (tunnel insulating film thickness, impurity concentration, junction area, gate end shape, and the like) on the life time of the aging device, and enhance the controllability of the electronic life time.

According to the following embodiments, a semiconductor integrated circuit is designed such that not a single aging device but a plurality of aging devices are parallel-connected and a long-life cell (not the longest-life cell) determines the life time of the aging circuit. Variations in the use of a single aging device can be suppressed, and variations by a false bit can also be prevented.

The influence of the presence of a false bit or manufacturing variations in aging device structure parameters on the life time of the aging device can be suppressed, enhancing the controllability of the electronic timer time.

The aging devices of the foregoing embodiments may be replaced with those of the following embodiments to obtain better controllability.

Detailed embodiments of the aging device have already been explained, but the aging device will be summarized before a description of the following embodiments.

FIG. 76 is a diagram showing the basic arrangement of the aging device. The main part of the aging device is comprised of a functional region 111 with an age-based change, and a sensing part 112 which senses a functional change. The sensing part 112 receives an input signal from an input part 113, and an output part 114 outputs an output signal in accordance with the input signal. In this integrated circuit, the functional region with an age-based change is desirably a charge accumulation layer accompanied by leakage while the power supply is disconnected. The sensing part is desirably, e.g., a channel which converts a field effect into an electrical resistance.

Figure 77:
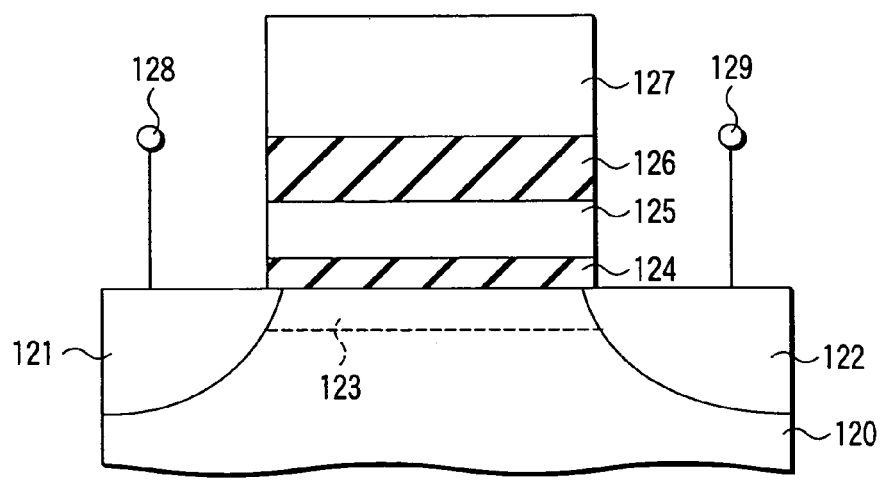
FIG. 77 is a sectional view showing the first concrete example which realizes the basic arrangement of the aging device.

FIG. 77 shows the first concrete example (corresponding to FIG. 41 described above) which realizes the basic arrangement of the aging device. A source region 121 and drain region 122 are formed apart from each other in the surface of an Si substrate 120. A floating gate 125 is formed via a tunnel insulating film (first gate insulating film) 124 above a channel 123 between the source region 121 and the drain region 122. A control gate 127 is formed via an insulating film (second gate insulating film) 126 on the floating gate 125. A source electrode 128 and drain electrode 129 are respectively formed in the source region 121 and drain region 122.

This arrangement is basically the same as that of an EEPROM with a two-layered gate structure except that the tunnel insulating film 124 is thinner than that of a general memory cell. More specifically, the tunnel insulating film of a general memory cell is about 10 nm thick, whereas the tunnel insulating film of a memory cell used for the aging device is as thin as about 1 to 6 nm.

In this case, the floating gate 125 corresponds to the functional region with an age-based change; the channel 123, to the sensing part for a functional change; the source electrode 128 and drain electrode 129, to the input part; the potential difference between the source region 121 and the drain region 122, to the input signal; the drain electrode 129, to the output part; and the drain current, to the output signal.

Figure 78A:
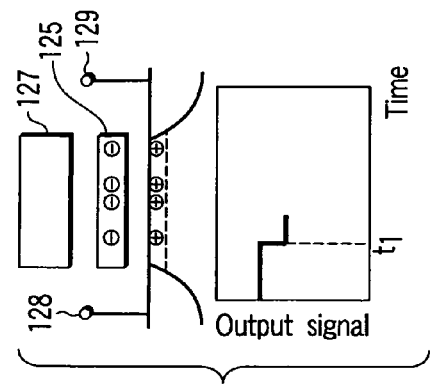
FIGS. 78A to 78F are schematic views for explaining that the arrangement in FIG. 77 functions as an aging device.

FIGS. 78A to 78F are views for explaining that the concrete example shown in FIG. 77 functions as an aging device. For example, the source and drain are p-type diffusion layers, and the substrate is formed from n-type Si. As pre-processing, a high field is applied between the substrate interface and the floating gate by means of the control gate. Electrons are injected from the channel into the floating gate by FN tunneling. At this time, the substrate interface is inverted, and holes are concentrated to open a channel in the substrate interface, as shown in FIG. 78A.

Figure 78B:
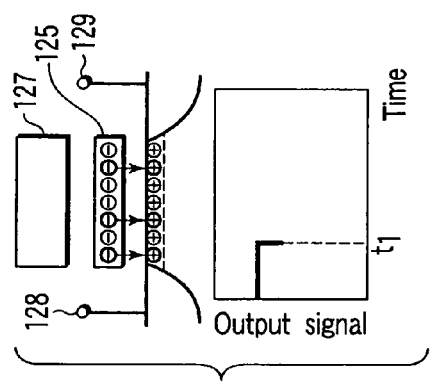
Figure 78C:
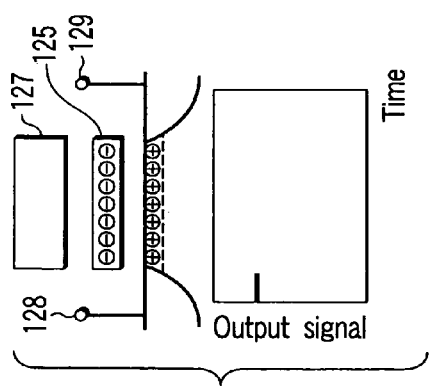

Electrons in the floating gate directly tunnel to the substrate interface over time in this state, decreasing the channel field. Originally, the field is continuously decreased by direct tunneling because the elementary charge is very small. For descriptive convenience, the field discontinuously decreases at time $t_1$. As shown in the graphs of FIGS. 78B and 78C, the output signal which appears as a drain current discontinuously changes over time.

Figure 78D:
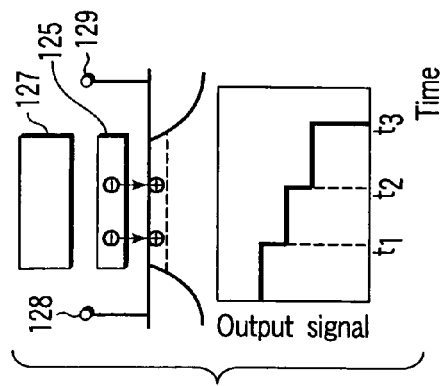
Figure 78E:
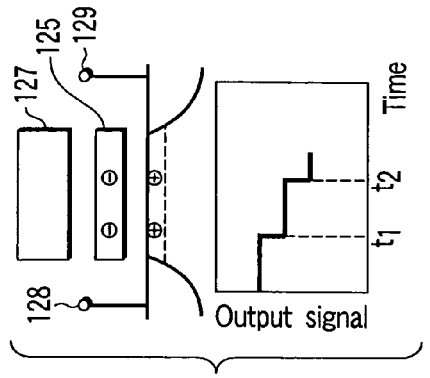
Figure 78F:
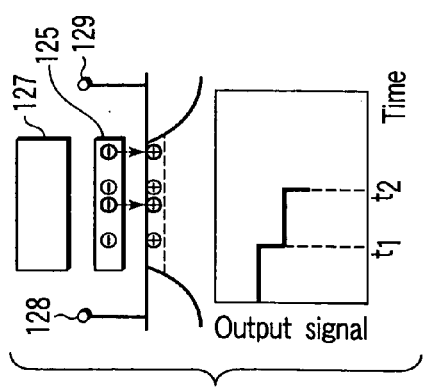

After that, as shown in FIG. 78D, direct tunneling occurs again at time $t_2$, resulting in a state as shown in FIG. 78E. Direct tunneling occurs at time $t_3$, and all electrons injected into the floating gate are removed, as shown in FIG. 78F. The channel disappears, and no output signal is supplied after time $t_3$. In this example, the life time of the aging device is the time at which accumulated charges are removed. Hence, the time in which the output signal increases in a normally-on aging device can also be called the life time.

Figure 79:
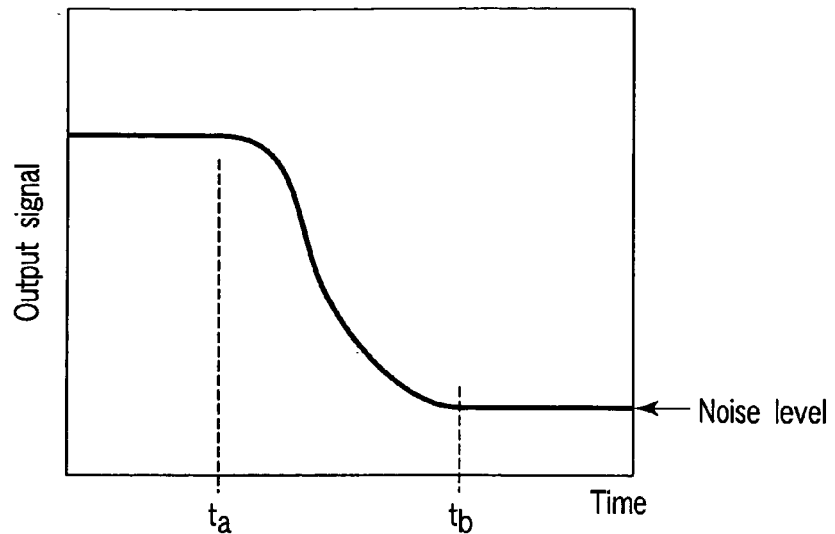
FIG. 79 is a graph showing an age-based change in an output signal from the aging device in FIG. 77.

The temporal change in discontinuous output signal has been described for convenience, but the output signal continuously changes in practice, as shown in FIG. 79. Electric field decrease occurs at an interval between time ta and time tb, the channel finally disappears, and the output signal decreases to the noise level. The aging device utilizes this age-based change from time ta to time tb. The same effects can also be obtained when the roles of electrons and holes are replaced or the n type and p type are replaced, and a detailed description thereof will be omitted.

Figure 80:
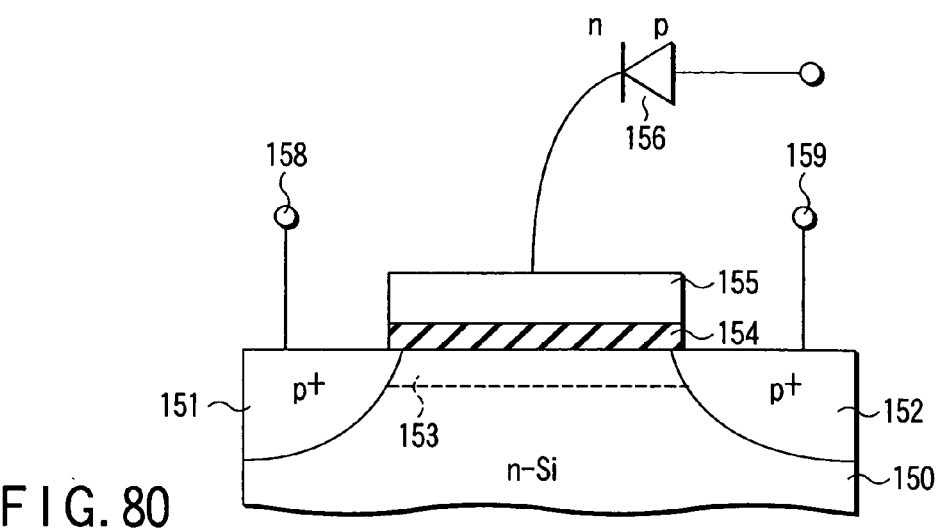
FIG. 80 is a sectional view showing the second concrete example which satisfies the basic arrangement of the aging device.

FIG. 80 shows the second concrete example (corresponding to FIG. 14 described above) which realizes the basic arrangement of the aging device. A $p^+$-type source region 151 and $p^+$-type drain region 152 are formed apart from each other in the surface of an n-type Si substrate 150. A gate 155 is formed via an insulating film 154 above a channel 153 between the source region 151 and the drain region 152. A p-n junction 156 for controlling the leakage current is formed on the gate 155. A source electrode 158 and drain electrode 159 are respectively formed in the source region 151 and drain region 152.

In this case, the gate 155 and p-n junction 156 correspond to the functional region with an age-based change; the channel 153, to the sensing part for a functional change; the source electrode 158 and drain electrode 159, to the input part; the potential difference between the source region 151 and the drain region 152, to the input signal; the drain electrode 159, to the output part; and the drain current, to the output signal.

The function with an age-based change is the same as that of the first concrete example except that direct tunneling is replaced by the leakage current of the p-n junction, and a description thereof will be omitted. The same effects can also be obtained when the roles of electrons and holes are replaced or the n type and p type are replaced, and a detailed description thereof will be omitted.

Figure 81:
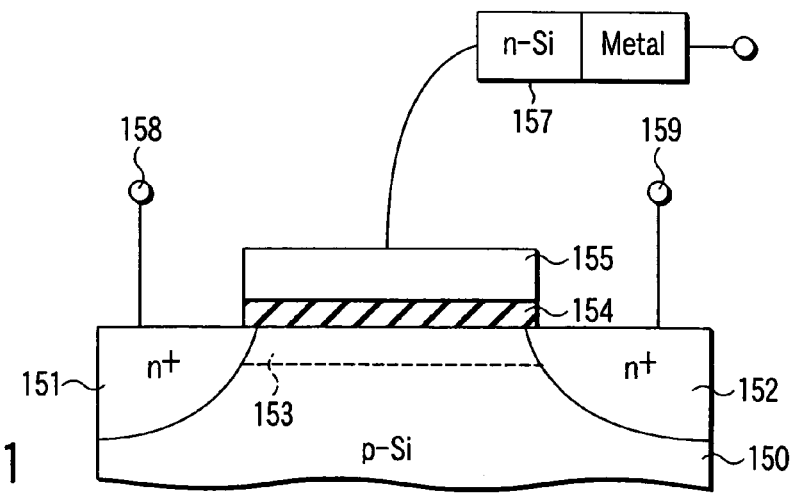
FIG. 81 is a sectional view showing the third concrete example which satisfies the basic arrangement of the aging device.

FIG. 81 shows the third concrete example (corresponding to FIG. 33 described above) which realizes the basic arrangement of the aging device. The third concrete example is different from the second concrete example shown in FIG. 80 in that a Schottky junction 157 is arranged in place of the p-n junction 156. In this case, the gate 155 and Schottky junction 157 correspond to the functional region with an age-based change. The function with an age-based change is the same as that of the first concrete example except that direct tunneling is replaced by the leakage current of the Schottky junction, and a description thereof will be omitted. The same effects can also be obtained when the roles of electrons and holes are replaced or the n type and p type are replaced, and a detailed description thereof will be omitted.

In this manner, any aging device causes an age-based change in the power-off state, and an output signal powered and sensed only in read time changes over time. Embodiments of a semiconductor integrated circuit using an aging device of this type will be described.

(37th Embodiment)

Figure 82:
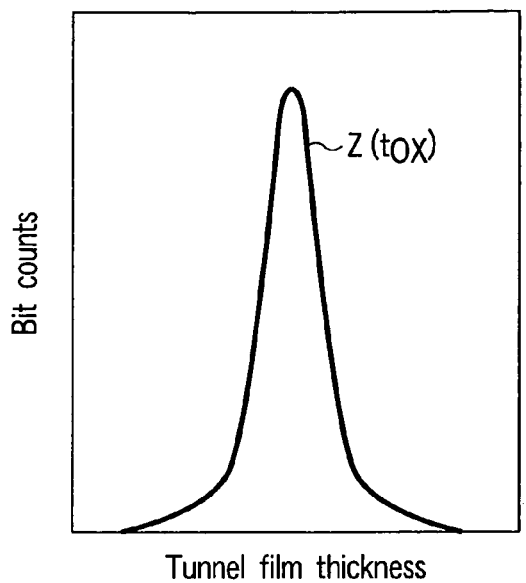
FIG. 82 is a graph showing the bit count density of film thickness variations.

In an aging device as shown in FIG. 77, the film thickness of a tunnel insulating film (e.g., oxide film) on the chip is considered to have a normal distribution with a small full width at half maximum, as shown in FIG. 82. Assuming that the distribution function is the density of bits($Z(T_{ox})$), (the number of bits)·$Z(T_{ox})$·$\delta T_{ox}$ represents the number of bits between $[T_{ox}-\delta T_{ox}/2, T_{ox}+\delta T_{ox}/2]$.

Figure 83:
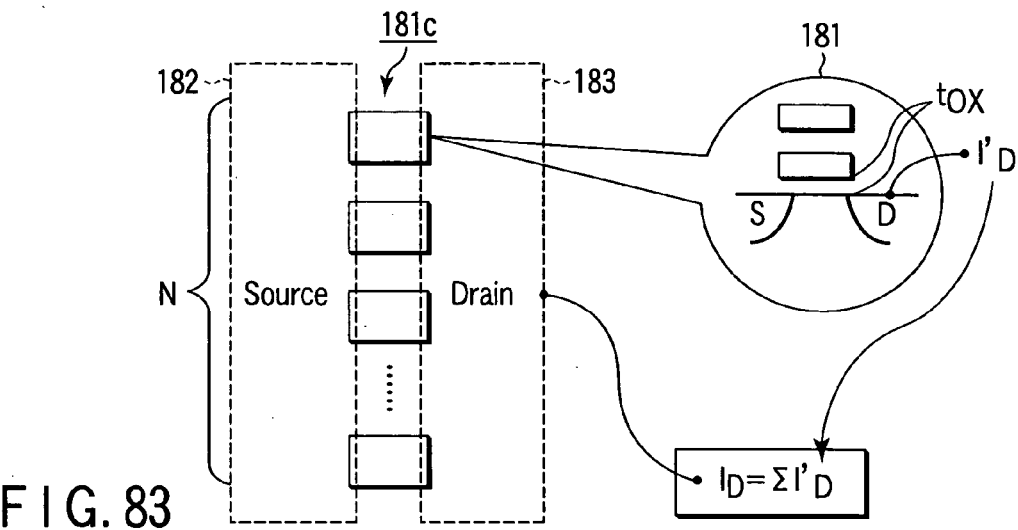
FIG. 83 is a schematic view showing parallel-connected aging devices in an aging circuit according to the 37th embodiment.
Figure 84:
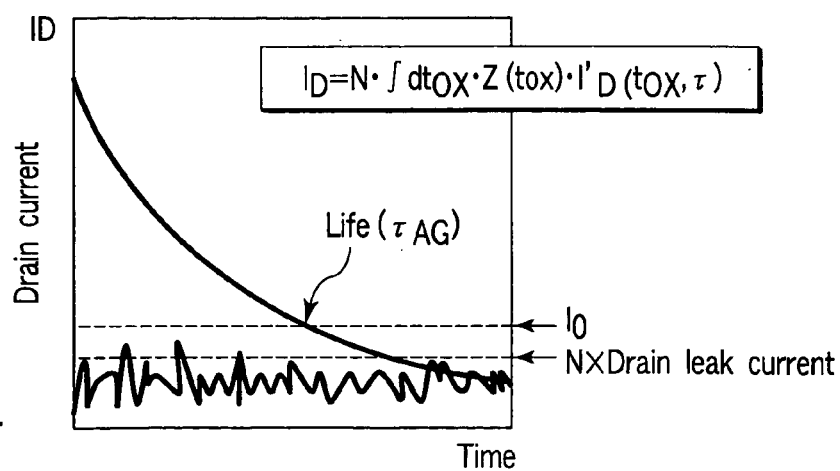
FIG. 84 is a graph showing the relationship between the drain current characteristic and the life time.

As shown in FIG. 83, the terminals (in this example, drain layers) of N aging devices having such tunnel film thickness distribution are parallel-connected. In FIG. 83, reference numeral 181 denotes an aging device; 181c, a circuit in which plural aging devices 181 are connected in parallel; 182, a source; and 183, a drain. At this time, a total drain current $I_D$ can be defined by the sum of drain currents $I_D'$ of aging devices 181:

$$I_D = N \cdot \int dT_{ox} \cdot Z(T_{ox}) \cdot I_D'(T_{ox}, \tau) \qquad (8)$$

where τ is the parameter representing the time. Charges accumulated in the floating gate are removed over the time τ, and $I_D$ decreases over τ. As shown in FIG. 84, τ obtained when $I_D$ decreases to a reference signal $I_0$ set at a level higher than the total drain leak or noise level is regarded as a life time $\tau_{AG}$ in the case of a normally-off type. This means that the influence of noise or off-leak can be eliminated by setting $I_0$.

Figure 85:
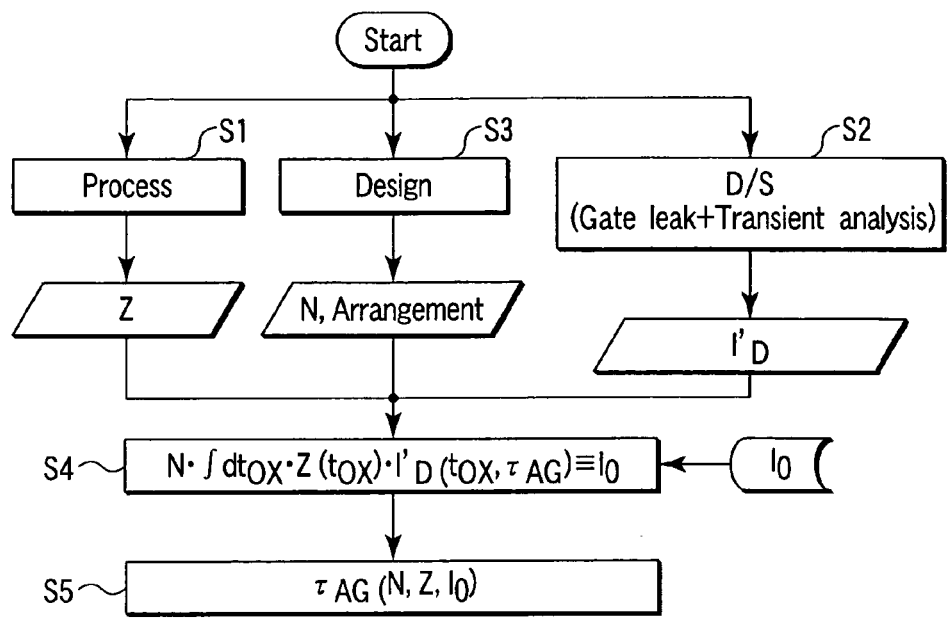
FIG. 85 is a flow chart showing a process of determining the total life time.
Figure 86:
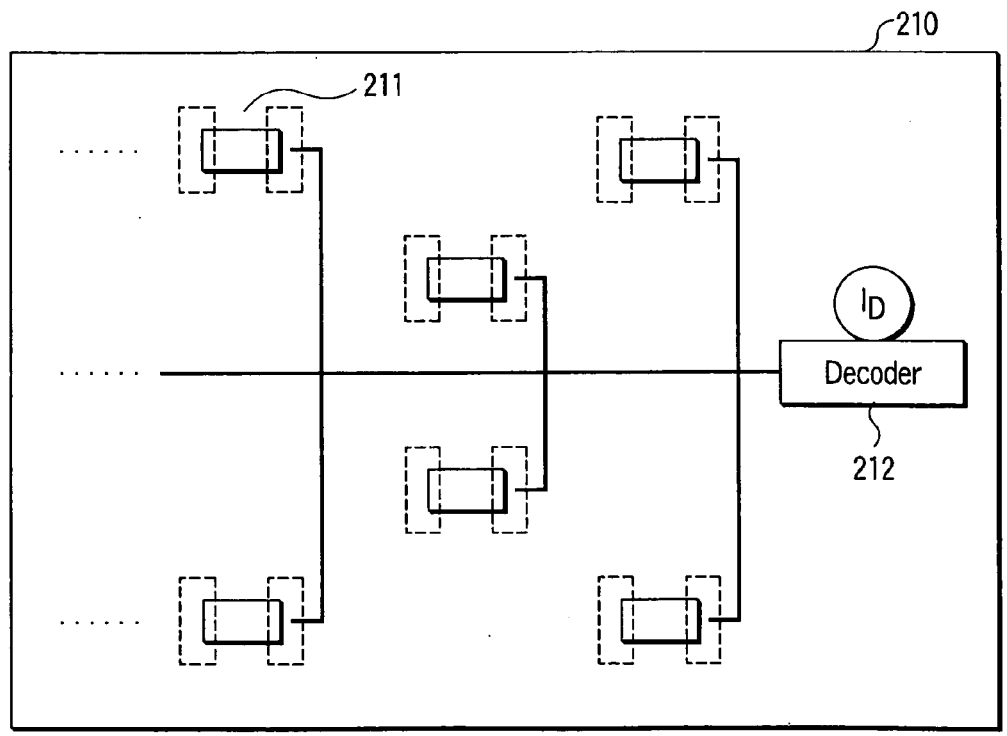
FIG. 86 is a view showing an example in which parallel-connected aging devices are dispersedly arranged.

FIG. 85 shows the step of realizing this. The process is adjusted to obtain a desired Z (step S1). The gate current of each aging device is obtained by device simulation or actual measurement (step S2). The gate current is obtained for each film thickness. Parallel-connected cells need not be arranged in line, and may be spread on the chip, as shown in FIG. 86. In FIG. 86, reference numeral 210 denotes a chip; 211, each cell; and 212, a decoder which adds output signals from the cells 211 and reads some information therefrom. The number (N) of parallel-connected cells and the arrangement on the chip are determined by the design (step S3).

The total drain current $I_D$ can, therefore, be predicted using equation (8). An equation by which $I_D$ becomes equal to the reference signal $I_0$ is solved (step S4), obtaining the total life time $\tau_{AG}$ as a function of N, Z, and $I_0$ (step S5).

A method of determining $\tau_{AG}$ from the film thickness distribution within the chip has been described. In practice, the average of the distribution, the variance, and the like are slightly different between chips. If $I_0$ is set as small as possible and the longest-life cell determines the total life time $\tau_{AG}$, the right trail of the distribution Z varies due to variations between chips, so that $\tau_{AG}$ more greatly varies.

In other words, development of a manufacturing process which reduces distribution variations between chips to a negligible degree means that the longest-life aging device among parallel-connected aging devices can determine the total life time $\tau_{AG}$. However, it is difficult and not practical to develop a manufacturing process free from variations between chips. The 37th embodiment proposes a life time determination method which can permit not only variations within a chip but also manufacturing variations between chips.

More specifically, a predetermined offset is set between the noise level and the reference signal level $I_0$, and the time until the output signal $I_D$ from the aging device reaches the reference signal level $I_0$ is defined as the total life time $\tau_{AG}$. The defined total life time $\tau_{AG}$ is shorter than the life time of the largest film thickness (longest life time) within the chip. The longest life time varies between chips, and $I_0$ must be selected such that $\tau_{AG}$ defined by $I_0$ becomes shorter than the shortest of the longest life time of the chip. The manufacturing process must also be so adjusted as to make variations in longest life time between chips fall within a predetermined range. Considering them, $I_0$ is set, and the process shown in FIG. 85 is executed.

Figure 101:
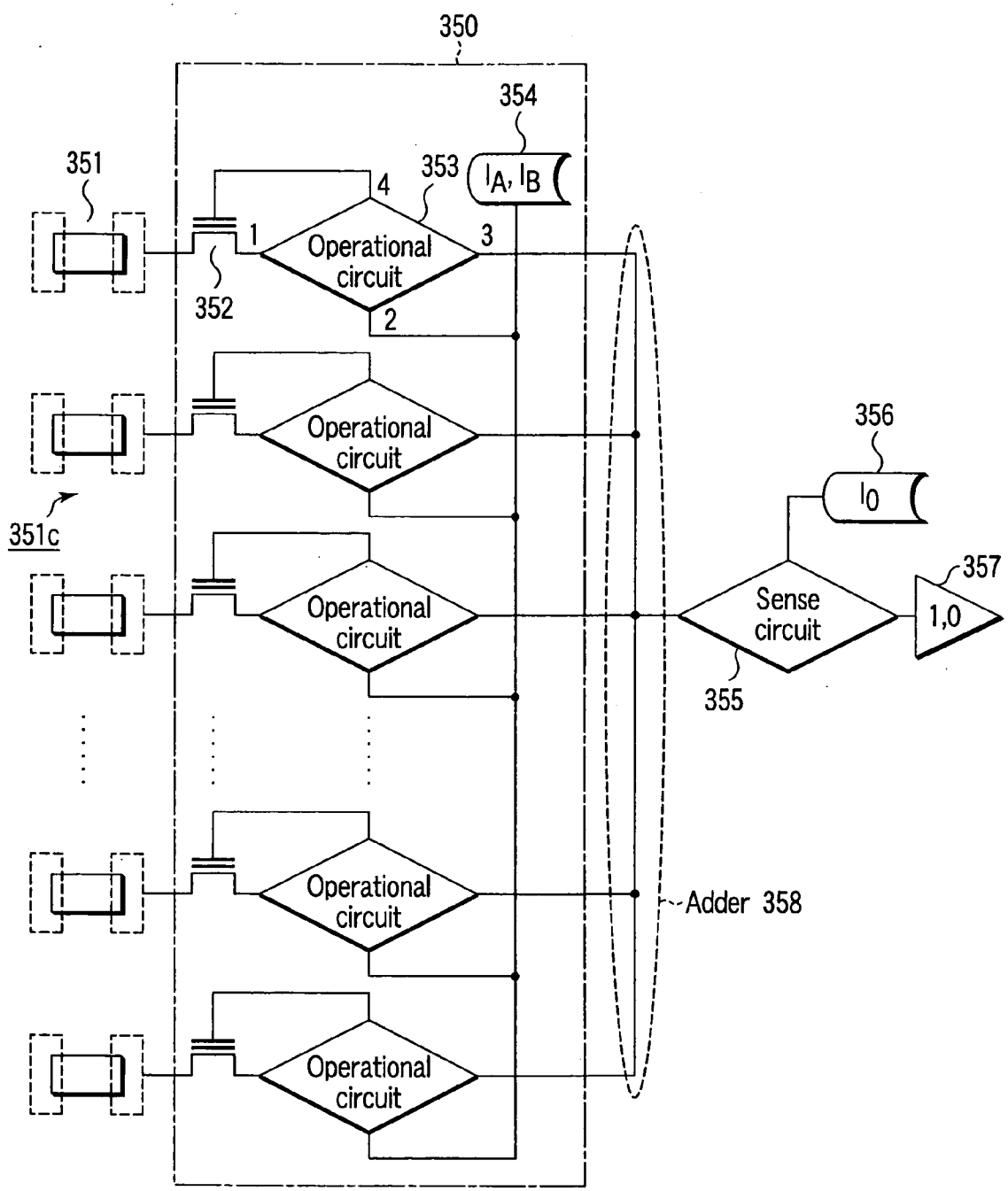
FIG. 101 is a view showing a circuit arrangement in which a trimming circuit is incorporated in a parallelized aging circuit.

As an actual device arrangement, a memory which stores the reference signal $I_0$, and a sense circuit which compares an output as the sum of output signals from a plurality of aging devices with the reference signal $I_0$ are arranged on the output stage of an aging device parallelized circuit (aging circuit), as shown in FIG. 101. The life time of the aging circuit is determined from the comparison result of the sense circuit.

Figure 87:
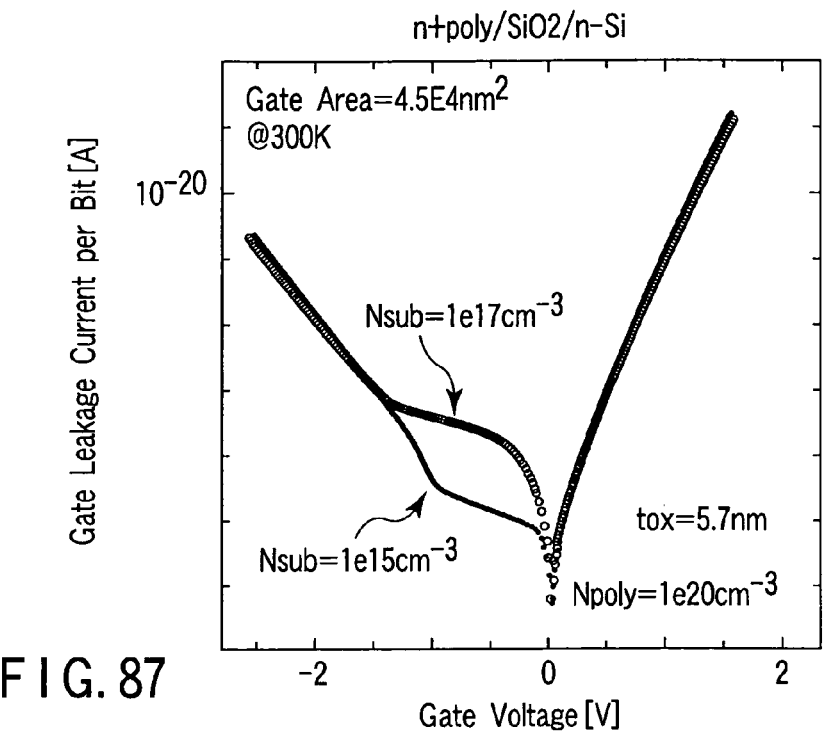
FIG. 87 is a graph showing the influence of the impurity concentration on the gate leakage current.

The structure parameters which influence the life time are not only the tunnel insulating film thickness. The substrate impurity concentration, which influences the gate leakage phenomenon, is also important, as shown in FIG. 87. The impurity concentrations of the well, HALO, diffusion layer, gate polysilicon, and the like are also known to influence the life time. In the above-described method, the tunnel insulating film thickness has been exemplified. The method can be applied even when the tunnel insulating film thickness is replaced by the impurity concentration of the well, HALO, diffusion layer, gate polysilicon, substrate, or the like.

The method can also be applied when the tunnel insulating film thickness is replaced by the gate area or gate end shape. In the above-described method, the cell structure is a nonvolatile memory structure. The method can also be applied when a p-n junction or Schottky junction is connected to the gate of a MOSFET or the cell structure is integrated. The impurity concentration at the junction, the junction area, and the like are structure parameters which influence the life time, so that they are the objects to which the abovementioned method is applied. The method can also be applied to a single electronic transistor.

The above-mentioned structure parameters which influence the life time are merely some of the structure parameters which should be considered. The method of the 37th embodiment can be modified into a form optimal for a corresponding structure parameter. This also applies to trimming to be described later.

Figure 88A:
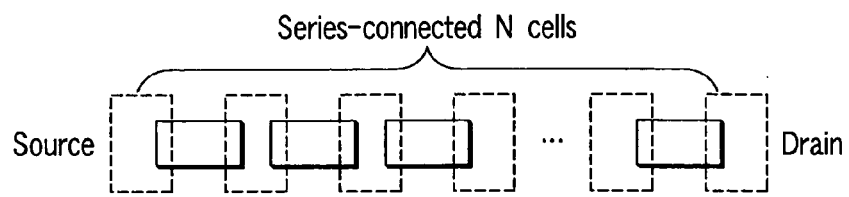
FIGS. 88A and 88B are a plan view and graph, respectively, showing the fact that a false bit dominates the life time when aging devices are series-connected.
Figure 88B:
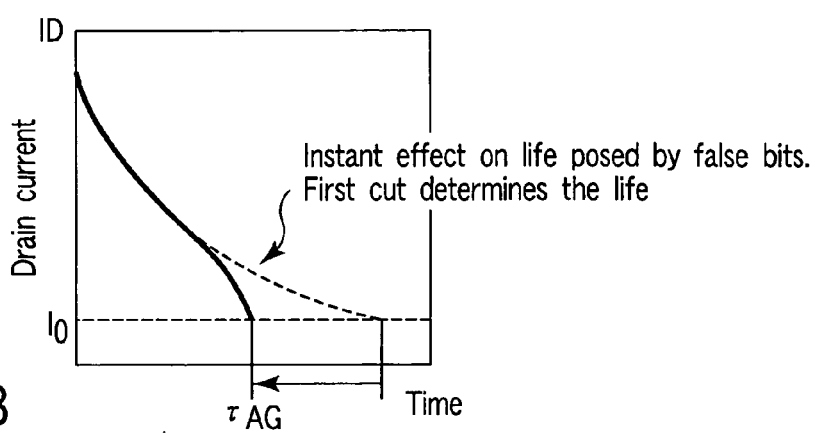

This embodiment can cope with a false bit. Assume that a plurality of aging devices are series-connected, as shown in FIGS. 88A and 88B. In this case, if one of N series-connected cells comes to the end of its life time, the drain current does not flow at the rightmost end, and the system determines the end of the life time as a whole. This means that the shortest-life aging device determines the total life time $\tau_{AG}$, contrarily to the parallel-connected aging devices. If even one of the N aging devices suffers a defect, for some reason, and the signal stops earlier than the originally set life time, the life time of the entire circuit is shortened in accordance with the defective aging device.

In the parallel-connected aging devices as described in the 37th embodiment, the total life time is determined by a set of long-life bits. That is, the total life time is determined by at least a device other than a false bit, and minimization of the life time by a false bit can be prevented. In the presence of a false bit, the left trail (short-life aging device) of the film thickness frequency distribution (Z) shown in FIG. 82 only becomes longer.

A false bit is generated by various causes. Regarding the tunnel insulating film as a structure parameter which determines the life time, a false bit is generated by the same causes as those of a false bit in a nonvolatile memory, such as SILC (Stress-Induced Leakage Current) and a defect. Regarding the p-n junction or Schottky junction, the cause is a trap or the like. Since cells are parallel-connected, these false causes can be simultaneously coped with by the above-mentioned simple process.

Figure 89:
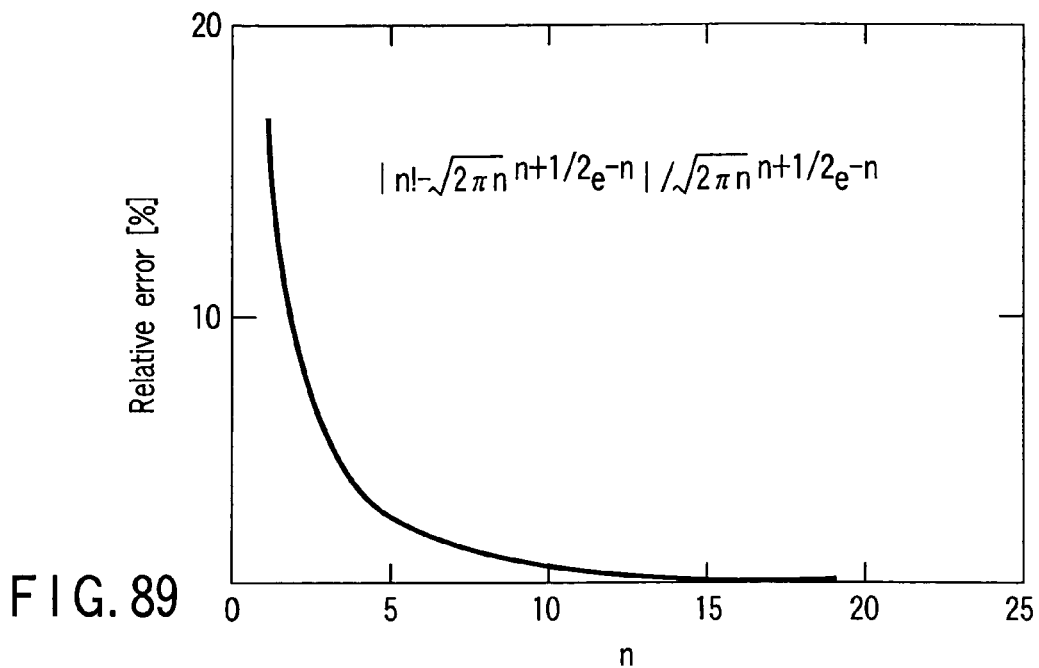
FIG. 89 is a graph showing an N value which establishes the Stirling's formula.

To realize this simple process, the number N of parallel-connected cells must be so increased as to sufficiently approximate the bit count density Z by a normal distribution. N is 20 or more, which will be described later. The validity of the normal distribution is generally guaranteed at a degree at which Stirling's formula:

$$N! = (2\pi)^{1/2} \cdot N^{N+1/2} \cdot e^{-N} \tag{9}$$

is established. FIG. 89 is a graph obtained by plotting the relative error on the left and right sides of Stirling's formula as a function of a natural number n. The Stirling's formula is substantially effective at 20 or more.

The 37th embodiment can implement an electronic timer which can be integrated on a semiconductor substrate by using an aging device as shown in FIG. 77 without any battery. In this case, a plurality of aging devices are parallel-connected, and the life time is so designed as to be determined by a set of long-life cells (excluding the longest-life cell). As a result, the influence of manufacturing variations in the aging device on the life time can be eliminated. At this time, the life time of the aging circuit that is defined by the time at which the sum of drain current becomes equal to the reference signal $I_0$ becomes longer than the average of the lives of parallel-connected aging devices, and shorter than the longest life time in the parallel-connected aging devices. Further, the influence of a false bit can also be eliminated.

(38th Embodiment)

A normally-off aging device in which a signal ($I_D$) disappears at the end of the life time has been exemplified. The present invention can also be applied to a normally-on aging device in which a signal ($I_D$) is generated at the end of the life time, preventing minimization of the life time by a false bit and eliminating the influence of manufacturing variations on the life time.

FIG. 90 shows the classification of normally-on and normally-off aging devices.

Figure 91A:
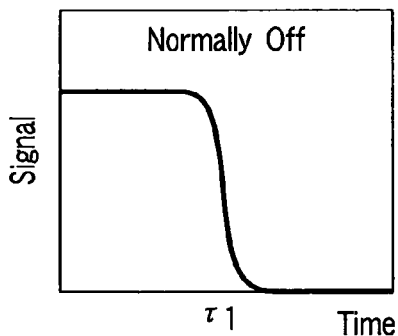
FIGS. 91A to 91D are graphs showing output signals from various aging devices.

The normally-off aging device is OFF before injection of charges into the gate. Charges are injected into the gate to turn on the aging device. Charges injected into the gate are removed by the leakage current, and the output signal ($I_D$) decreases over time. This state is shown in the graph of FIG. 91A. The channel is inverted at time $\tau_1$, and the signal decreases. Electrons are injected into the gate for a pMOSFET, and holes are injected for an nMOSFET. This realizes the "forget at life time $\tau_1$" function.

This description assumes one bit, and the life time $\tau_1$ is defined by channel inversion. In practice, in order to prevent variations in $\tau_1$, a plurality of bits are parallel-connected and used, as described above. At this time, the life time $\tau_1$ is newly determined by the above-described method using the reference signal $I_0$.

Figure 91B:
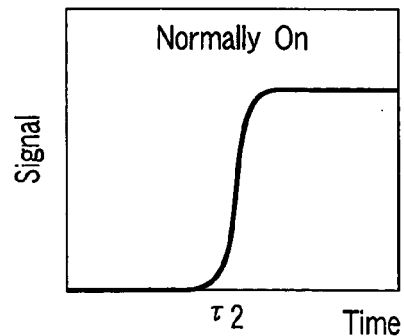

In the normally-on aging device, an impurity is diffused in the channel in advance. The normally-on aging device is ON even before injection of charges into the gate. Charges are injected into the gate to turn off the aging device. Charges injected into the gate are removed by the leakage current, and the output signal ($I_D$) increases over time. This state is shown in the graph of FIG. 91B. The channel is inverted at time $\tau_2$, and the signal abruptly increases. Holes are injected into the gate for a pMOSFET, and electrons are injected for an nMOSFET. This realizes the "remember at life time $\tau_2$" function.

This description assumes one bit, and the life time $\tau_2$ is defined by channel inversion. In practice, in order to prevent variations in $\tau_2$, plurality of bits are parallel-connected and used, as described above. At this time, the life time $\tau_2$ is newly determined by the above-described method using the reference signal $I_0$.

Normally-on and normally-off aging devices are series-connected. FIG. 92 is a sectional view showing this structure. In FIG. 92, reference numeral 261 denotes an STI; 262, a source/drain region; 263, a floating gate; 264, a control gate; 265, an interlayer dielectric film; and 266, an Al interconnection.

Figure 91C:
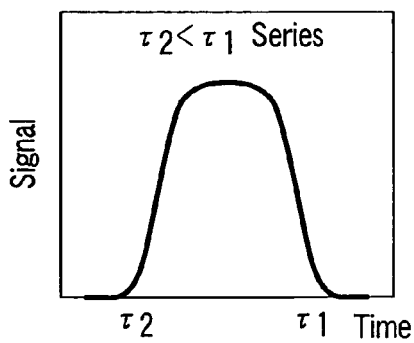

A normally-on aging device with the life time $\tau_2$ is arranged on the left side of the STI connected by the central Al interconnection or the like, and a normally-off aging device with the life time $\tau_1$ is arranged on the right side. As shown in FIG. 92, the two devices are series-connected by the interconnection which overstrides the STI. When $\tau_2 < \tau_1$ is satisfied, the output signal changes over time in an inverted U shape, as shown in the graph of FIG. 91C.

In order to prevent variations in $\tau_1$ and $\tau_2$ described above, $\tau_1$ and $\tau_2$ are determined by a combination of the parallel-connected cells and the reference signal $I_0$, as described above. More specifically, as shown in FIG. 93, normally-on cells 271 are parallel-connected to form the aging circuit 271c and determine $\tau_2$, normally-off cells 272 are parallel-connected to form the aging circuit 272c and determine $\tau_1$, and the aging circuit 271c and the aging circuit 272c are series-connected. In FIG. 93, reference numeral 273 denotes an STI; 274, an interconnection; 275, a common source; and 276, a common drain.

Figure 91D:
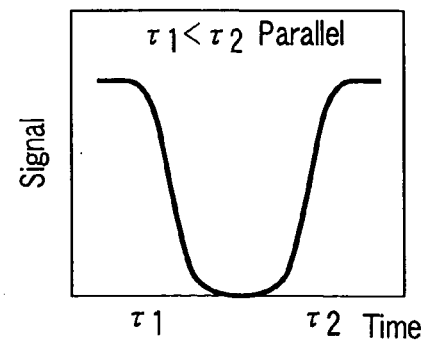
Figure 94:
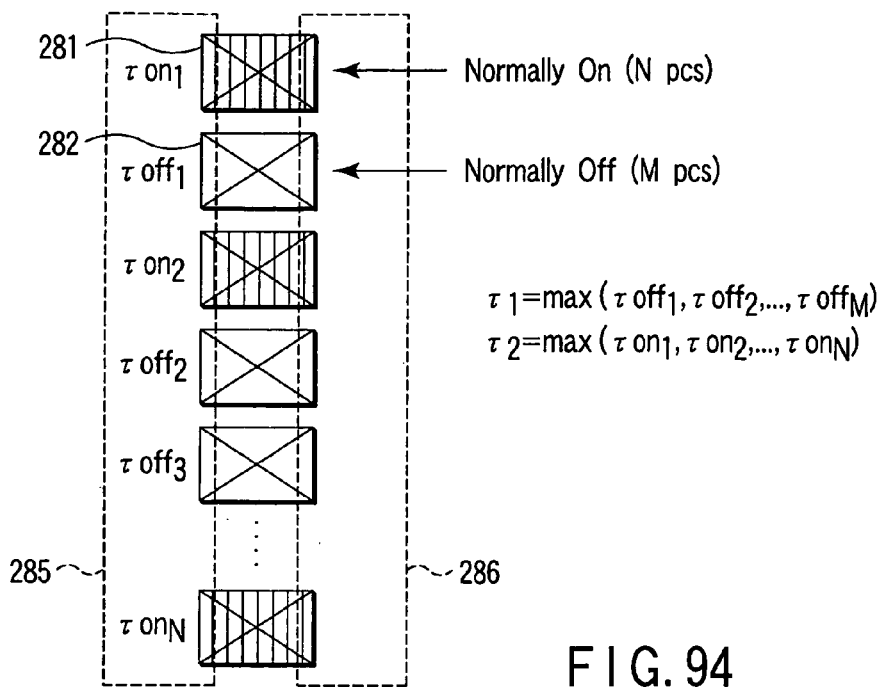
FIG. 94 is a schematic plan view showing still another aging circuit according to the 38th embodiment which is turned off only during a predetermined time.

Next, normally-on and normally-off aging devices are parallel-connected. The basic arrangement is the same as that in FIG. 83. As shown in FIG. 94, N 2Q normally-on aging devices 281 and M normally-off aging devices 282 are parallel-connected. The life time is determined from the parallel arrangement and the reference signal. Let $\tau_2$ be the life time of the normally-on aging device, and $\tau_1$ be the life time of the normally-off aging device. If $\tau_1 < \tau_2$ is satisfied, the output signal changes over time in a U shape, as shown in the graph of FIG. 91D.

The 38th embodiment can attain the same effects as those of the 37th embodiment. In addition, normally-on and normally-off aging devices are combined. This can realize ON operation a predetermined time after the start and OFF operation a predetermined time after ON operation, or vice versa. That is, the limit of outputting a signal or the limit of inhibiting any signal can be set.

(39th Embodiment)

Two methods of implementing an electronic timer will be explained.

The first electronic timer implementation method utilizes the property that output signals ($I_D$) from parallel-connected cells change over time, as shown in FIGS. 83 and 86. To read an output signal, the sense amplifier must be operated. At this time, the power supply must be connected. While no read is performed, charges injected into the gate are gradually removed by the leakage current. Thus, an output signal $I_1$ read at time $t_1$ and an output signal $I_2$ read at time $t_2$ are different, where $t_1 < t_2$.

In a normally-off aging device, $I_1$ is larger than $I_2$, and the signal decreases over time. To the contrary, in a normally-on aging device, $I_1$ is smaller than $I_2$, and the signal increases over time. The time is measured from a temporal change in output signal observed every read. Since no power is required if no read is performed, an electronic timer which can be integrated without any power supply can be implemented.

It should be noted that output signals $I_1, I_2, \ldots$ can be made to correspond to times $t_1, t_2, \ldots$ regardless of the normally-on or normally-off aging device. Of several practical methods, an empirical method will be described. For example, charges are injected once, an output is measured at each proper time, and an output signal corresponding to the time is stored. Correspondence codes:

$I_1 \ldots t_1$
$I_2 \ldots t_2$
$\vdots$
$I_m \ldots t_m$
$\vdots$
$I_N \ldots t_N$ can be prepared. These correspondence codes can be applied to an aging circuit or aging device manufactured similarly. As another method, a high-precision aging simulator is developed to calculate an output $I_m$ corresponding to time $t_m$ for m=1 to N. The present embodiment basically adopts the configuration of the aging circuit in which plural aging devices are connected in parallel only for the sake of life time control. However, the development of the manufacturing technology may make it possible to configure a similar electronic timer by a single aging device.

Figure 95:
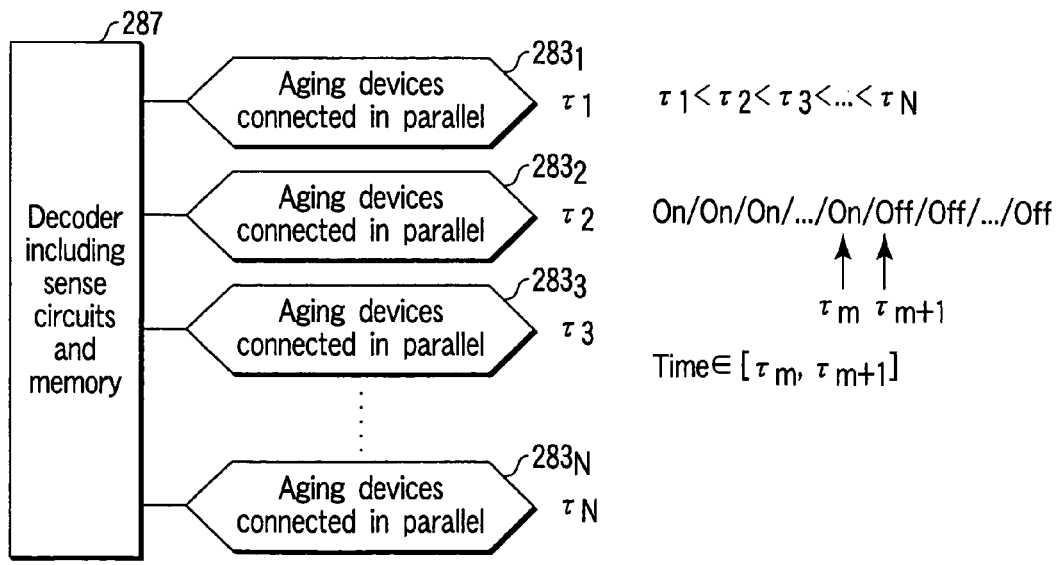
FIG. 95 is a schematic view showing the arrangement of an electronic timer using an aging device according to the 39th embodiment.

The second electronic timer implementation method can be realized by replacing, with the time, the frequency of a frequency counter apparatus disclosed in Jpn. Pat. Appln. KOKAI Publication No. 10-261786. This will be explained in detail with reference to FIG. 95. N normally-off aging circuits having lives $\tau_1, \tau_2, \ldots,$ and $\tau_n$ are prepared. In order to suppress variations in $\tau_1, \tau_2, \ldots,$ and $\tau_n$, the above-described parallel arrangement method and reference signal $I_0$ are employed. That is, the aging circuits 283 shown in FIG. 95 are comprised of a plurality of parallel-connected aging devices.

The lives meet $\tau_1 < \tau_2 < \ldots < \tau_n$. When the 1st aging circuit 283$_1$ to the mth aging circuit 283$_m$ are ON and the (m+1)th aging circuit 283$_{m+1}$ to the Nth aging circuit 283$_N$ are OFF, the electronic timer represents time between $\tau_m$ and $\tau_{m+1}$.

This method can be realized only by an integrable aging device. When a normally-on aging device is used, this method can be applied by exchanging the ON and OFF states.

A sense circuit is required to sense output signals from parallel-connected aging devices (aging circuits 283). For example, sense circuits are arranged for the respective aging circuits, and output signals from the aging circuits are compared with the same signal level. The sense circuits can also compare output signals from the aging circuits with different signal levels. When the time is set at a time interval obtained by dividing by N the difference between the shortest life time and the longest life time among N aging circuits, it is difficult to strictly control the life time of each aging circuit. To correct this, the comparison signal level is adjusted.

The sense circuits which are arranged for the respective aging circuits, and a memory which stores in advance the correspondence code of a signal level record, an output signal from the aging circuit, and a lapsed time are incorporated in a decoder 287. All the above-described processes are executed in the decoder 287.

The simplest electronic timer utilization method is to set an aging flag. When the sense amplifier reads an output signal, the flag is set depending on whether the output signal is larger or smaller than the reference signal $I_0$.

As shown in FIG. 96, the arrangement adopts parallel-connected aging devices. In FIG. 96, reference numeral 301 denotes an aging device; 305, a common source; 306, a common drain; 311, a sense amplifier; 312, firmware; and 313, a CPU. In this way, the aging flag can be set with an integrable arrangement which does not require any battery.

More specifically, the added output from a plurality of aging devices 301 is sensed by the sense amplifier 311. When the added output reaches a level of the reference signal $I_0$, the sense amplifier 311 outputs a flag. The firmware 312 operates in accordance with the flat, notifying the CPU 313 of the lapse of a time set by the electronic timer. The firmware 312 is not necessarily required, and an output from the sense amplifier 311 may be directly supplied to the CPU 313.

(40th Embodiment)

Manufacturing variations between chips are predicted to be larger between different lots than within a single lot. Even if the reference signal $I_0$ can be controlled small within a single lot, it may not be controlled between different lots.

Figure 98A:
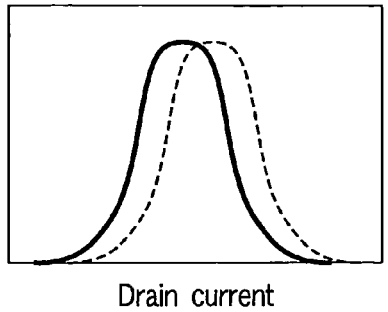
FIGS. 98A and 98B are a graph showing the frequency distribution of each bit as a function of the drain current owing to a manufacturing variation between chips, and a graph showing a temporal change in the sum of drain current obtained by adding bits having this distribution, respectively.
Figure 98B:
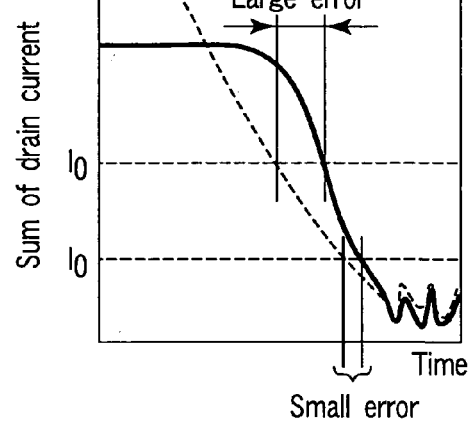

FIG. 98A shows the frequency distribution of each bit (transistor) as a function of the drain current owing to a manufacturing variation between chips. FIG. 98B shows a temporal change in drain current obtained by adding bits having this distribution. The broken line in FIG. 98B corresponds to a distribution shifted to a large current side (right) in FIG. 98A. The solid line corresponds to a distribution shifted to a small current side (left) in FIG. 98A. As the current level decreases over time, the broken line and solid line come close to each other. If the difference between the averages of the two distributions is small, the life time can be controlled by setting a sufficiently small $I_0$. If the difference between the averages of the two distributions is large and high-precision life time control is required, $I_0$ must be decreased to the noise level, which cannot be realized.

Figure 99A:
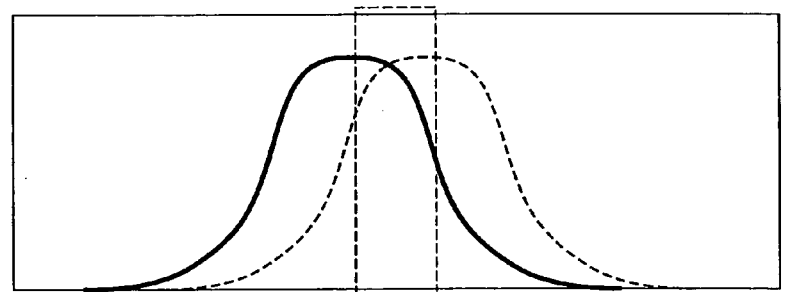
FIGS. 99A and 99B are graphs showing the concept of trimming according to the 40th embodiment.
Figure 99B:
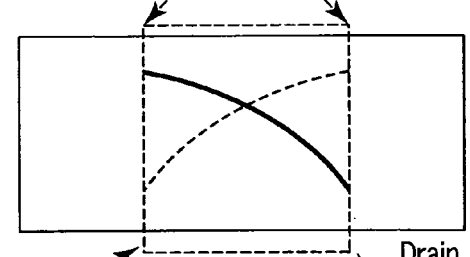

To meet this strict condition, another method must be adopted, and thus trimming of eliminating an unnecessary bit (transistor) from an object subjected to life time calculation is introduced. The concept of trimming will be explained with reference to FIGS. 99A and 99B. FIG. 99A is a graph showing the relationship between the drain current and the bit count, and FIG. 99B is an enlarged view showing part of FIG. 99A.

Only the drain currents of bits surrounded by the averages of the two distributions are added. Assuming that the drain current varies due only to the tunnel insulating film thickness, the left edge at which the drain current is smallest after trimming corresponds to a thick film edge. To the contrary, the right edge corresponds to a thin film edge. The solid line represents a distribution having an average near the thick film edge, and the broken line represents a distribution having an average near the thin film edge.

In this case, the thick film edge means an edge at which the tunnel insulating film thickness is thick, and the thin film edge means an edge at which the tunnel insulating film thickness is thin.

Figure 100B:
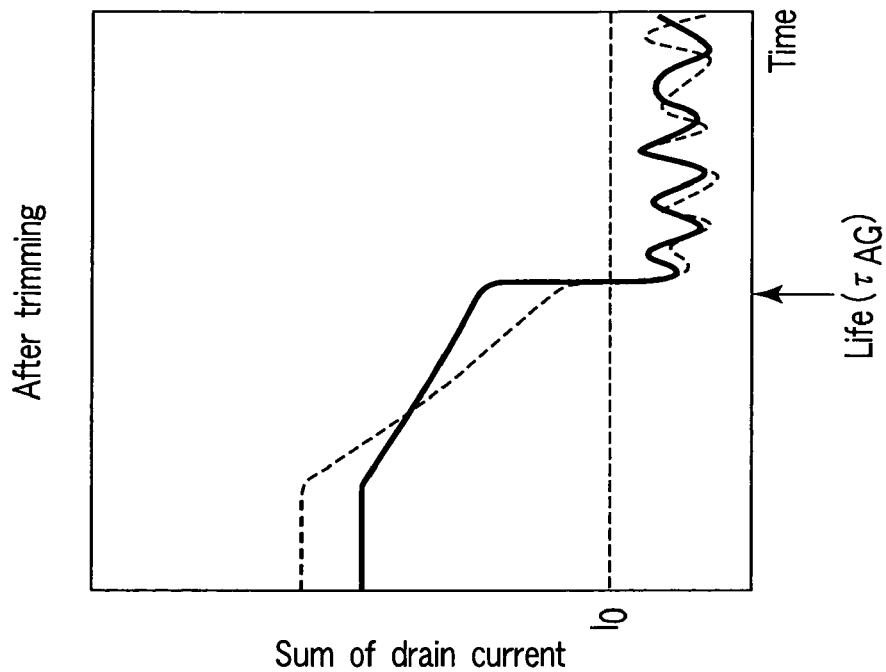
FIGS. 100A and 100B are graphs showing a comparison between temporal changes in the sum of drain current before and after trimming.
Figure 100A:
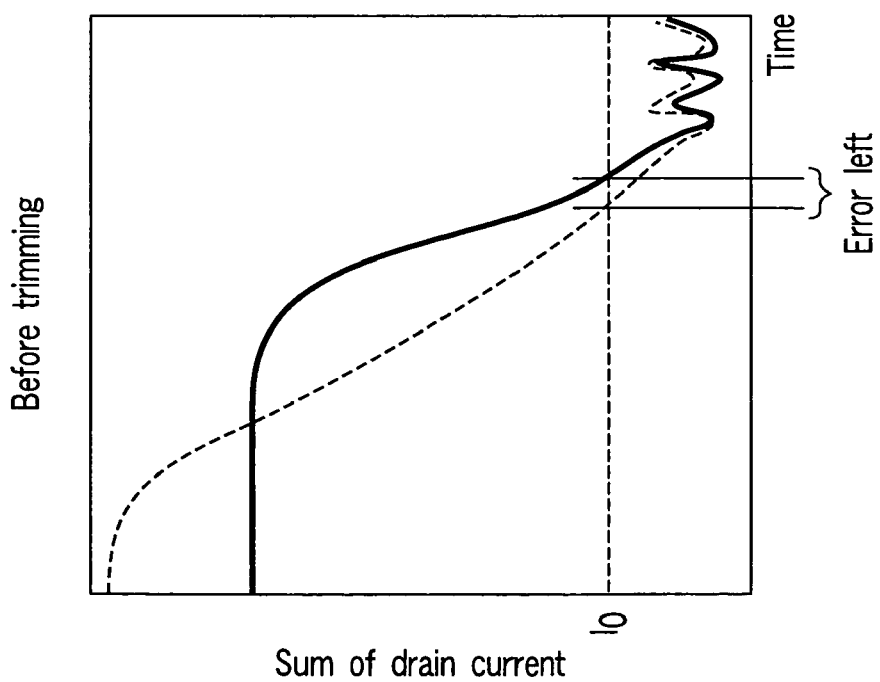

FIGS. 100A and 100B show a comparison between temporal changes in drain current added before and after trimming. FIG. 100A shows a temporal change before trimming, and FIG. 100B shows a temporal change after trimming. After trimming, the initial current level of the two distributions become lower because the large-drain-current-side trail is cut. The current disappears from the thin film edge over time, and the sum of drain current abruptly decreases. The slope of the decrease is proportional to the bit count at the thin film edge, and is steep in the distribution represented by the broken line. After the sum of drain current starts to decrease, the added current levels of the thin-film-edge distribution and the thick-film-edge distribution are reversed.

The current level starts to decrease gradually before trimming because of the end of the life time at the trail of the thin-film side on which the bit count is small. Upon the further lapse of a time, the thick film edge comes to the end of its life time, and the sum of drain current decreases to the noise level in the two distributions. If this state is defined as the end of the total life time, variations within each distribution can be more accurately controlled. At this time, the reference signal $I_0$ is set smaller than the added current level (obtained by multiplying $I_A$ by the bit count at the thick film edge) represented by the broken line at the thick film edge and larger than the noise level.

A method of realizing this trimming in a parallelized circuit is shown in FIG. 101. A portion surrounded by the chain line in FIG. 101 is a trimming circuit 350. A portion surrounded by a broken circle is an adder 358. A flash memory and operational circuit are series-connected before the aging devices are parallel-connected. In FIG. 101, reference numeral 351 denotes each aging device; 351c, an aging circuit in which the aging devices 351 are connected in parallel; 352, each flash memory (trimming transistor) with a two-layered gate structure of a floating gate and control gate; 353, each operational circuit; 354, a memory which stores $I_A$ and $I_B$; 355, a sense circuit; 356, a memory which stores the reference signal $I_0$; and 357, an output part of the sense circuit.

The operational circuit 353 has four terminals. The first terminal is electrically connected to the diffusion layer of the trimming transistor 352, and the second terminal is electrically connected to the memory 354. The third terminal is connected to the adder, and the fourth terminal is electrically connected to the control gate of the trimming transistor 352.

Charges are injected into the flash memory 352 to turn it on. In practice, the method of turning on the flash memory changes depending on whether the flash memory is of a normally-on type or normally-off type or the source/drain region is of an n-type or p-type. In accordance with the type, charges (electrons or holes) are injected or emitted. For descriptive convenience, only a case wherein "charges are injected to turn on the flash memory" will be explained. However, the gist of the present embodiment is the same even when "charges are emitted to turn on the flash memory". The charge holding characteristic of the flash memory must be much longer than the life time of the aging device.

The drain voltage is applied to the aging device 351 by using the operational circuit 353. The drain current is sensed by the operational circuit 353, and compared with the current levels $I_A$ and $I_B$ set in advance. $I_A$ and $I_B$ are the current levels of the thick and thin film edges shown in FIG. 99B. If the sensed drain current does not fall within the range of $I_A$ to $I_B$, a voltage is applied to the control gate of the flash memory 352 to turn off the flash memory 352, inhibiting addition of bits. In this fashion, trimming is executed by rewriting the threshold of the flash memory.

If the sensed drain current falls within the range of $I_A$ to $I_B$, the drain current is added. The added current is sensed by the sense circuit 355 on the right side in FIG. 101, and compared with the reference signal $I_0$ stored in the memory 356.

Trimming result information is stored in a newly prepared memory (magnetic memory, MRAM, nonvolatile memory, ROM, or the like). In reading out the added current, the information is referred to, which eliminates the need for rewriting the threshold of the trimming transistor. The memory is desirably incorporated in the operational circuit of the trimming circuit or accessibly arranged. At this time, the trimming transistor can be formed from a general MOSFET or bipolar transistor.

FIG. 102 is a circuit diagram when the memory which stores a trimming result is incorporated (the memory which stores a trimming result is not illustrated in FIG. 102). The arrangement is apparently the same as that in FIG. 101 except the flash memory 352 is replaced by a general MOSFET 362. FIG. 103 is a circuit diagram showing a memory 363 which is accessibly arranged and stores a trimming result. The trimming transistor may be replaced by a bipolar transistor. In this case, as shown in FIGS. 104A and 104B, it is desirable to connect the emitter (E) and collector (C) to the output terminal of the aging device 351 and the first terminal of the operational circuit 353, respectively, and to connect the base (B) to the second terminal of the operational circuit 353. The emitter and collector may be replaced with each other.

The same effects can also be obtained by electrically disconnecting the operational circuit 353 in the trimming circuit 350, instead of rewriting the threshold. The operational circuit 353 is disconnected mainly at three portions. The first cut portion is a portion between the gate of the trimming transistor 362 (for the bipolar transistor, the base) and the fourth terminal of the operational circuit 353, as shown in FIG. 105. The cut portion is represented by a resistor 365. This also applies to FIGS. 106 and 107.

Figure 106:
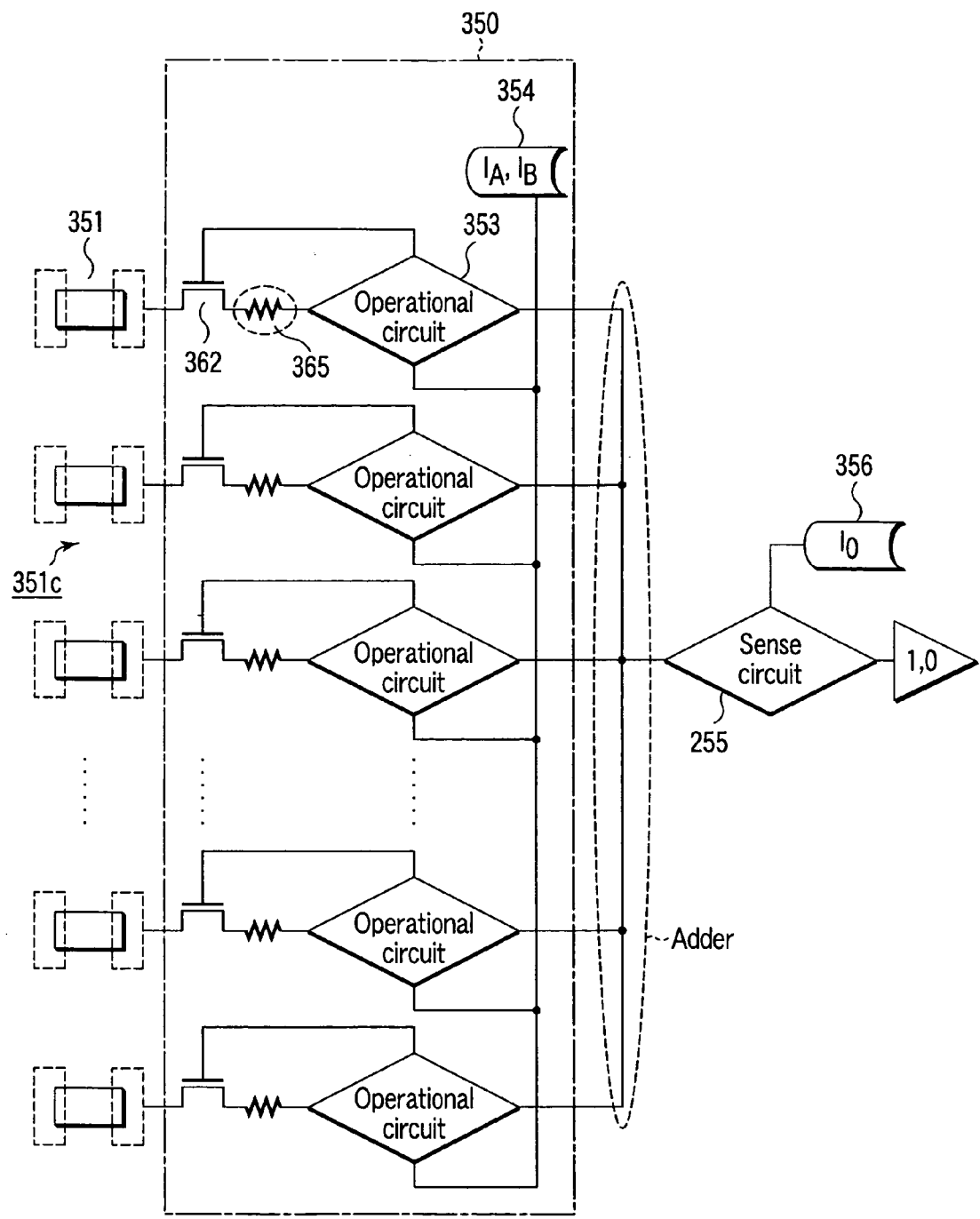

The second cut portion is a portion between the output terminal of the trimming transistor 362 (for the bipolar transistor, the emitter or collector) and the first terminal of the operational circuit 353, as shown in FIG. 106.

Figure 107:
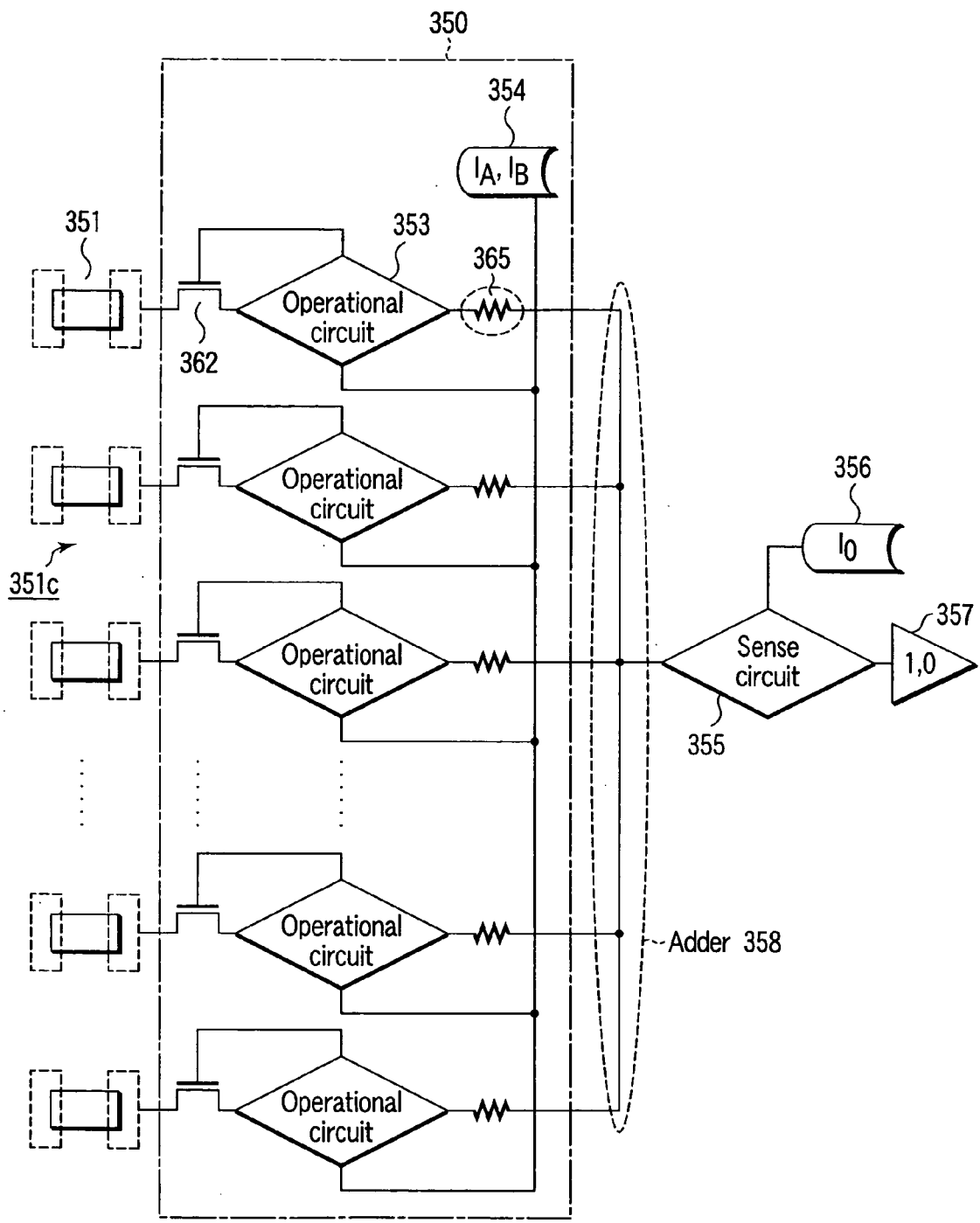

The third cut portion is a portion between the third terminal of the operational circuit 353 and the adder which adds outputs, as shown in FIG. 107. The operational circuit 353 may be cut at any one, two, or all of the three cut portions. In FIG. 107, simply parallel-connected portions constitute the adder, similar to other circuit diagrams (FIGS. 101 to 103, 105, and 106).

The cut resistor 365 is surrounded by a broken circle. In FIGS. 105 to 107, only the top operational circuit 353 is cut. In practice, which of the operational circuits 353 in views of the drawing is to be cut, and the number of operational circuits 353 to be cut is determined in accordance with the trimming result.

The operational circuit 353 can be cut by electromigration or a laser before shipping. Electromigration can use a known method of cutting a conductor by temporarily supplying a large current. In this case, the resistor 365 is desirably a very thin wire in FIGS. 105 to 107.

When a conductor is cut, the trimming transistor can be omitted. In this case, the operational circuit 353 is cut at two portions, as shown in FIG. 108. In practice, the operational circuit 353 may be cut at one or two portions.

As shown in FIG. 109, the diffusion layers 372 of the aging device 351 and trimming transistor 352 are desirably shared with each other. When a two-layered gate transistor of flash memory type is used as both the aging device 351 and trimming transistor 352, the thickness of the tunnel insulating film 374 of the aging device 351 is desirably thinner than that of the tunnel insulating film 384 of the trimming transistor 352. In FIG. 109, 370 denotes a semiconductor substrate, and in the aging device 351, 371 denotes the other diffusion layer; 375 a floating gate; 376, an inter-gate insulator; 377, a control gate, and in the trimming transistor 352, 382 denotes the other diffusion layer; 385, a floating gate; 386, an intergate insulator; and 387, a control gate.

$I_A$ and $I_B$ are not always the averages of the distributions, and if necessary, can be adjusted to control a characteristic with an age-based change as long as the effects of the present embodiment can be obtained. In particular, the time at which the sum of trimmed drain current abruptly decreases to the noise level, i.e., the life time of the aging circuit can be adjusted using $I_A$. At this time, the life time of the aging circuit can be set shorter than the average of the lives of parallel-connected aging devices. This is also one of the trimming effects.

The thick film edge is important for life time control using trimming, and the thin film edge is not always required. A trimming method using no thin film edge will be explained with reference to several views of the drawing.

Figure 110A:
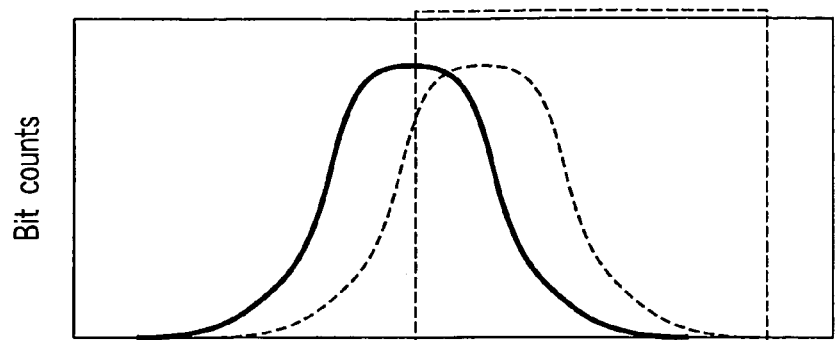
Figure 110B:
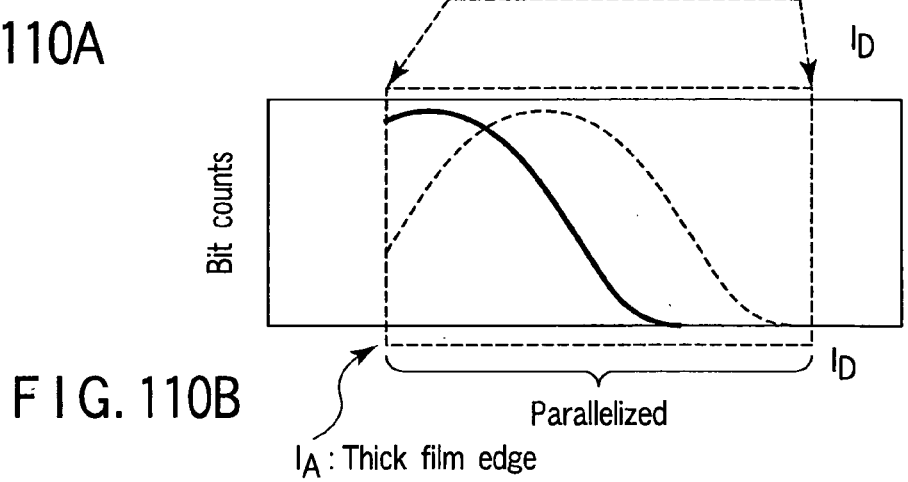

FIGS. 110A and 110B show the concept of trimming which ignores the thin film edge. FIG. 110A shows the frequency distribution of the bit count as a function of the drain current. FIG. 110B is an enlarged view showing part of FIG. 110A. The thick film edge is set at the average of a distribution (solid line) obtained by shifting the average left. A distribution obtained by shifting the average right is represented by the broken line.

Figure 111A:
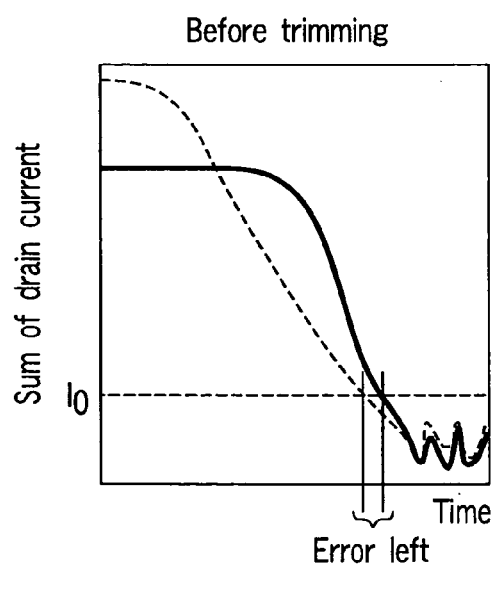
Figure 111B:
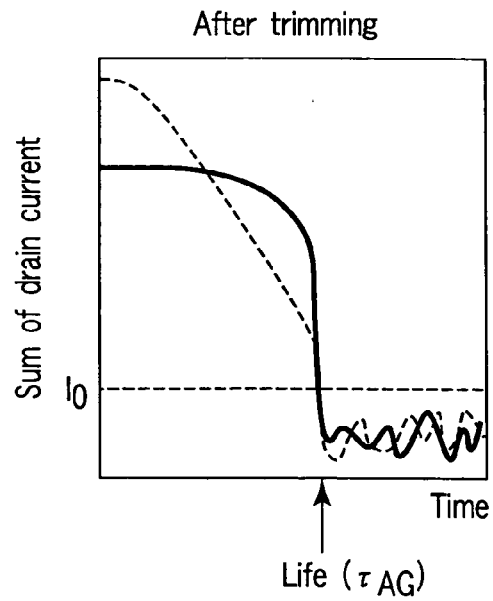

FIGS. 111A and 111B show the results of comparing temporal changes in the sum of drain current before and after trimming. FIG. 111A shows the result before trimming, and FIG. 111B shows the result after trimming. Because of the absence of any thin film edge, large-current-side trails are added, and the initial current level is almost the same as that before trimming. The current level starts to decrease gradually over time under the influence of the large-current-side trail. Immediately when the thick film edge comes to the end of the life time upon the lapse of a time, the added current abruptly decreases to the noise level. This state is defined as the end of the total life time.

FIG. 112 shows a method of mounting a trimming circuit having no thin film edge. The configuration is similar to FIG. 101 except a memory 354' does not have $I_B$, and a detailed description of the operation will be omitted.

Similar to FIGS. 102 and 103, trimming result information is stored in a newly prepared memory (magnetic memory, MRAM, nonvolatile memory, ROM, or the like). In reading out the added current, the information is referred to, which eliminates the need for rewriting the threshold of the trimming transistor. The memory is desirably incorporated in the operational circuit of the trimming circuit or accessibly arranged. At this time, the trimming transistor can be formed from a general MOSFET or bipolar transistor.

Instead of rewriting the threshold, the same effects can also be obtained by electrically disconnecting the trimming transistor and the operational circuit in the trimming circuit, as shown in FIGS. 105 to 107. The operational circuit can be cut by electromigration or a laser before shipping. In the use of cutting, the trimming transistor may be omitted, as shown in FIG. 108.

FIG. 113 is a circuit diagram when the memory which stores a trimming result is incorporated. The arrangement is apparently the same as that in FIG. 112 except the flash memory 352 is replaced by the general MOSFET 362. Compared to FIG. 102, $I_B$ is omitted from the memory 354, and the memory 354 is changed into the memory 354'. Embodiments in which $I_B$ is omitted from corresponding memories (354) in FIGS. 103 and 105 to 107 can also be realized. Each embodiment can adopt a bipolar transistor shown in FIGS. 104A and 104B. A repetitive description of these embodiments will be omitted.

A method (tuning method) of adjusting the reference signal $I_0$, thick film edge $I_A$, and thin film edge $I_B$ will be described. $I_0$ will be exemplified, and the same description also applies to $I_A$ and $I_B$. FIG. 114 shows the arrangement. In FIG. 114, reference numeral 411 denotes an aging circuit; 412, a sense circuit; and 413, a memory. The sense circuit 412 senses an input signal, and outputs "1" if the input signal is higher than $I_0$ or "0" if the input signal is lower than $I_0$. $I_0$ is utilized in this manner and must be stored.

The simplest method of storing $I_0$ is to use a ROM, but $I_0$ cannot be tuned after the manufacture. If a flash memory is used as the memory 413, $I_0$ can be tuned even after the manufacture. FIG. 115 shows a tuning method using the flash memory. According to this method, the channel resistance is adjusted by the charge amount injected into the floating gate (FG). The charge holding characteristic of the flash memory must be much longer than the life time of the aging device.

In this method, however, as a flash memory cell is employed as an aging device, both the tunnel oxide film of the aging device and the tunnel oxide film of the flash memory must be formed, resulting in high cost. Considering this, a method using parallel thin wires $r_1$ to $r_N$ as shown in FIG. 116 is also practical. A voltage V is applied using the sense circuit 412. The current $I_0$ sensed by the sense circuit 412 is given by $$I_0 = V/r_1 + V/r_2 + \ldots + V/r_N \quad (10)$$

where $r_1$ to $r_N$ are the resistance values of the thin wires. After the manufacture, one of the thin wires is cut by electromigration or a laser. For example, when the Nth thin wire is cut, the current $I_0$ changes as given by:

$$I_0 = V/r_1 + V/r_2 + \ldots + V/r_{N-1} \quad (11)$$

In this way, $I_0$ can be tuned after the manufacture.

As another tuning method during the manufacture, a diffusion layer shown in FIG. 117 or a gate clamp shown in FIG. 118 may be applied. In an example (FIG. 117) using the diffusion layer, $I_0$ is tuned by the impurity concentration. In an example (FIG. 118) using the gate clamp, $I_0$ can be tuned by the channel resistance.

(Modifications)

The aging circuit of the present invention is not limited to the 37th to 40th embodiments. All the above embodiments using the aging circuit can be realized by replacing a 1-bit aging device as a building component if a manufacturing process capable of accurately controlling variations in life time between bits is available. This is very difficult to achieve by the state-of-the-art manufacturing technique, but may be realized in the future.

The aging device according to the 1st to 40th embodiments includes an aging device which utilizes a characteristic of changing an output signal over time while the aging device is disconnected from the power supply though the aging device is connected to the power supply only when a signal is sensed, and which operates offline because of this characteristic. The aging device also includes all integrable semiconductor devices having this characteristic. The 37th to 40th embodiments are related to a semiconductor integrated circuit which controls variations in the age-based change characteristic of the aging device.

The 37th and 40th embodiments have mainly described a normally-off aging device, but the same effects can also be obtained using a normally-on aging device.

Aging devices are parallel-connected in the 37th embodiment, but are not limited to parallel connection and may be connected as shown in FIGS. 97A and 97B. That is, a plurality of aging devices are series-connected, and a plurality of series-connected portions are parallel-connected. Only one series-connected portion suffers variations under the influence of a false cell or the like. By parallel-connecting a plurality of series-connected portions, variations can be suppressed. At this time, the life time of the aging circuit (age-based change circuit) tends to be shorter than the average of the lives of the aging devices which constitute the circuit. The reference signal $I_0$ is preferably adjusted to make the life time of the aging circuit shorter. The series-connected portion can be regarded as one aging device. In the use of trimming described above, $I_A$ can be adjusted to make the life time of the aging circuit longer than the average of the lives of the aging devices which constitute the circuit.

The arrangement of the aging device is not limited to an EEPROM with a two-layered gate structure. Any device such as ones shown in FIGS. 80 and 81 can be used as far as the output signal changes over time while the device is disconnected from the power supply.

As described in detail above, the semiconductor integrated circuit according to the 37th to 40th embodiments is designed such that a plurality of aging devices are parallel-connected instead of a single aging device and a long-life cell (excluding the longest-life cell) determines the life time of the aging circuit. Variations in the use of a single aging device can be suppressed, and variations by a false bit can be prevented. Further, trimming improves the life time controllability and the time controllability of an electronic timer which operates offline without any battery.

The influence of the presence of a false bit or manufacturing variations in aging device structure parameters (tunnel insulating film thickness, impurity concentration, junction area, gate end shape, and the like) on the life time of the aging device can be suppressed, enhancing the controllability of the life and the electronic timer time. Thus, the aging device used in the 1st to 36th embodiments as a time switch is preferably replaced by the above-mentioned aging circuit.

The number of the aging devices composing the aging circuit with a trimming circuit is desirably not less than 20.

In the semiconductor integrated circuit, the time until an output signal from the aging device reaches a predetermined level is defined as the life time of the aging device. The time until an output signal from the aging circuit reaches a reference signal is defined as the life of the aging circuit. In this case, the reference signal level may be set such that the life time of the aging circuit becomes longer than the average of the life time of the aging device.

The reference signal level may be set to a value smaller by a predetermined offset amount than a value at which an output signal from the aging circuit is maximized upon the lapse of a time, or a value larger by a predetermined offset amount than a value at which an output signal from the aging circuit is minimized upon the lapse of a time.

A memory which stores the reference signal is further arranged and the level of the reference signal stored in the memory may be adjusted to control the life time of the aging circuit.

The aging device may have a charge accumulation layer accompanied by leakage while the power supply is disconnected.

The aging device may be constituted by series-connecting a plurality of field effect devices each having a charge accumulation layer accompanied by leakage while the power supply is disconnected.

The aging circuit may comprise a first sub-aging circuit constituted by parallel-connecting a plurality of first aging devices in which an output signal decreases over time, and a second sub-aging circuit constituted by parallel-connecting a plurality of second aging devices in which an output signal increases over time. The first and second sub-aging circuits are series-connected. The times until output signals from the first and second sub-aging circuits reach a level of the reference signal are defined as the lives of the first and second sub-aging circuits. In this case, the life time of the first sub-aging circuit can be set longer than that of the second sub-aging circuit.

The aging circuit may comprise a first sub-aging circuit constituted by parallel-connecting a plurality of first aging devices in which an output signal decreases over time, and a second sub-aging circuit constituted by parallel-connecting a plurality of second aging devices in which an output signal increases over time. The first and second sub-aging circuits are parallel-connected. The times until output signals from the first and second sub-aging circuits reach a level of the reference signal are defined as the lives of the first and second sub-aging circuits. In this case, the life time of the first sub-aging circuit can be set shorter than that of the second sub-aging circuit.

The aging circuit may comprise a plurality of sub-aging circuits, and a memory area where the correspondence codes of output signals from the plurality of sub-aging circuits and lapsed times are stored in advance. The sense circuit compares the output signals from the plurality of sub-aging circuits with the correspondence codes stored in the memory area, and senses the lapsed operation time of the aging circuit.

The aging circuit may comprise N sub-aging circuits having different lives defined by times until an added output signal reaches a predetermined level. The sense circuit simultaneously compares output signals from the N sub-aging circuits with a reference signal, and senses the lapsed operation time.

The N sub-aging circuits have lives different by a predetermined time. The time may be divided at a time interval obtained by dividing, by N, the difference between the shortest life time and the longest life time among the N aging circuits in accordance with the comparison result of the sense circuit.

Each of a plurality of circuit breakers may be a trimming transistor with a two-layered gate structure which has first and second diffusion layers formed apart from each other in a semiconductor substrate, a first gate electrode formed via a first insulating film on the semiconductor substrate between the first and second diffusion layers, and a second gate electrode formed on the first gate electrode via a second gate insulating film, and has the first diffusion layer electrically connected to a corresponding one of the output terminals of a plurality of aging devices. The second diffusion layers of the trimming transistors are electrically connected to corresponding first terminals of a plurality of operational circuits. The second gate electrodes of the trimming transistors are electrically connected to corresponding fourth terminals of the plurality of operational circuits. The plurality of operational circuits compare output signals which are input from the plurality of aging devices via the trimming transistors with a signal level stored in a first memory area. The operational circuits inject charges into or emit them from the first gate electrodes of the trimming transistors on the basis of the comparison result.

Each of a plurality of aging devices may comprise third and fourth diffusion layers which are formed apart from each other in a semiconductor substrate, a third gate electrode which is formed via a third insulating film on the semiconductor substrate between the third and fourth diffusion layers, and a fourth gate electrode which is formed on the third gate electrode via a fourth gate insulating film. Either of the third and fourth diffusion layers of each of the plurality of aging devices is shared with the first diffusion layer of the trimming transistor. The film thickness of the third gate insulating film of each of the plurality of aging devices is smaller than the film thickness of the first gate insulating film of the trimming transistor.

Each of a plurality of circuit breakers may be a trimming transistor which has first and second diffusion layers formed apart from each other in a semiconductor substrate, a first gate electrode formed via a first insulating film on the semiconductor substrate between the first and second diffusion layers, and a second gate electrode formed on the first gate electrode via a second gate insulating film, and has the first diffusion layer electrically connected to the output terminal of the aging device. A plurality of operational circuits compare output signals which are input from the aging devices via the trimming transistors with a signal level stored in the first memory area. On the basis of the comparison result, the operational circuits cut electrical connection between the plurality of operational circuits and the trimming transistors or electrical connection between the plurality of operational circuits and an adder.

The circuit breaker may be a cutting trace at which interconnection between the third terminal of the operational circuit and the adder is cut.

The integrated circuit may further comprise a third memory area where a result of comparing by the operational circuit an output signal input from the aging device into the operational circuit and a signal level stored in the first memory area is stored. Each of a plurality of circuit breakers is a trimming transistor which has first and second diffusion layers formed apart from each other in a semiconductor substrate, a first gate electrode formed via a first insulating film on the semiconductor substrate between the first and second diffusion layers, and a second gate electrode formed on the first gate electrode via a second gate insulating film, and has the first diffusion layer electrically connected to the output terminal of the aging device.

The times until output signals from a plurality of aging devices reach a predetermined signal level stored in the first memory area are defined as the lives of the plurality of aging devices. The time until an output added by the adder reaches the level of a reference signal stored in a second memory area is defined as the life time of the aging circuit. In this case, the life time of the aging circuit is controlled by adjusting the predetermined signal level stored in the first memory area.

The aging devices forming an aging circuit is desirably configured by either one of a normally-on type and a normally-off type. In this configuration, a normally-on type aging circuit is formed only of normally-on type aging devices, and a normally-off type aging circuit is formed only of normally-off devices.

The time switch is preferably realized by the aging circuit. However, there is a possibility that the time switch is realized by a single aging device upon a progress of a manufacturing process which enables to prevent the life time from varying.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
   an aging circuit configured by series-connecting a plurality of aging devices in which an age-based change occurs while a power supply is disconnected, and an output signal sensed in read changes over time, each of the aging devices including two diffusion layers as an input portion and an output portion, and neighboring ones of the aging devices sharing one of the two diffusion layers to be connected in series; and
   a sense circuit comparing the output signal from the aging circuit with a reference signal.

2. The circuit according to claim 1, wherein when a time until an output signal from each of the aging devices reaches a predetermined level is defined as a life time of each of the aging devices and a time until the output signal from the aging circuit reaches a level of the reference signal is defined as a life time of the aging circuit, the level of the reference signal is so set as to make the life time of the aging circuit longer than an average life time of the aging devices.

3. The circuit according to claim 1, wherein a level of the reference signal is set to a value smaller by a predetermined offset amount than a value at which the output signal from the aging circuit is maximized upon a lapse of a time, or a value larger by a predetermined offset amount than a value at which the output signal from the aging circuit is minimized upon a lapse of a time.

4. The circuit according to claim 1, further comprising a memory that stores the reference signal, and
   wherein a level of the reference signal stored in the memory is adjusted to control a life time of the aging circuit.

5. The circuit according to claim 1, wherein the aging device has a charge accumulation layer accompanied by leakage while the power supply is disconnected.

6. The circuit according to claim 1, wherein the aging circuit comprises a first sub-aging circuit configured by series-connecting a plurality of first aging devices in which the output signal increases over time, and a second sub-aging circuit configured by parallel-connecting a plurality of second aging devices in which the output signal decreases over time,
   the first sub-aging circuit and the second sub-aging circuit are series-connected, and
   when a time until the output signal from the first sub-aging circuit reaches a first predetermined level is defined as a life time of the first sub-aging circuit and a time until the second sub-aging circuit reaches a second predetermined level is defined as a life time of the second sub-aging circuit, the life time of the first sub-aging circuit is shorter than the life time of the second sub-aging circuit.

7. The circuit according to claim 1, wherein the aging circuit comprises a first sub-aging circuit configured by series-connecting a plurality of first aging devices in which the output signal increases over time, and a second sub-aging circuit configured by parallel-connecting a plurality of second aging devices in which the output signal decreases over time,
   the first sub-aging circuit and the second sub-aging circuit are parallel-connected, and
   when a time until the output signal from the first sub-aging circuit reaches a predetermined level is defined as a life time of the first sub-aging circuit and a time until the second sub-aging circuit reaches the predetermined level is defined as a life time of the second sub-aging circuit, the life time of the first sub-aging circuit is longer than the life time of the second sub-aging circuit.

8. The circuit according to claim 1, further comprising a memory area where correspondence codes of the output signal from the aging circuit and lapsed times are stored in advance, and
   the sense circuit compares the output signal from the aging circuit with the correspondence codes stored in the memory area, and senses a lapsed operation time of the aging circuit.

9. The circuit according to claim 1, wherein the aging circuit comprises N sub-aging circuits each having a different life time from others defined by a time until an added output signal from the plurality of aging devices within each of the N sub-aging circuits reaches a predetermined reference signal set for each of the N sub-aging circuits, and the sense circuit compares a serial addition of the added output signal from each of the N sub-aging circuits with the predetermined reference signal, and senses whether or not each of the N sub-aging circuits closes a life time thereof.

10. The circuit according to claim 9, wherein
each of the N sub-aging circuits has the different life time from others by a predetermined time which is obtained by dividing, by N, a difference between the shortest life time and the longest life time among the N sub-aging circuits, and the sense circuit senses a lapsed operation time of the aging circuit by sensing each of the life times of the N sub-aging circuits.

11. The circuit according to claim 1, wherein the aging circuit comprises a first sub-aging circuit configured by parallel-connecting a plurality of series-connected first aging devices in which the output signal increases over time, and a second sub-aging circuit configured by parallel-connecting a plurality of series-connected second aging devices in which the output signal decreases over time, the first sub-aging circuit and the second sub-aging circuit are series-connected, and when a time until the output signal from the first sub-aging circuit reaches a first predetermined level is defined as a life time of the first sub-aging circuit and a time until the second sub-aging circuit reaches a second predetermined level is defined as a life time of the second sub-aging circuit, the life time of the first sub-aging circuit is shorter than the life time of the second sub-aging circuit.

12. The circuit according to claim 1, wherein the aging circuit comprises a first sub-aging circuit configured by series-connecting a plurality of first aging devices in which the output signal increases over time, and a second sub-aging circuit configured by series- connecting a plurality of second aging devices in which the output signal decreases over time, the first sub-aging circuit and the second sub-aging circuit are series-connected, and when a time until the output signal from the first sub-aging circuit reaches a first predetermined level is defined as a life time of the first sub-aging circuit and a time until the second sub-aging circuit reaches a second predetermined level is defined as a life time of the second sub-aging circuit, the life time of the first sub-aging circuit is shorter than the life time of the second sub-aging circuit.

13. The circuit according to claim 1, wherein the aging circuit comprises a first sub-aging circuit configured by parallel-connecting a plurality of first aging devices in which the output signal increases over time, and a second sub-aging circuit configured by series- connecting a plurality of second aging devices in which the output signal decreases over time, the first sub-aging circuit and the second sub-aging circuit are series-connected, and when a time until the output signal from the first sub-aging circuit reaches a first predetermined level is defined as a life time of the first sub-aging circuit and a time until the second sub-aging circuit reaches a second predetermined level is defined as a life time of the second sub-aging circuit, the life time of the first sub-aging circuit is shorter than the life time of the second sub-aging circuit.

14. The circuit according to claim 1, wherein the aging circuit comprises a first sub-aging circuit configured by parallel-connecting a plurality of series-connected first aging devices in which the output signal increases over time, and a second sub-aging circuit configured by parallel-connecting a plurality of series-connected second aging devices in which the output signal decreases over time, the first sub-aging circuit and the second sub-aging circuit are parallel-connected, and when a time until the output signal from the first sub-aging circuit reaches a predetermined level is defined as a life time of the first sub-aging circuit and a time until the second sub-aging circuit reaches the predetermined level is defined as a life time of the second sub-aging circuit, the life time of the first sub-aging circuit is longer than the life time of the second sub-aging circuit.

15. The circuit according to claim 1, wherein the aging circuit comprises a first sub-aging circuit configured by series-connecting a plurality of first aging devices in which the output signal increases over time, and a second sub-aging circuit configured by series- connecting a plurality of second aging devices in which the output signal decreases over time, the first sub-aging circuit and the second sub-aging circuit are parallel-connected, and when a time until the output signal from the first sub-aging circuit reaches a predetermined level is defined as a life time of the first sub-aging circuit and a time until the second sub-aging circuit reaches the predetermined level is defined as a life time of the second sub-aging circuit, the life time of the first sub-aging circuit is longer than the life time of the second sub-aging circuit.

16. The circuit according to claim 1, wherein the aging circuit comprises a first sub-aging circuit configured by parallel-connecting a plurality of first aging devices in which the output signal increases over time, and a second sub-aging circuit configured by series- connecting a plurality of second aging devices in which the output signal decreases over time, the first sub-aging circuit and the second sub-aging circuit are parallel-connected, and when a time until the output signal from the first sub-aging circuit reaches a predetermined level is defined as a life time of the first sub-aging circuit and a time until the second sub-aging circuit reaches the predetermined level is defined as a life time of the second sub-aging circuit, the life time of the first sub-aging circuit is longer than the life time 17. A semiconductor integrated circuit comprising:
an aging circuit configured by series-connecting a plurality of aging devices in which an age-based change occurs while a power supply is disconnected, and an output signal sensed in read changes over time; and a sense circuit comparing the output signal from the aging circuit with a reference signal, wherein when a time until an output signal from each of the aging devices reaches a predetermined level is defined as a life time of each of the aging devices and a time until the output signal from the aging circuit reaches a level of the reference signal is defined as a life time of the aging circuit, the level of the reference signal is so set as to make the life time of the aging circuit longer than an average life time of the aging devices.

18. A semiconductor integrated circuit, comprising:

an aging circuit configured by series-connecting a plurality of aging devices in which an age-based change occurs while a power supply is disconnected, and an output signal sensed in read changes over time; and a sense circuit comparing the output signal from the aging circuit with a reference signal, wherein the aging circuit comprises a first sub-aging circuit configured by series-connecting a plurality of parallel-connected first aging devices in which the output signal increases over time, and a second sub-aging circuit configured by series-connecting a plurality of parallel-connected second aging devices in which the output signal decreases over time, the first sub-aging circuit and the second sub-aging circuit are series- connected, and when a time until the output signal from the first sub-aging circuit reaches a first predetermined level is defined as a life time of the first sub-aging circuit and a time until the second sub-aging circuit reaches a second predetermined level is defined as a life time of the second sub-aging circuit, the life time of the first sub-aging circuit is shorter than the life time of the second sub-aging circuit.

19. A semiconductor integrated circuit comprising:

an aging circuit configured by series-connecting a plurality of aging devices in which an age-based change occurs while a power supply is disconnected, and an output signal sensed in read changes over time; and a sense circuit comparing the output signal from the aging circuit with a reference signal, wherein the aging circuit comprises a first sub-aging circuit configured by series-connecting a plurality of parallel-connected first aging devices in which the output signal increases over time, and a second sub-aging circuit configured by series-connecting a plurality of parallel-connected second aging devices in which the output signal decreases over time, the first sub-aging circuit and the second sub-aging circuit are parallel-connected, and when a time until the output signal from the first sub-aging circuit reaches a pre-determined level is defined as a life time of the first sub-aging circuit and a time until the second sub-aging circuit reaches the predetermined level is defined as a life time of the second sub-aging circuit, the life of the first sub-aging circuit is longer than the life time of the second sub-aging circuit.

20. A semiconductor integrated circuit comprising:

an aging circuit configured by series-connecting a plurality of aging devices in which an age-based change occurs while a power supply is disconnected, and an output signal sensed in read changes over time; and a sense circuit comparing the output signal from the aging circuit with a reference signal, wherein the aging circuit comprises N sub-aging circuits each having a different life time from others defined by a time until an added output signal from the plurality of aging devices within each of the N sub-aging circuits reaches a predetermined reference signal set for each of the N sub-aging circuits, and the sense circuit compares a serial addition of the added output signal from each of the N sub-aging circuits with the predetermined reference signal, and senses whether or not each of the N sub-aging circuit closes a life time thereof.

* * * * *